(12) United States Patent
Hagiwara et al.

(10) Patent No.: US 10,221,796 B2
(45) Date of Patent: Mar. 5, 2019

(54) ENGINE DEVICE

(71) Applicant: Yanmar Co., Ltd., Osaka-shi, Osaka-fu (JP)

(72) Inventors: Ryoichi Hagiwara, Osaka (JP); Osamu Yamagishi, Osaka (JP); Naoya Ikeda, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 15/747,015

(22) PCT Filed: May 24, 2016

(86) PCT No.: PCT/JP2016/065252
§ 371 (c)(1),
(2) Date: Jan. 23, 2018

(87) PCT Pub. No.: WO2017/013939
PCT Pub. Date: Jan. 26, 2017

(65) Prior Publication Data
US 2018/0216559 A1     Aug. 2, 2018

(30) Foreign Application Priority Data

Jul. 23, 2015  (JP) ................................. 2015-146084
Jul. 23, 2015  (JP) ................................. 2015-146085

(51) Int. Cl.
*F02D 41/18*     (2006.01)
*F02D 45/00*     (2006.01)
(Continued)

(52) U.S. Cl.
CPC ............. *F02D 41/18* (2013.01); *B63H 21/17* (2013.01); *F02D 19/02* (2013.01);
(Continued)

(58) Field of Classification Search
CPC ...... F02D 41/18; F02D 19/02; F02D 41/0025; F02D 41/0027; F02D 41/144;
(Continued)

(56) References Cited

U.S. PATENT DOCUMENTS 5,590,632 A  *  1/1997  Kato ........................ F01L 1/34
                                                  123/480
5,615,655 A     4/1997  Shimizu
(Continued)

FOREIGN PATENT DOCUMENTS

JP        08-014109 A     1/1996
JP     1996-014109 A     1/1996
(Continued)

OTHER PUBLICATIONS

International Search Report dated Aug. 23, 2016 issued in corresponding PCT Application PCT/US2016/065252.
(Continued)

*Primary Examiner* — Long T Tran
*Assistant Examiner* — John Bailey
(74) *Attorney, Agent, or Firm* — Norton Rose Fulbright US LLP

(57) ABSTRACT

An engine device including an intake manifold (67) configured to supply air into a cylinder (36), a gas injector (98) configured to mix fuel gas with air supplied from the intake manifold (67), and supply mixed gas to the cylinder (36), and an igniter (79) configured to ignite, in the cylinder (36) premixed fuel obtained by pre-mixing the fuel gas with the air, the engine device further including a controlling unit (73) configured to determine an air amount in the premixed fuel in the cylinder (36). The controlling unit (73) performs in multiple steps retard control of ignition timing by the igniter (79), when the air amount is insufficient, and per-
(Continued)

forms in multiple steps advance control of the ignition timing, when the air amount is sufficient.

7 Claims, 37 Drawing Sheets

(51) Int. Cl.
    F02P 5/15      (2006.01)
    F02D 19/02     (2006.01)
    F02P 5/152     (2006.01)
    F02D 41/00     (2006.01)
    B63H 21/17     (2006.01)
    F02D 41/14     (2006.01)
    F02B 61/04     (2006.01)
    F02M 21/02     (2006.01)

(52) U.S. Cl.
    CPC ..... *F02D 41/0025* (2013.01); *F02D 41/0027* (2013.01); *F02D 41/144* (2013.01); *F02D 45/00* (2013.01); *F02P 5/15* (2013.01); *F02P 5/1523* (2013.01); *B63B 2755/00* (2013.01); *F02B 61/04* (2013.01); *F02D 2200/0406* (2013.01); *F02D 2200/10* (2013.01); *F02M 21/0248* (2013.01); *Y02T 10/32* (2013.01); *Y02T 10/46* (2013.01)

(58) Field of Classification Search
    CPC ............ F02D 45/00; F02D 2200/0406; F02D 2200/10; B63H 21/17; F02P 5/15; F02P 5/1523; F02P 5/04; F02P 5/145; B63B 2755/00; F02B 61/04; F02M 21/0248; Y02T 10/32; Y02T 10/46
    USPC ..................................................... 123/406.23
    See application file for complete search history.

(56) References Cited

U.S. PATENT DOCUMENTS

| | | | |
|---|---|---|---|
| 5,809,967 A | 9/1998 | Masubuchi | |
| 6,408,625 B1* | 6/2002 | Woon | F02D 17/02 |
| | | | 123/198 F |
| 7,072,758 B2* | 7/2006 | Kolmanovsky | F01L 9/04 |
| | | | 123/198 F |
| 8,355,856 B2* | 1/2013 | Hartrey | F02D 41/1497 |
| | | | 123/406.23 |
| 2003/0029416 A1 | 2/2003 | Sauler et al. | |
| 2003/0188714 A1 | 10/2003 | Yamamoto et al. | |
| 2004/0084020 A1* | 5/2004 | Daniels | F01N 3/2006 |
| | | | 123/406.23 |
| 2005/0188683 A1* | 9/2005 | Miyoshi | F02D 19/0628 |
| | | | 60/286 |
| 2007/0088487 A1* | 4/2007 | Lahti | F02D 37/02 |
| | | | 701/104 |
| 2008/0294325 A1* | 11/2008 | Kurotani | F02B 1/08 |
| | | | 701/102 |
| 2009/0125212 A1* | 5/2009 | Kurashima | F02D 37/02 |
| | | | 701/103 |
| 2012/0277979 A1* | 11/2012 | Kato | F02D 41/0085 |
| | | | 701/104 |
| 2012/0297866 A1* | 11/2012 | Tanaka | G01M 15/104 |
| | | | 73/114.31 |
| 2013/0146024 A1* | 6/2013 | Cunningham | F02D 41/0255 |
| | | | 123/406.53 |
| 2015/0308364 A1* | 10/2015 | Hojo | F02D 41/1439 |
| | | | 60/285 |
| 2017/0145946 A1* | 5/2017 | Korenaga | F02D 41/06 |
| 2017/0268447 A1* | 9/2017 | Surnilla | F02D 41/1458 |
| 2017/0356370 A1* | 12/2017 | Doering | F02D 13/06 |

FOREIGN PATENT DOCUMENTS

| | | |
|---|---|---|
| JP | 1997-303189 A | 11/1997 |
| JP | 11-093814 A | 4/1999 |
| JP | 2002-004899 A | 1/2002 |
| JP | 2002-332893 A | 11/2002 |
| JP | 2003-262139 A | 9/2003 |
| JP | 2004-508484 A | 3/2004 |
| JP | 2005-036808 A | 2/2005 |
| JP | 2007-170405 A | 7/2007 |
| JP | 2008-202545 A | 9/2008 |
| WO | 97/24527 A1 | 7/1997 |
| WO | 2005/086762 A2 | 9/2005 |
| WO | 2014/148192 A1 | 9/2014 |
| WO | 2015107753 A1 | 7/2015 |

OTHER PUBLICATIONS

European Search Report dated Apr. 20, 2018 issued in corresponding EP Application 16827503.0.

* cited by examiner

ENGINE DEVICE

CROSS REFERENCES TO RELATED APPLICATIONS

This application is a national stage application pursuant to 35 U.S.C. § 371 of International Application No. PCT/JP2016/065252, filed on May 24, 2016, which claims priority under 35 U.S.C. § 119 to Japanese Patent Application Nos. 2015-146084 and 2015-146085, both filed on Jul. 23, 2015, the disclosures of which are hereby incorporated by reference in their entireties.

TECHNICAL FIELD

The present invention relates to an engine device to serve as a drive source, and particularly relates to an engine device configured to rotate an output shaft through combustion of a fuel gas.

BACKGROUND ART

Traditionally, diesel engines are used as a drive source of vessels such as tankers or transport ships and onshore power generation facilities. However, the exhaust gas of the diesel engine contains a large amount of nitrogen oxide, sulfur oxides, particulate matter, and the like which are harmful substances hindering preservation of the environment. For this reason, in recent years, gas engines that can reduce the amount of harmful substances generated are becoming prevalent as an alternative engine for diesel engines.

A so-called gas engine that generates power by using a fuel gas such as natural gas supplies a mixed gas obtained by mixing a fuel gas with the air to a cylinder and combust the same (see Patent Literature 1; hereinafter PTL 1). Further, as an engine device combining the characteristics of a diesel engine and characteristics of a gas engine, there is a dual-fuel engine which allows a use of a premixed combustion mode in which a mixture of a gaseous fuel (fuel gas) such as natural gas and air is supplied to a combustion chamber and combusted, in combination with a diffusion combustion mode in which a liquid fuel such as crude oil is injected into the combustion chamber and combusted (see patent Literature 2 and Patent Literature 3; hereinafter, PTL 2 and PTL3, respectively).

For stabilizing the driving operation in a gasoline engine for an automobile, there are disclosures of a control device configured to switch the fuel injection mode based on an estimated frequency of misfires (see Patent Literature 4; hereinafter PTL 4), and a driving method which includes a limit value for an ignition angle as a parameter in a function of a rotation limit, in misfire determination (see Patent Literature 5; PTL 5).

CITATION LIST

Patent Literature

PTL 1: Japanese Patent Application Laid-Open No. 2003-262139
PTL 2: Japanese Patent Application Laid-Open No. 2002-004899
PTL 3: Japanese Patent Application Laid-Open No. 2008-202545
PTL 4: Japanese Patent Application Laid-Open No. 09-303189 (1997)
PTL 5: Japanese Patent Application Laid-Open No. 2005-036808

SUMMARY OF INVENTION

Technical Problem

The dual-fuel engine or the gas engine driven in the premixed combustion mode requires controlling of a proper air-fuel ratio (air flow rate/fuel flow rate) to a proper value, because a knocking region and a misfire region with respect to the air-fuel ratio increase with an increase in the output. If the air-fuel ratio deviates from a proper value, for example, an excessively high air flow rate (a large air-fuel ratio) leads to misfire, causing unstable rotation number of the engine, eventually causing the engine to stop. On the other hand, an excessively low air flow rate (a small air-fuel ratio) causes a knocking, which leads to damage to a component (piston, liner, and the like) of the engine. Knocking takes place when a non-combusting part becomes a high temperature and high pressure, leading to self-ignition, in the process of flame propagation in the cylinder.

Knocking can be avoided by delaying (retarding) the ignition timing. This is because retarding the ignition timing delays the combustion start timing from the proper value, thus slowing the combustion. However, when the combustion operation of the premixed combustion mode is taking place in the gas engine or the dual-fuel engine, avoiding the knocking by retarding the ignition timing causes a problem that the combustion efficiency is lowered.

Particularly, in a large-size engine device for ships and for using in an electric power generator, since the volume of intake manifold is large, the response of the amount of air supplied from the intake manifold delays with respect to the controlled variable. Therefore, unlike the gasoline engine and the like for automobiles, controlling a large-size engine device using the gas engine or the dual-fuel engine based on detection of occurrence of the knocking causes not only a difficulty in setting of the ignition timing according to the required air amount, but also a difficulty in setting the ignition timing according to the current air amount. Therefore, although knocking can be restrained after the occurrence of knocking, there will be not only a problem that the occurrence of knocking cannot be predicted, but also a problem that the combustion efficiency is lowered.

In view of the current circumstances described above, it is a technical object of the present invention to provide an improved engine device.

Solution to Problem

An aspect of the present invention is an engine device including an intake manifold configured to supply air into a cylinder, a gas injector configured to mix fuel gas with air supplied from the intake manifold, and supply mixed gas to the cylinder, and an igniter configured to ignite, in the cylinder, premixed fuel obtained by pre-mixing the fuel gas with the air, the engine device including a controlling unit configured to determine insufficiency in an air amount in the premixed fuel in the cylinder, wherein the controlling unit performs in multiple steps retard control of ignition timing by the igniter, when the air amount is determined as to be insufficient, and performs in multiple steps advance control of the ignition timing, when the air amount is determined as to be sufficient.

The engine device may be adapted so that the controlling unit stops the retard control when a retard limit value is reached in the retard control, and stops the advance control when the ignition timing becomes that of an ordinary operation in the advance control.

The engine device may be adapted so that the controlling unit receives, as a measured pressure, an intake manifold pressure measured in the intake manifold, and determines that the air amount is insufficient when a difference obtained by subtracting the measured pressure from a target pressure which is a target value for the intake manifold is higher than a predetermined differential pressure. The engine device may be adapted so that the controlling unit receives as a measured flow rate an air flow rate measured in the intake manifold, and determines that the air amount is insufficient when a difference obtained by subtracting the measured flow rate from a target flow rate which is a target value for the intake manifold is higher than a predetermined differential flow rate. The engine device may be adapted so that the controlling unit determines that the air amount is insufficient when an output variation amount of the engine is greater than a predetermined amount.

Advantageous Effects of Invention

In an aspect of the present invention, the ignition timing is subjected to retard control in multiple steps when the air amount is insufficient. This can not only reduce the occurrence of knocking, but also prevent the ignition timing from being overly retarded, and suppress deterioration in combustion efficiency. Further, since the ignition timing is set by predicting surplus and shortage in the air amount in the intake manifold, the ignition timing is suitably set even in a structure, such as a large engine, having a large volume intake manifold. Therefore, while deterioration in the combustion efficiency of the engine device can be suppressed, the occurrence of knocking can be suppressed, hence achieving a stable operation.

DESCRIPTION OF EMBODIMENTS

The following description is based on drawings showing an application of a first embodiment embodying the present invention to an electric power generating mechanism mounted in an electric propulsion ship.

Figure 1:
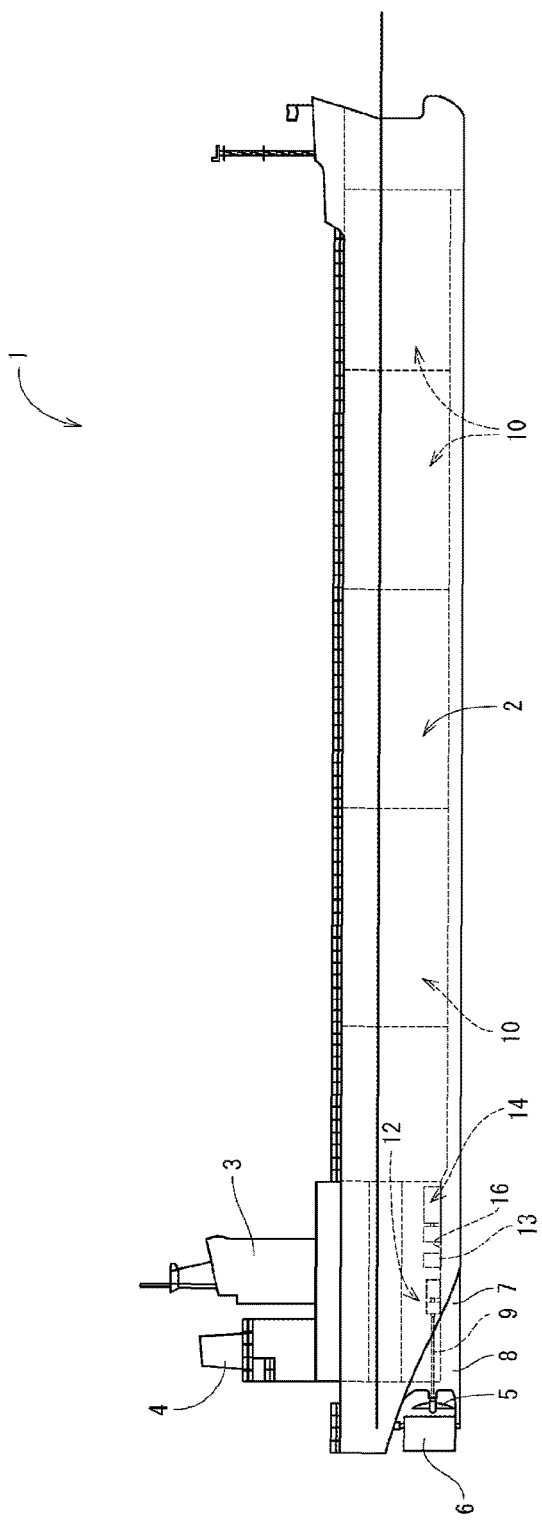
FIG. 1 An overall side view of a ship in a first embodiment of the present invention.
Figure 2:
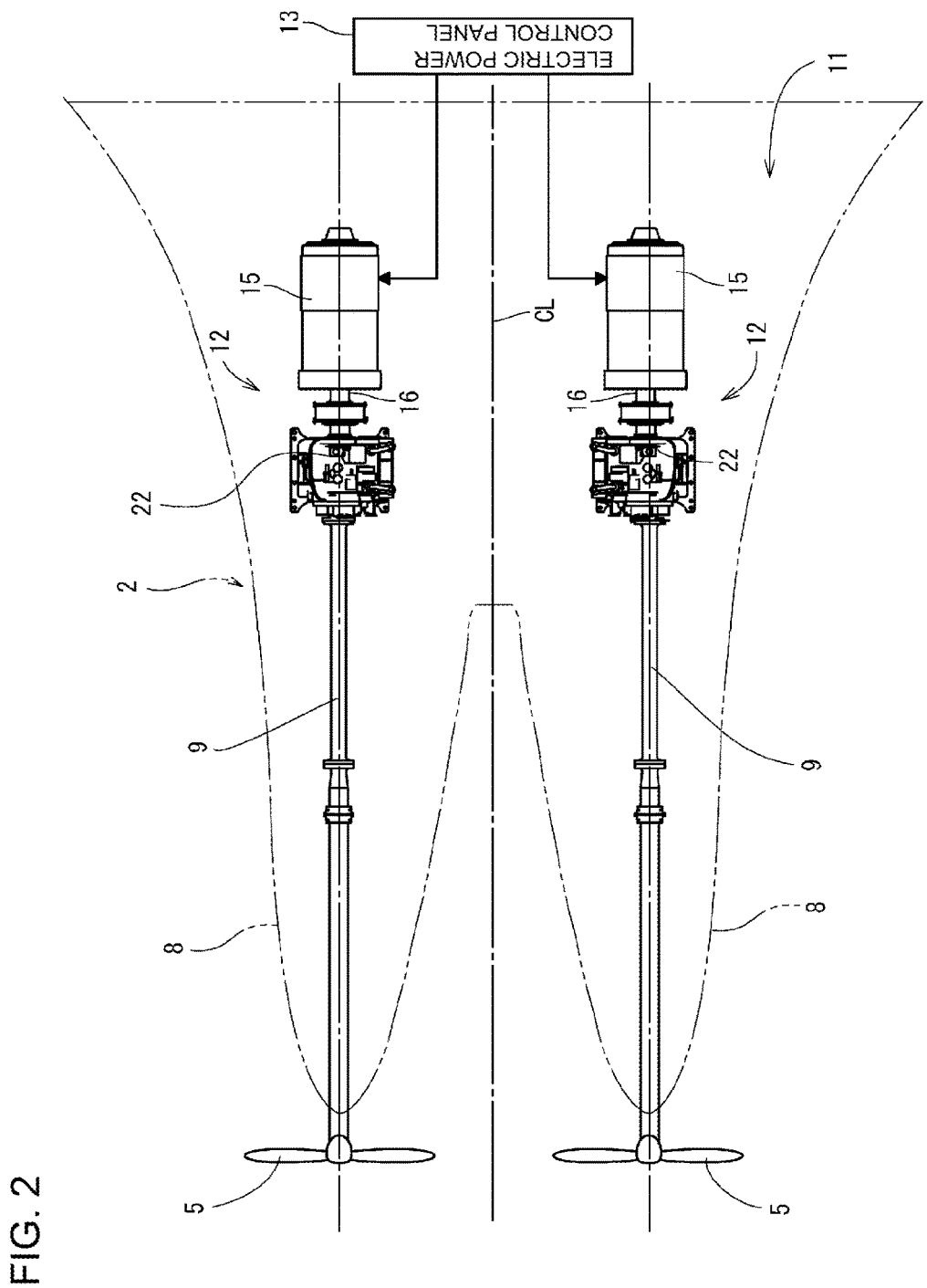
FIG. 2 An explanatory plan view of an engine room.
Figure 3:
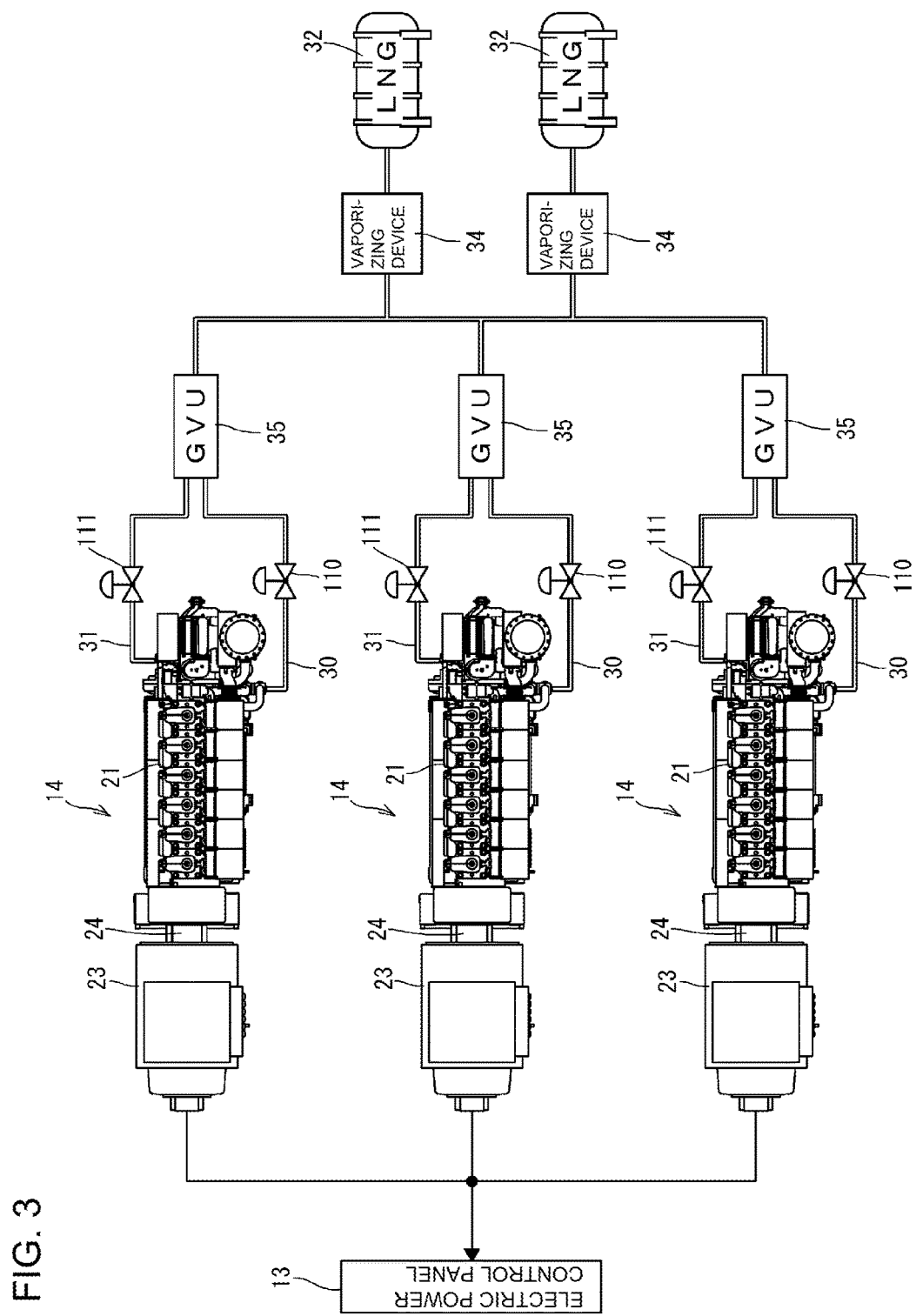
FIG. 3 An explanatory plan view of an engine room.

First, an overview of the ship is described. As shown in FIG. 1 to FIG. 3, the ship 1 of the present embodiment includes: a ship hull 2, a cabin 3 (bridge) provided on the stern side of the ship hull 2, a funnel 4 (chimney) positioned behind the cabin 3, and a pair of propellers 5 and a rudder 6 provided on a lower back portion of the ship hull 2. In this case, a pair of skegs 8 are integrally formed on the ship bottom 7 on the stern side. On each of the skegs 8, a propeller shaft 9 for driving to rotate the propeller 5 is pivotally supported. The skegs 8 are symmetrically formed on the left and right, with respect to the ship hull center line CL (see FIG. 2) which divides the lateral width direction of the ship hull 2. That is, the first embodiment adopts a twin skeg as the stern shape of the ship hull 2.

On a bow side and a middle part of the ship hull 2, a hold 10 is provided. On the stern side of the ship hull 2, an engine room 11 is provided. In the engine room 11, a pair of propulsion mechanisms 12 each serving as a driving source for propeller 5 is positioned on the left and right across the ship hull center line CL. The rotary power transmitted from each propulsion mechanism 12 to the propeller shaft 9 drives and rotates the propeller 5. The engine room 11 includes: an electric power control panel 13 which controls power supply to the propulsion mechanism 12 and the like; and a plurality of electric power generating mechanisms 14 (3 units in the present embodiment) each configured to generate electric power to be supplied through the electric power control panel 13. The inside of the engine room 11 is parted relative to the up and down directions, by a deck and an inner bottom plate. The propulsion mechanisms 12, the electric power control panel 13, and the electric power generating mechanism 14 of the first embodiment are installed on the inner bottom plate at the lower most stage of the engine room 11. It should be noted that, although details are not illustrated, the hold 10 is divided into a plurality of compartments.

As shown in FIG. 2 and FIG. 3, each propulsion mechanism 12 includes: a propulsion motor device 15 (dual-fuel engine, in the embodiment) which serves as a drive source of the propeller 5; and a speed reducer 22 configured to transmit power of the propulsion motor device 15 to the propeller shaft 9. Further, the electric power generating mechanism 14 is a combination of a generator 23 configured to generate electric power to be supplied, and a medium-speed engine device 21 serving as a drive source of the generator 23. The term "medium-speed" engine herein means one that drives at a rotational speed of approximately 500 to 1000 times per minute. In this connection, a "low-speed" engine drives at a rotational speed of 500 times or less per minute, and a "high-speed" engine drives at a rotational speed of 1000 times or more per minute. The engine device 21 of the embodiment is configured to drive at a constant speed within a range of medium-speed (approximately 700 to 750 times per minute).

From the rear surface side of the engine device 21, a rear end side of an engine output shaft 24 protrudes. On the rear end side of the engine output shaft 24, the generator 23 is coupled in such a manner as to be capable of transmitting power. In the electric power generating mechanism 14, the generator 23 is driven and rotated by the engine device 21 so that the generator 23 feeds generated electric power to the electric power control panel 13. The electric power control panel 13 partially supplies the electric power fed from the generator 23 to the propulsion motor device 15, thereby driving and rotating the propulsion motor device 15. Further, the electric power control panel 13 also supplies electric power generated by the generator 23 to an electric system in the ship hull 2 other than the propulsion motor device 15.

The power of the propulsion motor device 15 which is driven to rotate based on the electric power from the electric power control panel 13 is transmitted from the rear end side of the motor output shaft 16 to the propeller shaft 9, via the speed reducer 22. Part of the power of the propulsion motor device 15 is speed-reduced by the speed reducer 22, while being transmitted to the propeller shaft 9. The propeller 5 is driven and rotated by the speed-reduced power from the speed reducer 22. It should be noted that, as the propeller 5, a variable-pitch propeller capable of adjusting the ship speed through changing the blade angles of the propeller blades.

Figure 4:
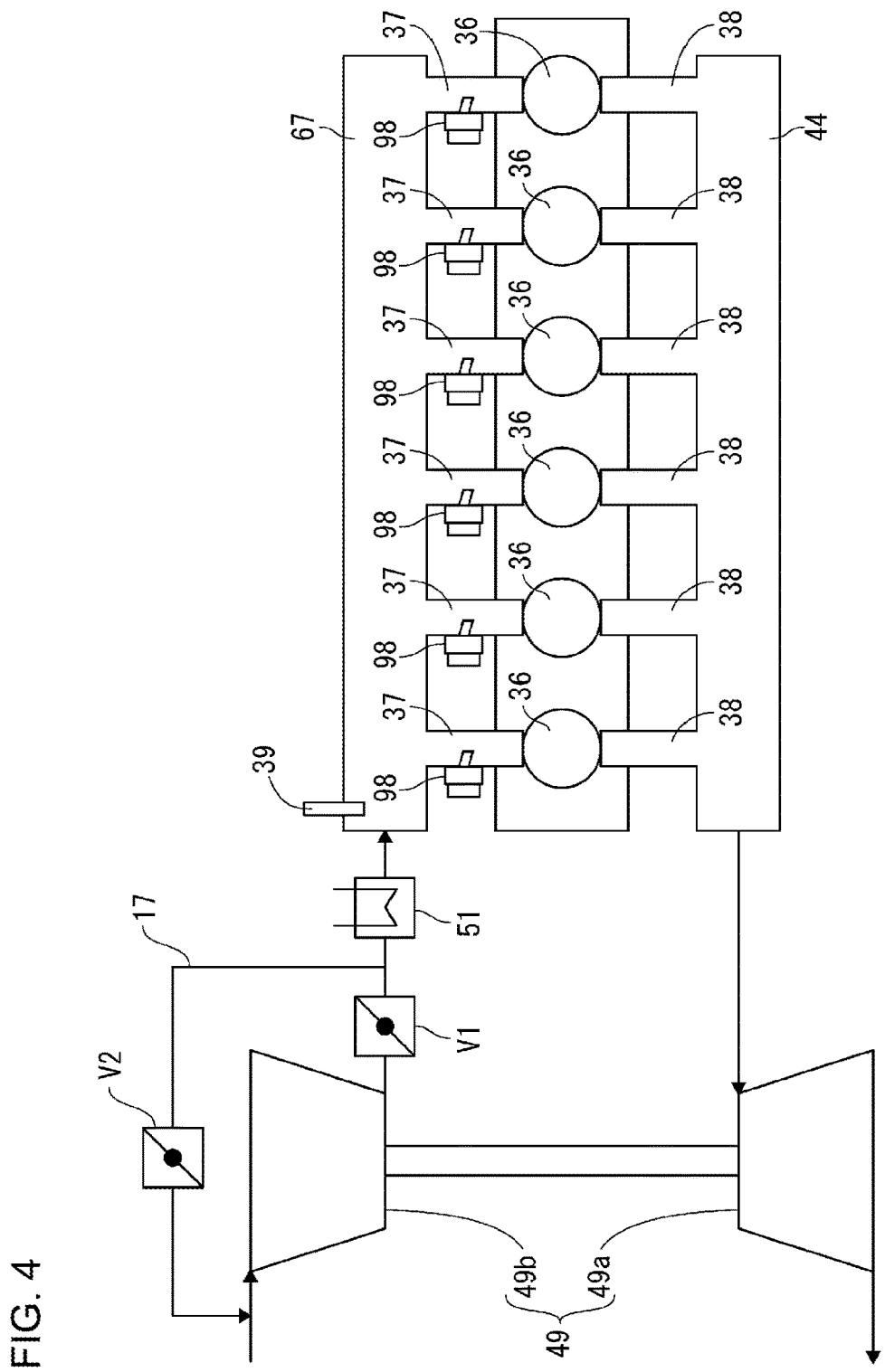
FIG. 4 A schematic view showing a structure of an intake/exhaust passage of an engine device in an embodiment of the present invention.
Figure 5:
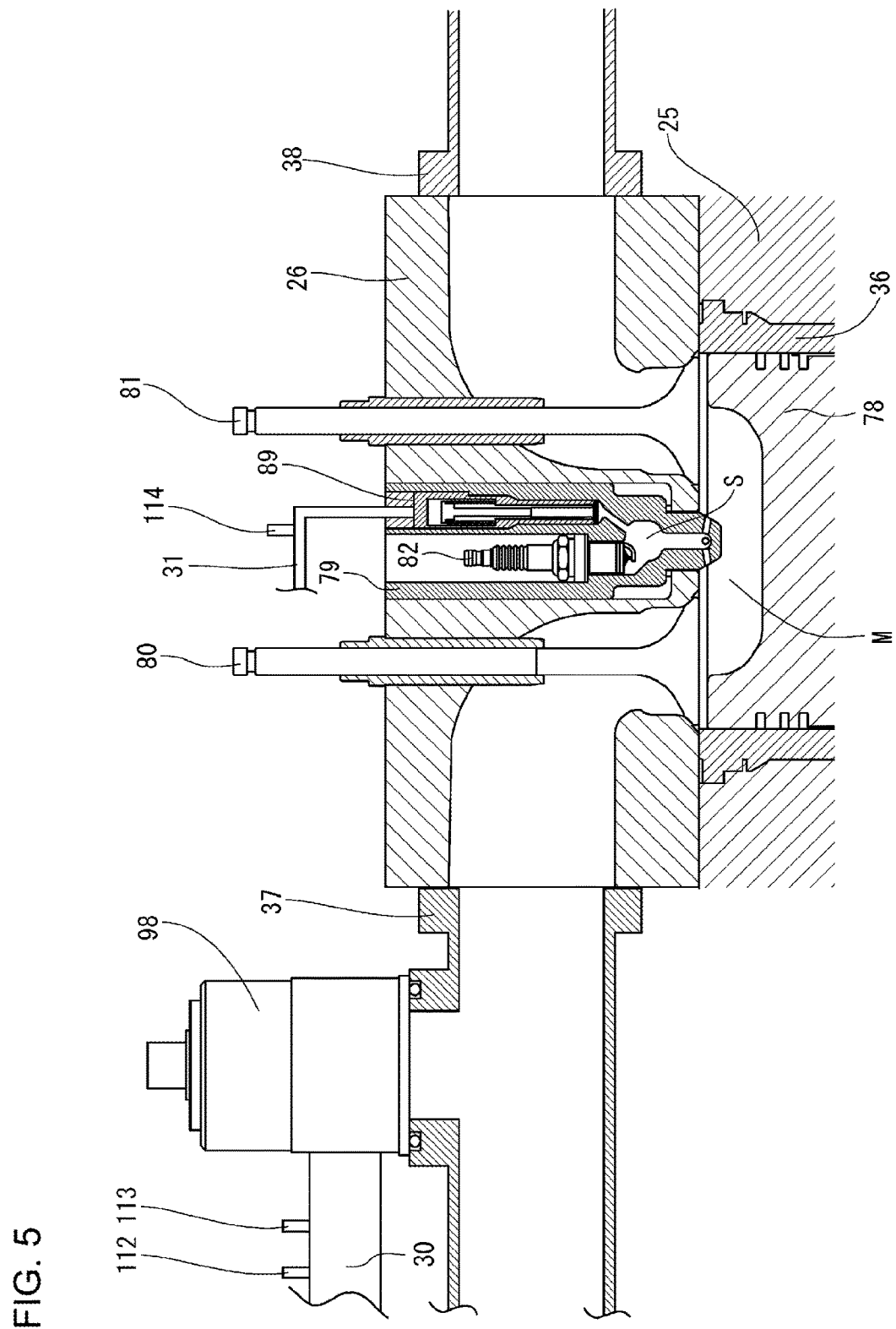
FIG. 5 A schematic view schematically illustrating the inside of a cylinder head in the engine device.
Figure 6:
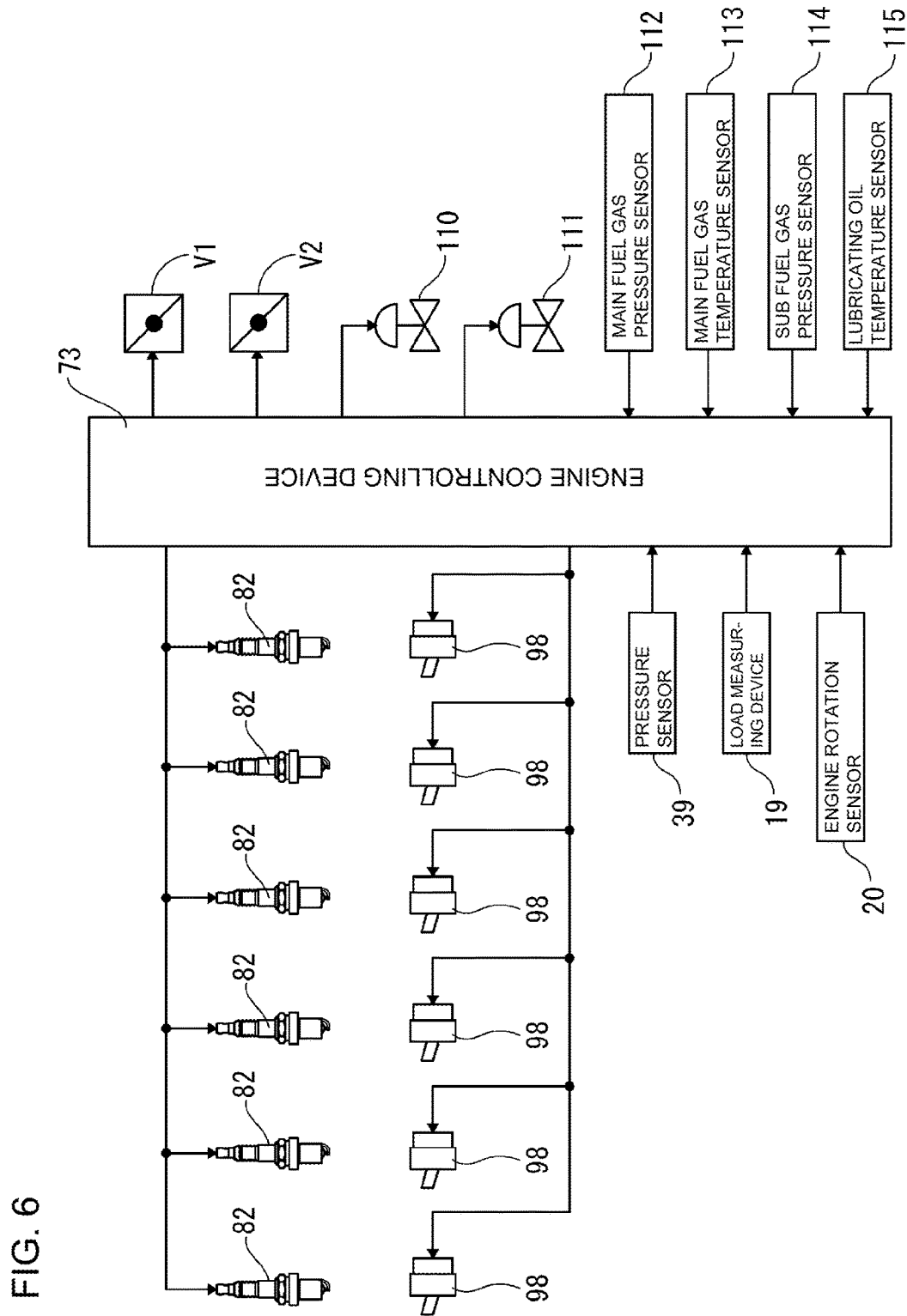
FIG. 6 A control block diagram of the engine device.

Next, the following describes, with reference to FIG. 3 to FIG. 9, a structure of a gas engine which is an engine device used as the electric power generating mechanism 14 in the above-described ship 1. Gas engine devices 21 (hereinafter, simply referred to as "engine device 21") are driven by a premixed combustion mode in which a fuel gas such as natural gas is mixed with the air and then combusted. FIG. 4 shows an intake/exhaust system in the engine device 21. FIG. 5 is a schematic diagram schematizing the inside of a cylinder head in the engine device 21. FIG. 6 is a control block diagram of the engine device 21.

As shown in FIG. 3, each engine device 21 is connected to the gas fuel tank 32 provided in the ship 2 through a vaporizing device 34 and a gas valve unit 35, and constitutes a fuel gas supply passage. The gas fuel tank 32 stores a liquefied fuel gas obtained by liquefying a fuel gas which is a gas. The vaporizing device 34 vaporizes the liquefied fuel (fuel gas) in the gas fuel tank 32 and feeds the vaporized fuel to the engine device 21 through the gas valve unit 35. It should be noted that the gas valve unit 35 has a sealing structure, and that if the fuel gas leaks from a gas pipe, the leakage of the gas can be confirmed by detecting the gas pressure within the unit, and the engine can be urgently stopped.

The engine device 21 is connected to the gas valve unit 35 through a main fuel gas passage 30 and a sub fuel gas passage 31. The main fuel gas passage 30 has a main fuel gas pressure regulator 110, and the gas pressure of the fuel gas to be supplied from the gas valve unit 35 to the engine device 21 is adjusted by the main fuel gas pressure regulator 110. The main fuel gas passage 30 has a main fuel gas pressure regulator 110, and the gas pressure of the fuel gas to be supplied from a later-described gas injector 98 (see FIG. 4) to a main chamber M (FIG. 5) is adjusted by the main fuel gas pressure regulator 110. Further, the sub fuel gas passage 31 has a sub fuel gas pressure regulator 111, and the gas pressure of the fuel gas to be supplied from a later-described check valve 89 (see FIG. 5) to a sub chamber S (FIG. 5) is adjusted by the sub fuel gas pressure regulator 111.

As shown in FIG. 4, the engine device 21 has a structure in which a plurality of cylinders 36 (6 cylinders in the present embodiment) are serially aligned in a later-described cylinder block 25. Each cylinder 36 is in communication with an intake manifold (intake passage) 67 structured in the cylinder block 25, through an intake port 37. Each cylinder 36 is in communication with an exhaust manifold (exhaust gas passage) 44 arranged above the later-described cylinder head 26, through an exhaust port 38. To the intake port 37 of each cylinder 36, a gas injector 98 is arranged.

Therefore, while the air from the intake manifold 67 is supplied to each cylinder 36 through the intake port 37, the exhaust gas from each cylinder 36 is ejected to the exhaust manifold 44 through the exhaust port 38. The fuel gas is supplied from the gas injector 98 to the intake port 37. The fuel gas is then mixed with the air from the intake manifold 67, and a premixed gas is supplied to each cylinder 36. Further, in the intake manifold 67, an intake manifold pressure sensor 39 configured to measure the air pressure in the intake manifold 67 is arranged.

It should be noted that, in the present embodiment, the amount of air in the intake manifold 67 is based on the intake manifold pressure; however, the present invention is not limited to this. For example, the flow rate of air supplied to the intake manifold 67 may be detected by a mass flow meter or an orifice meter, and the amount of the air in the intake manifold 67 may be based on the detected air flow rate.

An exhaust gas outlet side of the exhaust manifold 44 is connected to an exhaust gas inlet of a turbine 49a of a turbocharger 49 is connected. An air inlet side (fresh air inlet side) of the intake manifold 67 is connected to an air ejection port (fresh air outlet) of an intercooler 51. An air inlet port (fresh air inlet) of the intercooler 51 is connected to the air ejection port (fresh air outlet) of a compressor 49b of the turbocharger 49. Between the compressor 49b and the intercooler 51, a main throttle valve V1 is arranged. By adjusting the valve opening degree of the main throttle valve V1, the flow rate of air to be supplied to the intake manifold 67 is adjusted.

A supplied-air bypass passage 17 configured to bypass the compressor 49b connects the air inlet port side (fresh air inlet side) of the compressor 49b with the air inlet side of the intercooler 51. That is, the supplied-air bypass passage 17 is opened to the outside air on the upstream side of the air inlet port of the compressor 49b, while being connected to a connection part of the intercooler 51 to the main throttle valve V1. On this supplied-air bypass passage 17, a supplied-air bypass valve V2 is arranged. By adjusting the valve opening degree of the supplied-air bypass valve V2, the flow rate of air from the downstream side of the main throttle valve V1 into the outside air through the supplied-air bypass passage 17 is adjusted.

As described above, the intake system of the engine device 21 includes: the intake manifold 67, the intercooler 51, the main throttle valve V1, the compressor 49b, and the supplied-air bypass valve V2. In the intake system of the engine device 21, the intercooler 51, the main throttle valve V1, and the compressor 49b are arranged in this order from the intake manifold 67 towards the upstream side of the air flow. The supplied-air bypass valve V2 is provided on the supplied-air bypass passage 17 which is a bypass path that bypasses the compressor 49b. Further, the exhaust system of the engine device 21 includes the exhaust manifold 44 and the turbine 49a. The turbine 49a is arranged from the exhaust manifold 44 towards the downstream side of the flow of the exhaust gas.

As shown in FIG. 5, the engine device 21 has cylinders 36 installed in the cylinder block 25, and each cylinder 36 houses therein a piston 78 in a slidable manner. The cylinder head 26 is arranged in the upper part of the cylinder block 25, and an igniter 79 is inserted in the cylinder head 26. On the outer circumference side of the igniter 79, an intake valve 80 and an exhaust valve 81 are installed in a slidable manner. In the igniter 79, the sub chamber S is formed on the lower end side of the igniter 79. Further, in the igniter 79, a spark plug 82 and a check valve 89 are inserted so that their leading ends are positioned above the sub chamber S. In the cylinder 36, a main chamber M is formed which is surrounded by the lower side of the cylinder head 26 and the top portion of the piston 78.

That is, in the cylinder block 25, cylinder 36 having a cylindrical shape is inserted. By having the piston 78 reciprocating in the up-down directions in the cylinder 36, the engine output shaft 24 on the lower side of the cylinder 36 is rotated. On each cylinder head 26 on the cylinder block 25, the igniter 79 having the spark plug 82 and the check valve 89 is inserted with its leading end directed to the cylinder 36. This igniter 79 has its leading end in the center position of the upper end surface of the cylinder 36, and the check valve 89 is connected to the sub fuel gas passage 31. Therefore, when the engine device 21 is driven, the fuel gas injected from the check valve 89 is ignited by the spark of the spark plug 82 in the sub chamber S of the igniter 79, thereby generating an ignition flame (combustion gas) in the center position of the main chamber M in the cylinder 36.

In the intake port 37, a gas injector 98 is arranged, and the gas injection nozzle of the gas injector 98 is inserted in the air passage in the intake port 37. Further, the gas injector 98 is connected to the main fuel gas passage 30. In the air passage in the intake port 37, the fuel gas injected from the gas injection nozzle of the gas injector 98 is mixed with the air flowing in from the intake manifold 67. Therefore, when the intake valve 80 is opened, premixed gas obtained by mixing the air from the intake manifold 67 with the fuel gas from the gas injector 98 flows into the main chamber M.

In each cylinder head 26, the intake port 37 opens and closes with up and down movement of the intake valve 80, and the exhaust port 38 opens and closes with up and down movement of the exhaust valve 81. That is, when the intake valve 80 opens, the air from the intake manifold 67 is taken into the main chamber M in the cylinder 36 through the intake port 37. On the other hand, when the exhaust valve 81 opens, the combustion gas (exhaust in the main chamber M in the cylinder 36 is exhausted to the exhaust manifold 44 through the exhaust port 38. Therefore, when the engine device 21 is driven, an ignition flame (combustion gas) is generated by the igniter 79, which leads to reaction of the premixed gas supplied to the main chamber M in the cylinder 36 through the intake valve 80, thus causing premixed combustion.

That is, when the engine device 21 is driven, the gas injector 98 injects the fuel gas into the intake port 37. Therefore, in the intake port 37, the fuel gas injected from the gas injector 98 is mixed with the air flowing in from the intake manifold 67. The mixture gas obtained by mixing the air with the fuel gas therefore flows towards the intake valve 80 through the intake port 37. At this time, by opening the intake valve 80, the mixture gas is taken into the main chamber M in the cylinder 36. Then, after the intake valve 80 is closed and the piston 78 is slid to compress the mixture gas in the main chamber M, an ignition flame generated by the igniter 79 is injected in the main chamber M, to combust the mixture gas in the main chamber M. After that, the exhaust valve 81 is opened to exhaust the combustion gas (exhaust gas) in the main chamber M to the exhaust manifold 44 through the exhaust port 38 in the cylinder head 26.

In the main fuel gas passage 30, a main fuel gas pressure sensor 112 and a main fuel gas temperature sensor 113 for measuring the gas pressure and the gas temperature of the combustion gas in the passage are installed. Based on a measurement result by the main fuel gas pressure sensor 112, the flow rate of the fuel gas supplied from the gas injector 98 to the intake port 37 is measured. Further, with the main fuel gas temperature sensor 113, the temperature of the fuel gas supplied from the gas injector 98 is measured. In the sub fuel gas passage 31, a sub fuel gas pressure sensor 114 for measuring the gas pressure of the fuel gas in the passage is installed. Based on a measurement result by the sub fuel gas pressure sensor 114, the flow rate of the fuel gas supplied to the check valve 89 is measured.

As shown in FIG. 6, the engine device 21 has an engine controlling device 73 configured to control each part of the engine device 21, and for each cylinder 36, the spark plug 82 and the gas injector 98 are provided. The engine controlling device 73 provides control signals to the spark plug 82 and the gas injector 98 to control ignition by the spark plug 82 and supply of fuel gas by the gas injector 98.

The engine controlling device 73 controls the main fuel gas pressure regulator 110 and the sub fuel gas pressure regulator 111 to adjust the gas pressure (gas flow rate) of the fuel gas supplied from the main fuel gas passage 30 and the sub fuel gas passage 31. The engine controlling device 73 provides control signals to the main throttle valve V1 and the supplied-air bypass valve V2 to adjust their valve opening degrees, thereby adjusting the air pressure (intake manifold pressure) in the intake manifold 67.

The engine controlling device 73 calculates the load imposed to the engine device 21, based on a measurement signal from a load measuring device (load detection sensor) 19 such as a watt transducer and a torque sensor. The engine controlling device 73 detects the engine rotation number of the engine device 21, based on a measurement signal from an engine rotation sensor 20 such as a pulse sensor configured to measure the rotation number of the engine output shaft (crank shaft) 24. The engine controlling device 73 detects the pressure based on a measurement signal from the intake manifold pressure sensor (pressure sensor) 39 configured to measure the air pressure in the intake manifold 67. The engine controlling device 73 detects the lubricating oil temperature Tj of a lubricating oil circulated in the engine device 21, based on a measurement signal from a lubricating oil temperature sensor The engine controlling device 73 receives measurement signals from the main fuel gas pressure sensor 112 which detects fuel gas pressure (main chamber gas pressure) Pm, the fuel gas temperature sensor 113 which detects fuel gas temperature Tm, and the sub fuel gas pressure sensor 114 which detects sub fuel gas pressure (sub chamber gas pressure) Ps as a sub chamber fuel flow rate The engine controlling device 73 drives and controls the main fuel gas pressure regulator 110 based on the measurement signals from the main fuel gas pressure sensor 112 and the main fuel gas temperature sensor 113, to adjust the flow rate of the main fuel gas supplied to the gas injector 98 of each intake port 37. The engine control device 73 drives and controls the sub fuel gas pressure regulator 111 based on the measurement signal from the sub fuel gas pressure sensor 114 to adjust the flow rate of sub fuel gas supplied to the check valve 89 of each igniter 79.

The engine controlling device 73 adjusts a valve-open period of the gas injector 98 to set the flow rate of fuel gas supplied to the main chamber M of each cylinder 36. The engine controlling device 73 then controls ignition operation of the spark plug 82, to cause combustion in each cylinder 36 at a predetermined timing. That is, the gas injector 98 supplies the fuel gas to the intake port 37, at a flow rate based on the valve opening degree, mix the fuel gas with the air from the intake manifold 67, and supplies the premixed fuel to the cylinder 36. Then, at the injection timing of each cylinder 36, the sub fuel gas supplied from the check valve 89 to the sub chamber S in the igniter 79 is ignited by the spark plug 82. The combustion gas generated in this igniter 79 is injected into the main chamber M, and combusted in the cylinder 36 in which the premixed gas is supplied.

Figure 7:
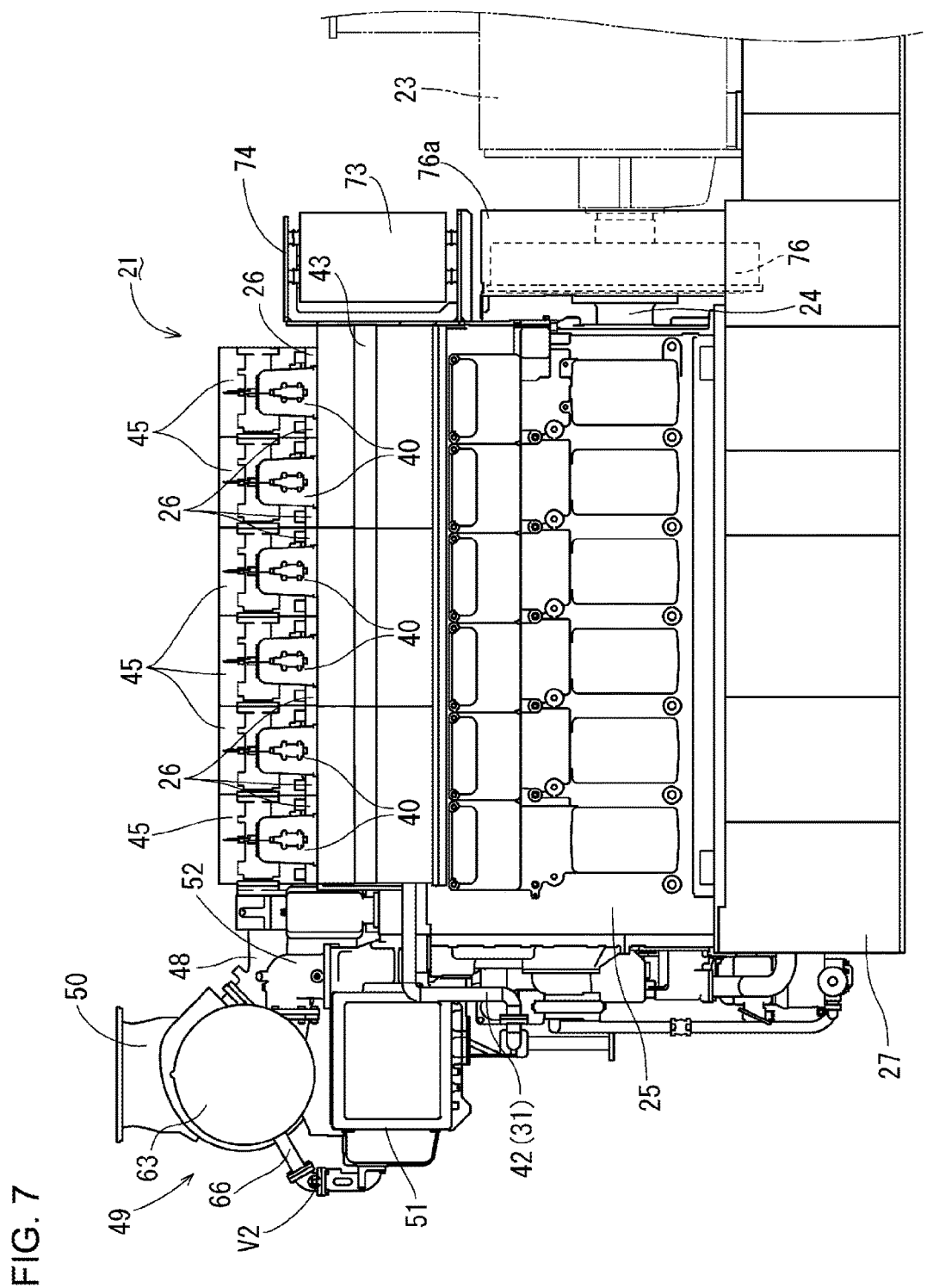
FIG. 7 A side view of the engine device.
Figure 8:
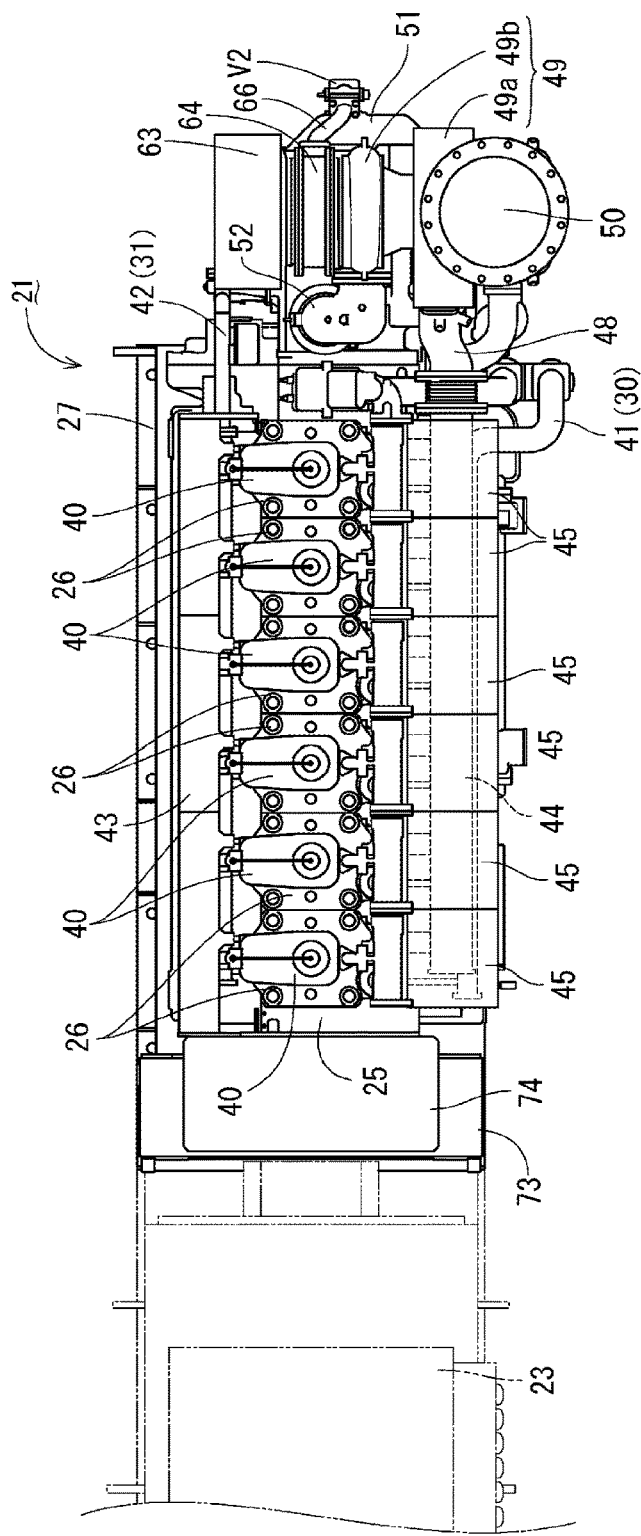
FIG. 8 A plan view of the engine device.
Figure 9:
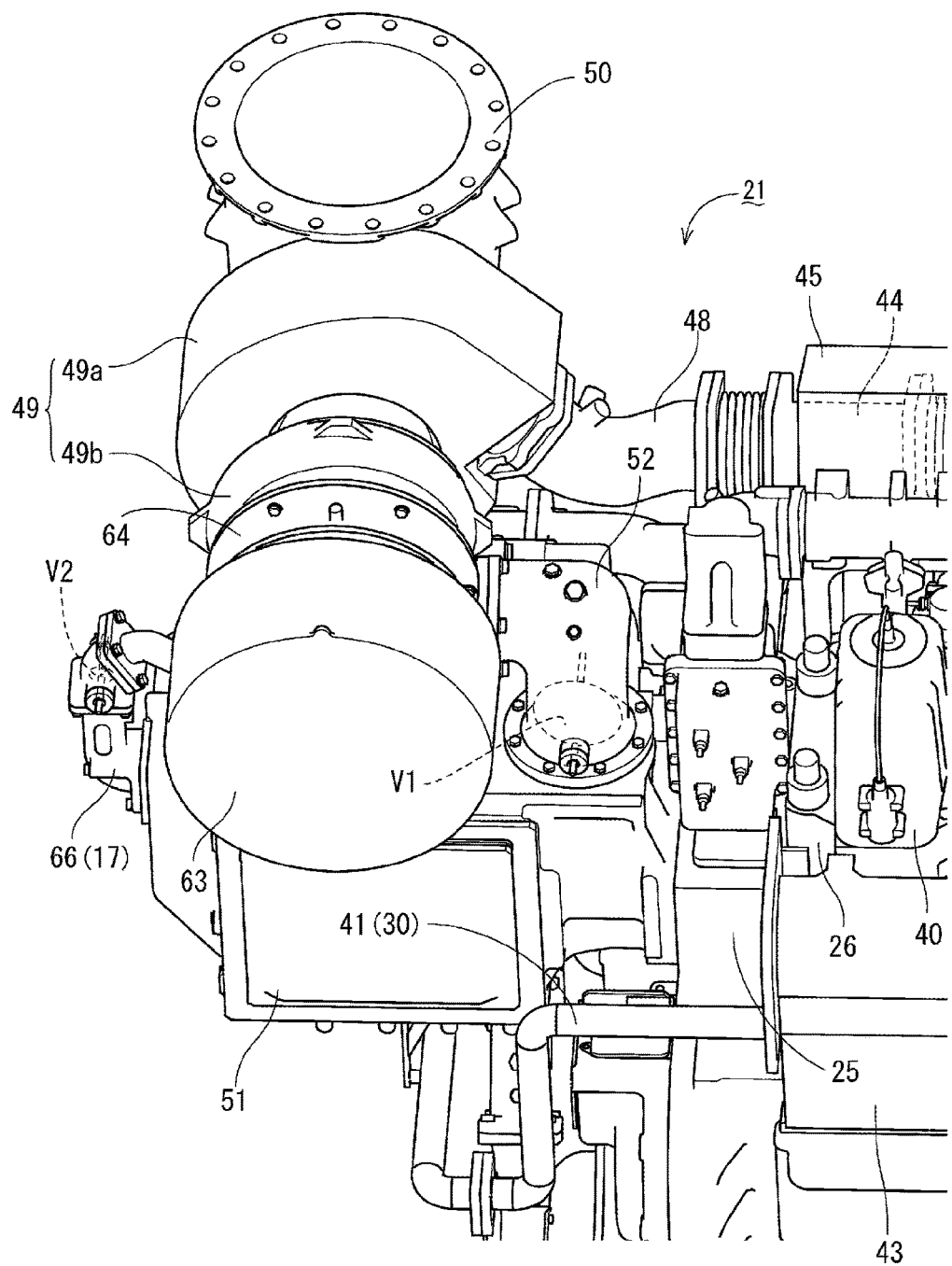
FIG. 9 An enlarged perspective view of the engine device.

Next, the following describes an exterior structure of the gas engine device 21 (engine device 21) with reference to FIG. 7 to FIG. 9. In the following description, the positional relationship of the front, rear, left, and right in the structure of the engine device 21 are designated with the side connecting to the generator 23 as the rear side.

As shown in FIG. 7 and FIG. 8, the engine device 21 has the engine output shaft 24 in the cylinder block 25 which is fixed on a base mount 27, and the cylinder heads 26 in which a plurality of head covers 40 are aligned in one array in front-rear directions are mounted on the cylinder block 25. In the engine device 21, a main fuel gas pipe 41 which is a part of the main fuel gas passage 30 extends parallel to the array of head covers 40 on the right side face of the cylinder heads 26, and a sub fuel gas pipe 42 which is a part of the sub fuel gas passage 31 extends parallel to the array of head covers 40 on the left side face of the cylinder block 25.

On the upper side of the main fuel gas pipe 41, the exhaust manifold (exhaust gas passage) 44 extends parallel to the array of the head covers 40, and the outer circumference of this exhaust manifold 44 is covered by a thermal insulation cover 45. The thermal insulation cover 45 is structured so as to cover the outer circumferential surface and the trailing end of the exhaust manifold 44. An air layer formed between this thermal insulation cover 45 and the exhaust manifold 44 functions as a thermal insulation layer, and reduces influence of exhaust heat from the exhaust manifold 44 to the surroundings. Further, on the left side face of the cylinder block 25, there is a side cover 43 arranged to cover the sub fuel gas pipe 42.

As shown in FIG. 7 to FIG. 9, the front end of the exhaust manifold 44 (exhaust gas outlet side) is connected to the turbocharger 49 via an exhaust gas relay pipe 48. Therefore, exhaust gas exhausted through the exhaust manifold 44 flows into the turbine 49a of the turbocharger 49 through the exhaust gas relay pipe 48, thus rotating the turbine 49a and rotating the compressor 49b on the same shaft as the turbine 49a. The turbocharger 49 is arranged on the upper side of the front end of the engine device 21, and has the turbine 49a on its right side, and the compressor 49b on the left side. An exhaust gas outlet pipe 50 is arranged on the right side of the turbocharger 49, and is connected to the exhaust gas outlet of the turbine 49a, to output exhaust gas from the turbine 49a.

On the lower side of the turbocharger 49, an intercooler 51 that cools down a compressed air from the compressor 49b of the turbocharger 49 is arranged. That is, on the front end side of the cylinder block 25, the intercooler 51 is installed, and the turbocharger 49 is placed in the upper part of the intercooler 51. In the laterally middle layer position of the turbocharger 49, the air ejection port of the compressor 49b is provided so as to be open rearwards (towards the cylinder block 25). On the other hand, on the top surface of the intercooler 51, an air inlet port is provided which opens upward, and through this air inlet port, compressed air ejected from the compressor 49b flows into the intercooler 51. The air ejection port of the compressor 49b and the air inlet port of the intercooler 51 are in communication with each other through a supplied-air relay pipe 52 two which one ends of the ports are connected. In the supplied-air relay pipe 52, the main throttle valve V1 is pivotally supported.

The turbocharger 49 pivotally supports, on the same shaft, the compressor 49b and the turbine 49a arranged on the left and right. Based on rotation of the turbine 49a introduced from the exhaust manifold 44 through the exhaust gas relay pipe 48, the compressor 49b is rotated. Further, the turbocharger 49 has, on the left side of the compressor 49b serving as fresh air intake side, an intake filter 63 which removes dust from outside air introduced and a fresh air passage pipe 64 connecting the intake filter 63 and the compressor 49b. By having the compressor 49b rotate in sync with the turbine 49a, the outside air (air) taken in to the intake filter 63 is introduced into the compressor 49b through the turbocharger 49. The compressor 49b then compresses the air taken in from the left side and ejects the compressed air to the supplied-air relay pipe 52 installed on the rear side.

The supplied-air relay pipe 52 has its upper front portion opened and connected to the ejection port on the rear of the compressor 49b, and has its lower side opened and connected to the inlet port on the top surface of the intercooler 51. Further, at a branching port provided on an air passage on the front surface of the intercooler 51, one end of a supplied-air bypass pipe 66 (supplied-air bypass passage 17) is connected, and a part of compressed air cooled by the intercooler 51 is ejected to the supplied-air bypass pipe 66. Further, the other end of the supplied-air bypass pipe 66 is connected to a branching port provided on the front surface of the fresh air passage pipe 64, and a part of the compressed air cooled by the intercooler 51 is circulated to the fresh air passage pipe 64 through the supplied-air bypass pipe 66, and merges with the outside air from the supplied-air filter 63. Further, the supplied-air bypass pipe 66 pivotally supports, on its midway portion, the supplied-air bypass valve V2.

In the intercooler 51, compressed air from the compressor 49b flows in from the left rear side through the supplied-air relay pipe 52, and the compressed air is cooled through a heat exchanging action with cooling water supplied from water-supply pipe 62. The compressed air cooled on a left chamber inside the intercooler 51 flows in the air passage on the front and is introduced into a right chamber, and then ejected to the intake manifold 67 (see FIG. 4) through an ejection port provided on the rear of the right chamber.

Further, the turbine 49a of the turbocharger 49 connects the inlet port at the rear with the exhaust gas relay pipe 48, and connects the ejection port on the right side with the exhaust gas outlet 50. This way, in the turbocharger 49, exhaust gas is introduced to the inside of the turbine 49a from the exhaust manifold 44 through the exhaust gas relay pipe 48, thus rotating the turbine 49a as well as the compressor 49b, and is exhausted from the exhaust gas outlet 50. The exhaust gas relay pipe 48 has its rear side opened and connected with the ejection port of the exhaust manifold 44, while having its front side opened and connected to the inlet port on the rear side of the turbine 49a.

Further, the engine controlling device 73 configured to control operations of each part of the engine device 21 is fixed on the trailing end surface of the cylinder block 25 through a supporting stay (supporting member 74). On the rear end side of the cylinder block 25, there is installed a flywheel 76 connected to the generator 23 to rotate, and the engine control device 73 is arranged in an upper part of a flywheel housing 76a covering the flywheel 76. The engine control device 73 is electrically connected to sensors (a pressure sensor and a temperature sensor) in each part of the engine device 21 to collect temperature data, pressure data, and the like of each part of the engine device 21, and provides electromagnetic signals to an electromagnetic valve and the like of each part of the engine device 21 to control various operations (plug ignition, gas pressure adjustment, valve opening degree adjustment, gas injection, cooling water temperature adjustment, and the like) of the engine device 21.

As described above, in the engine device 21 of the present embodiment, the main throttle valve V1 is provided at the connecting portion between the air outlet of the turbocharger 49 and the inlet of the intercooler 51. Further, the engine device 21 has a supplied-air bypass pipe 66 connecting the air flow inlet port of the turbocharger 49 and the inlet of the intercooler 51, and the supplied-air bypass valve V2 is arranged in the supplied-air bypass pipe 66. With the structure including the main throttle valve V1 and the supplied-air bypass valve V2, the air flow rate of the intake manifold 67 can be controlled with high accuracy, and hence the air flow rate can be controlled with good responsiveness with respect to load fluctuations. Since the supplied-air bypass pipe 66 functions as a buffer passage for the compressor 49b and the intake manifold 67 of the turbocharger 49, controlling the opening degree of the supplied-air bypass valve V2 enable increasing the response speed for setting the air flow rate suitable with an increase and decrease in the load.

When the engine load is increased, the engine controlling device 73 executes opening degree control of the supplied-air bypass valve V2 to set the flow rate of air supplied to the intake manifold 67. By executing bypass valve control when the load is high, the flow rate of air passing the main throttle valve V1 is suitably controlled, and therefore insufficient flow rate of air supplied to the intake manifold 67 is prevented. Since the air flow rate can be controlled with a good responsiveness with respect to a rapid increase in the load, it is possible to achieve a suitable air-fuel ratio, which stabilizes the operation of the engine device 21.

When the engine load is decreased, the engine controlling device 73 executes the opening degree control of the supplied-air bypass valve V2 to set the flow rate of air supplied to the intake manifold 67. In cases of control only with the main throttle valve V1 when the load is low, the air flow rate is rapidly reduced on the outlet side of the compressor 49b of the turbocharger 49, leading to surging in which the air in the compressor 49b is reversed. However, by controlling the supplied-air bypass valve V2 at the same time, the air pressure in the inlet and outlet of the compressor 49b is stabilized, and the surging therefore can be prevented.

Further, in the engine device 21 of the present embodiment, the engine controlling device 73 executes the opening degree control of the main throttle valve V1, when the engine load is in a low load range. On the other hand, when the engine load is in the middle/high load range, the engine controlling device 73 sets the main throttle valve V1 to a predetermined opening degree, and executes the opening degree control of the supplied-air bypass valve V2. Since a bypass valve control with good responsiveness is executed in the middle/high load range where the influence from the load fluctuation is significant, excess or shortage of the air flow rate with respect to the load fluctuation is restrained, and the engine device 21 can be smoothly operated.

Figure 10:
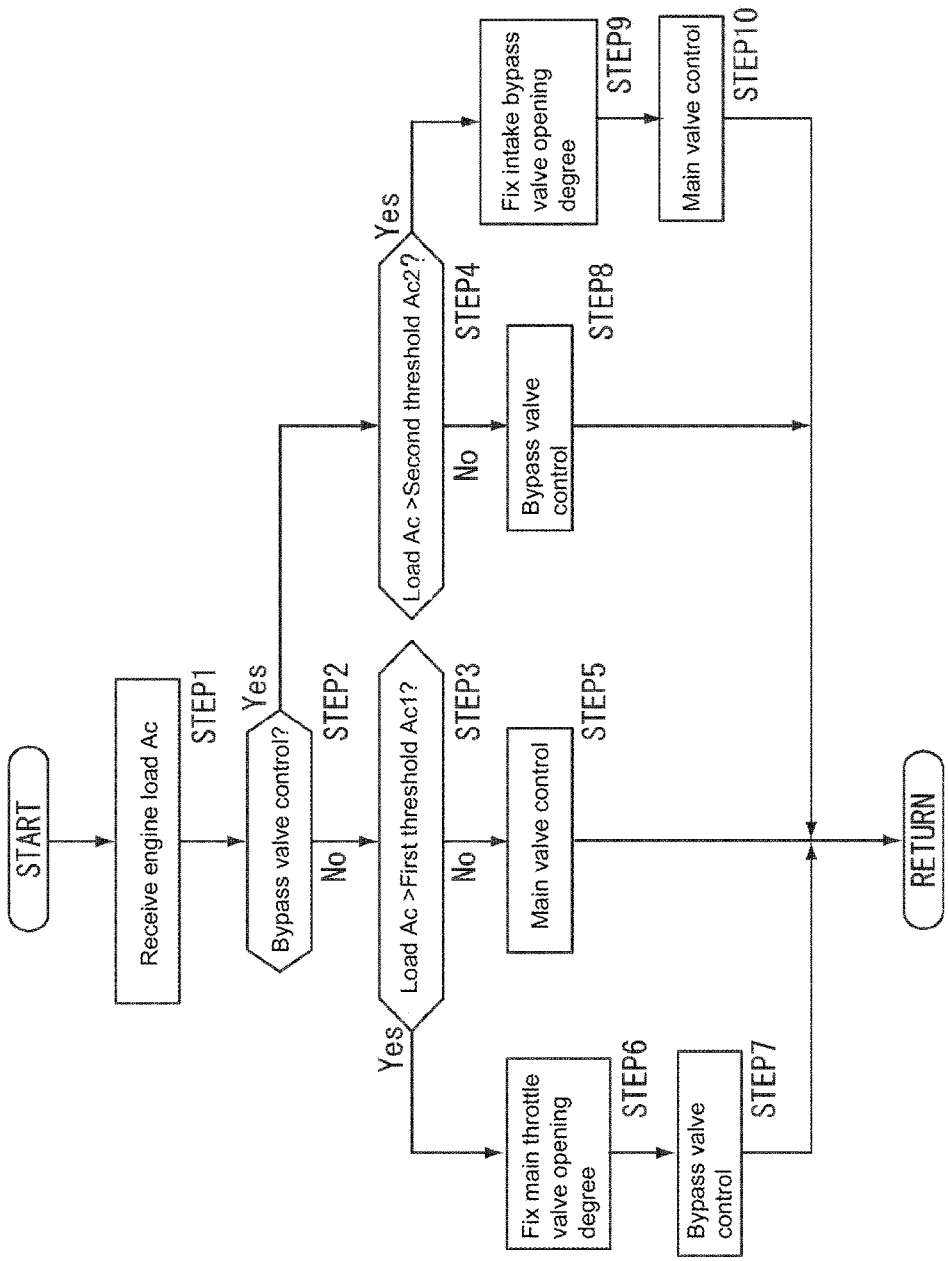
FIG. 10 A flowchart showing operations in an air flow rate control of the engine device.

As shown in the flowchart of FIG. 10, when a measurement signal from the load measuring device (load detection sensor) 19 is received (STEP 1), the engine control device 73 confirms whether or not the opening degree control of the supplied-air bypass valve V2 (bypass valve control) is executed (STEP 2). When the bypass valve control is not executed (No in STEP 2), the engine control device 73 compares the engine load Ac with a predetermined load (first threshold) Ac1 (STEP 3), based on the measurement signal received in STEP 1. On the other hand, when the bypass valve control is not executed (Yes in STEP 2), the engine control device 73 compares the engine load Ac with a predetermined load (second threshold) Ac2 (0<Ac2<Ac1) (STEP 4), based on the measurement signal received in STEP 1.

When the engine load Ac is not more than the predetermined load Ac1 (No) in STEP3, the engine controlling device 73 determines that the engine load Ac is in the low load range, and performs feedback control (PID control) with respect to the valve opening degree of the main throttle valve V1 (STEP5). At this time, the engine controlling device 73 sets a target value (target pressure) of the intake manifold pressure according to the engine load. Then, the engine controlling device 73 receives a measurement signal from the pressure sensor 39 and confirms the measured value (measured pressure) of the intake manifold pressure to obtain the difference from the target pressure. This way, based on the difference value between the target pressure and the measured pressure, the engine controlling device 73 executes the PID control of the valve opening degree of the main throttle valve V1 to bring the air pressure of the intake manifold 67 close to the target pressure. Hereinafter, the opening degree control of the main throttle valve V1 is referred to as "main valve control".

On the other hand, when the engine load Ac is more than the predetermined engine load Act (Yes) in STEP3, the engine controlling device 73 determines that the engine load Ac is in the middle/high load range, and fixes the valve opening degree of the main throttle valve V1 to a predetermined opening degree (STEP6). Then, the engine controlling device 73 performs the feedback control (PID control) with respect to the valve opening degree of the supplied-air bypass valve V2 (STEP7). At this time, the engine controlling device 73 receives a measurement signal from the pressure sensor 39, and executes the PID control of the valve opening degree of the supplied-air bypass valve V2 based on the difference value between the target pressure and the measured pressure, to bring the air pressure of the intake manifold 67 to the target pressure, as in the case of the main valve control.

That is, when the engine load Ac is increasing and exceeds the predetermined load Ac1, the engine controlling device 73 switches the main valve control to the bypass valve control as pressure control for the intake manifold pressure. Further, in the present embodiment, when the load increases and exceeds the predetermined load Ac1, the engine controlling device 73, in STEP4, fully opens the main throttle valve V1 and controls the air flow rate in the supplied-air bypass passage 17 through the opening degree control of the supplied-air bypass valve V2 thereby adjusting the air supply manifold pressure. Since a bypass valve control with good responsiveness is executed in the middle/high load range where the influence from the load fluctuation is significant, excess or shortage of the air flow rate with respect to the load fluctuation is restrained, and a suitable air-fuel ratio can be set.

When the engine load Ac is not less than the predetermined load Ac2 (No) in STEP4, the engine controlling device 73 determines that the engine load Ac is in the middle/high load range, and continues the feedback control (bypass valve control) with respect to the valve opening degree of the supplied-air bypass valve V2 (STEP8). On the other hand, when the engine load Ac is below the predetermined engine load Ac2 (Yes) in STEP4, the engine controlling device 73 determines that the engine load Ac is in the low load range, and fixes the valve opening degree of the supplied-air bypass valve V2 to a predetermined opening degree (STEP9). Then, the engine controlling device 73 performs the feedback control (main valve control) with respect to the valve opening degree of the main throttle valve V1 (STEP10).

That is, when the engine load L is dropping and falls short of the predetermined load Ac2 which is higher than the predetermined load Ac1, the engine control device 73 switches the main valve control to the bypass valve control as pressure control for the intake manifold pressure. As described, regarding the switching of the pressure control of the intake manifold pressure, the switching operation can be smoothly executed by giving hysteresis to threshold values for the time of load increasing and the time of load decreasing.

Figure 11:
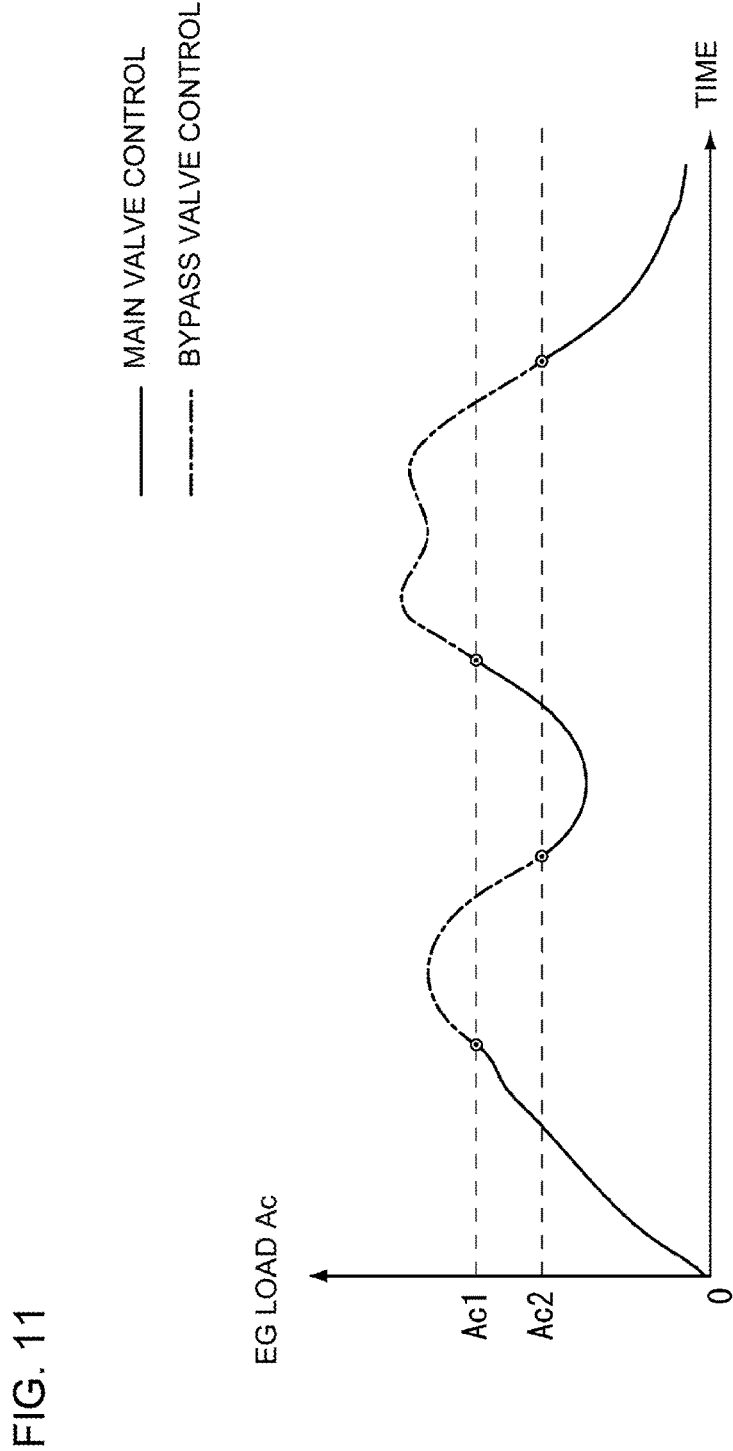
FIG. 11 A time chart showing operations in the air flow rate control of the engine device.

As shown in FIG. 11, in the engine device 21 of the present embodiment, when the engine load Ac increases, the engine controlling device 73 executes the opening degree control for the main throttle valve V1 while the engine load Ac is lower than the first threshold Ac1, and switches from the opening degree control for the main throttle valve to the opening degree control for the supplied-air bypass valve V2, when the engine load Ac exceeds the first threshold Ac1. On the other hand, when the second Ac decreases, the engine controlling device 73 executes the opening degree control for the supplied-air bypass valve V2 while the engine load Ac is not less than the second threshold Ac2 which is lower than the first threshold Ac1, and switches from the opening degree control for the supplied-air bypass valve V2 to the opening degree control for the main throttle valve V1, when the engine load Ac falls short of the second threshold Ac2.

With the structure including the main throttle valve V1 and the supplied-air bypass valve V2, the air flow rate of the intake manifold 67 can be controlled with high accuracy, and hence the air flow rate can be controlled with good responsiveness with respect to load fluctuations. Since a bypass valve control with good responsiveness is executed in the high load range where the influence from the load fluctuation is significant, excess or shortage of the air flow rate with respect to the load fluctuation is made small, thus enabling stable operation. Further, by providing hysteresis in the threshold for control switching, switching of control can be smoothly executed.

Figure 12:
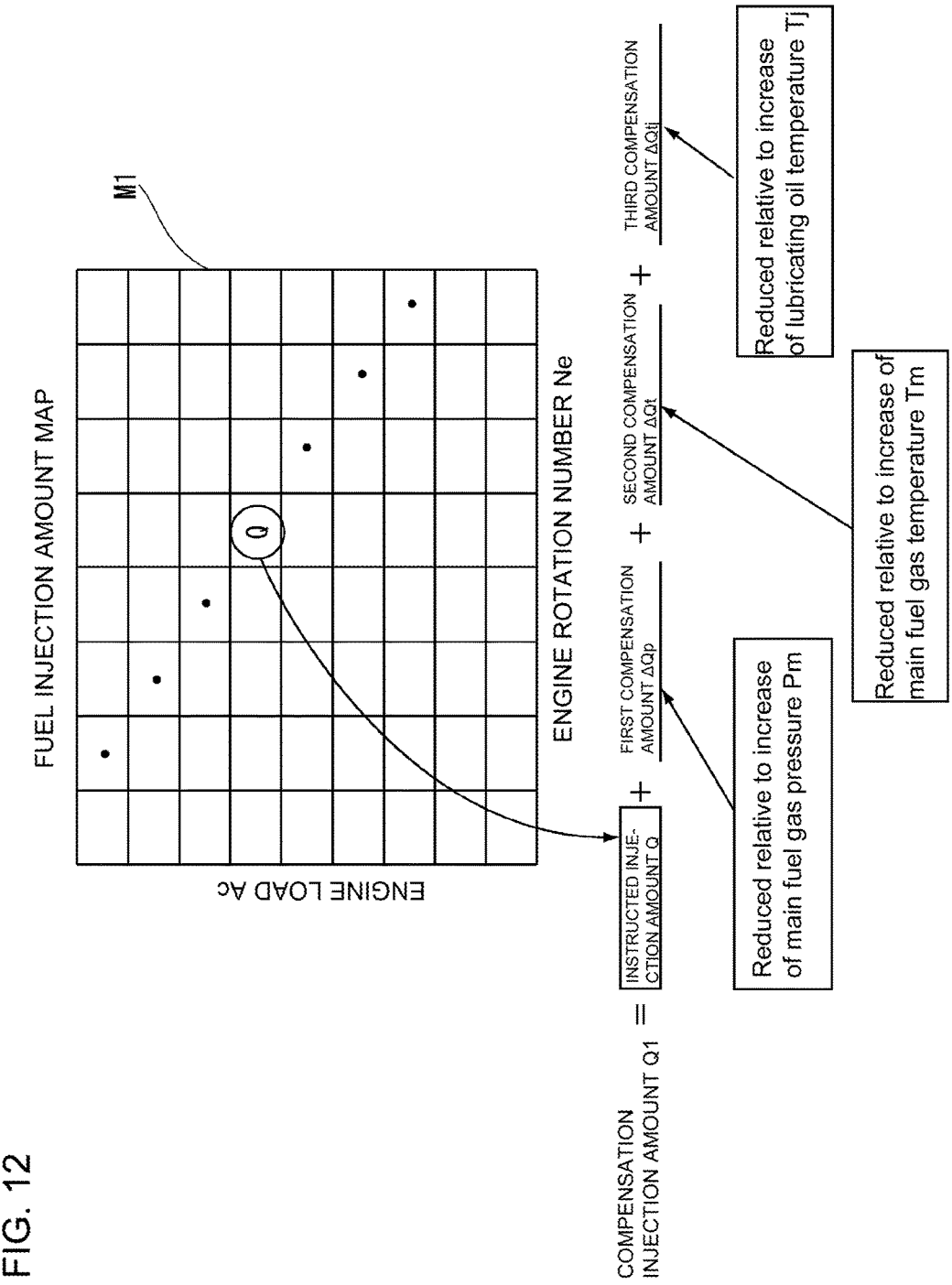
FIG. 12 A schematic diagram showing operations in a fuel gas injection amount control.

Next, the following describes a fuel injection amount (main fuel gas injection amount) control by the engine controlling device 73. As shown in FIG. 12, the engine controlling device 73 stores a fuel injection amount map M1, and based on the fuel injection amount map M1, the main fuel gas flow rate by the gas injector 98 is determined. The fuel injection amount map M1 indicates the correlation between the engine rotation number Ne, the engine load Ac and an instructed fuel injection amount Q as the fuel flow rate, and is for determining the instructed fuel injection amount Q for the engine rotation number Ne and the engine load Ac.

Upon receiving the engine load Ac measured by the load measuring device (load detection sensor) 19 and the engine rotation number Ne measured by the engine rotation sensor 20, the engine controlling device 73 refers to the fuel injection amount map M1, and determines the instructed fuel injection amount Q. Then, for the instructed fuel injection amount Q determined, the engine controlling device 73 executes a compensation calculation to calculate a compensation injection amount Q1, by using a first compensation amount $\Delta Qp$ by a main fuel gas pressure Pm, a second compensation amount $\Delta Qt$ by a main fuel gas temperature Pt, or a third compensation amount $\Delta Qtj$ by the lubricating oil temperature Tj Thus, flow rate control is performed so that the main fuel gas flow rate from the gas injector 98 is the compensation injection amount Q1 determined by the engine controlling device 73.

In the engine device 21, an increase in the main fuel gas pressure Pm increases the density of the main fuel gas, and reduces the fuel injection amount required to handle the same engine load Ac with a predetermined engine rotation number Ne. Therefore, when the main fuel gas pressure Pm measured by the main fuel gas pressure sensor 112 is received, the engine control device 73 calculates compensation injection amount Q1 with the instructed fuel injection amount Q reduced by the first compensation amount $\Delta Qp$ which is made proportional to an increase in the main fuel gas pressure Pm, in the compensation calculation for calculating the compensation injection amount Q1. That is, the first compensation amount $\Delta Qp$ is a compensation amount which decreases in proportion to an increase in the main fuel gas pressure Pm.

In the engine device 21, an increase in the main fuel temperature Tm lowers the density of the main fuel gas, and increases the fuel injection amount required to handle the same engine load Ac with a predetermined engine rotation number Ne. Therefore, when the main fuel gas temperature Tm measured by the main fuel gas temperature sensor 113 is received, the engine control device 73 calculates compensation injection amount Q1 with the instructed fuel injection amount Q increased by the second compensation amount ΔQt which is made proportional to an increase in the main fuel gas temperature Pt, in the compensation calculation for calculating the compensation injection amount Q1. That is, the second compensation amount ΔQt is a compensation amount which decreases in proportion to an increase in the main fuel gas temperature Pt.

In the engine device 21, an increase in the lubricating oil temperature Tj lowers the density of the lubricating oil, and reduces the fuel injection amount required to handle the same engine load Ac with a predetermined engine rotation number Ne. Therefore, when the lubricating oil temperature Tj measured by the lubricating oil temperature sensor 115 is received, the engine control device 73 calculates compensation injection amount Q1 with the instructed fuel injection amount Q reduced by the third compensation amount ΔQtj which is made proportional to an increase in the lubricating oil temperature Tj, in the compensation calculation for calculating the compensation injection amount Q1. That is, the third compensation amount ΔQtj is a compensation amount which decreases in proportion to an increase in the lubricating oil temperature Tj.

The engine controlling device 73 sets a target value (target pressure) Pim of the intake manifold pressure according to the engine load, when executing the above-described main valve control or the bypass valve control. At this time, the engine controlling device 73 determines a target pressure Pim, with reference to a target intake manifold pressure map M2. The target intake manifold pressure map M2 indicates the correlation between the engine rotation number Ne and the engine load Ac, and is for determining the target pressure Pim with respect to the engine rotation number Ne and the engine load Ac.

Figure 13:
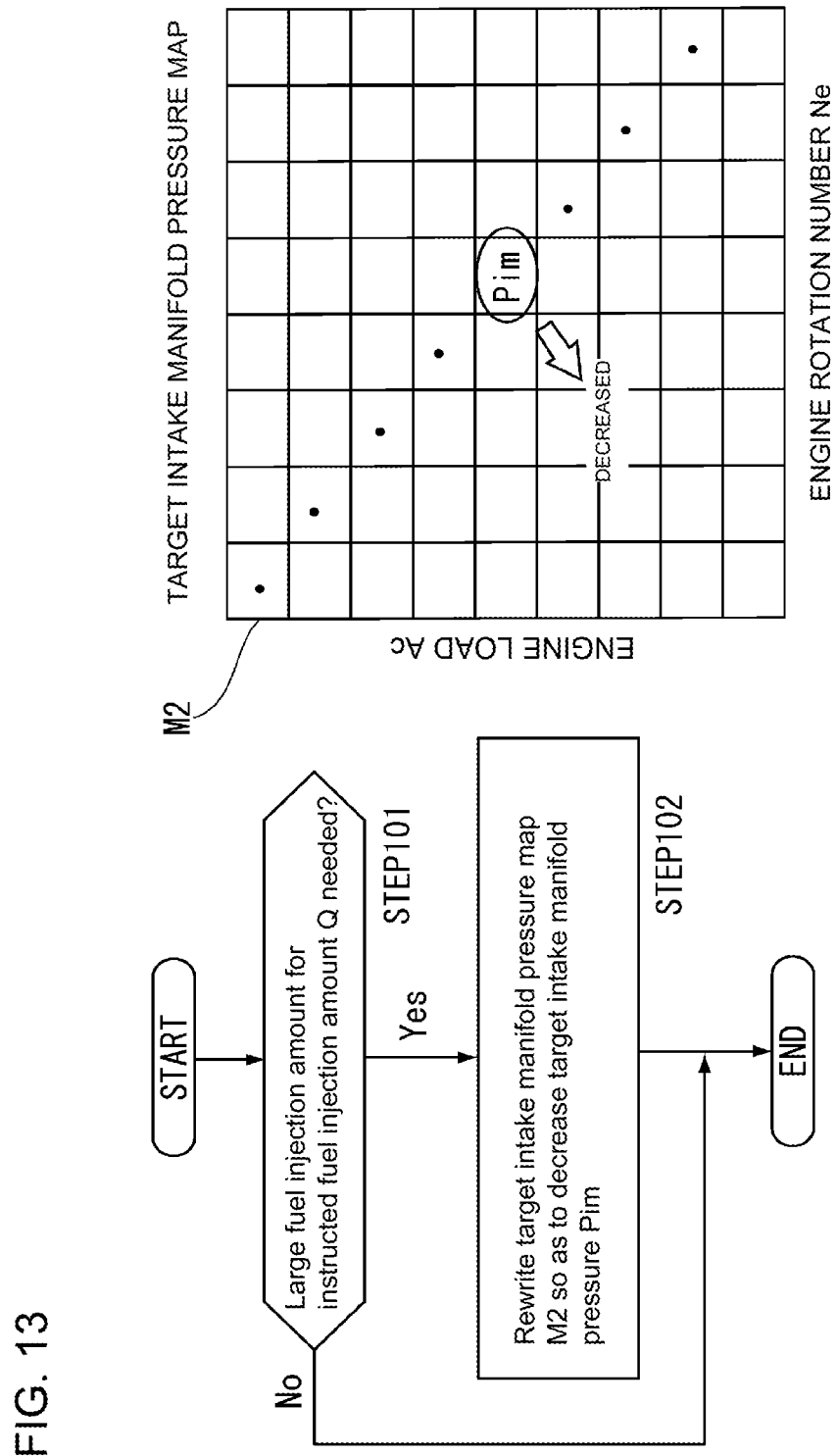
FIG. 13 A flowchart showing operations in a target intake manifold pressure map correction control.

Further, as shown in FIG. 13, the engine controlling device 73 rewrites the stored contents of the target intake manifold pressure map M2 when a fuel injection amount equal to or larger than the determined fuel injection amount is required. That is, based on the engine load Ac measured by the load measuring device 19 and the engine rotation number Ne measured by the engine rotation sensor 20, the engine controlling device 73 determines whether or not the fuel injection amount from the gas injector 98 is insufficient (STEP101). When the fuel injection amount from the gas injector 98 is determined as to be insufficient (Yes in STEP101), the engine controlling device 73 performs correction (rewriting) so that the target pressure Pim in the target intake manifold pressure map M2 is made small and stores the same (STEP102).

A case where the fuel injection amount from the gas injector 98 needs to be larger than the set fuel injection amount is, for example, when the set fuel injection amount falls short for achieving a targeted engine rotation number Nem with respect to the engine load Ac; or a case requiring a fuel injection amount larger than the instructed fuel injection amount Q calculated based on the fuel injection amount map, at a predetermined engine rotation number Ne and a predetermined engine load Ac.

In such a case, the stored element of the target intake manifold pressure map M2 is rewritten so that the target pressure Pim in the target intake manifold pressure map M2 is smaller. Therefore, even when the fuel injection amount is insufficient, an air-fuel ratio at which a required combustion effect is obtained can be achieved by lowering the intake manifold pressure at a predetermined engine rotation number Ne and a predetermined engine load Ac. In other words, when a fuel gas having different composition is supplied to the engine device 21, the quantity of heat generated with the fuel gas with the different composition is low, which necessitates a larger fuel injection amount than usual. At this time, by performing correction so that the target pressure Pim is smaller, a suitable excess air ratio can be achieved, and deterioration in the fuel consumption can be prevented.

Figure 14:
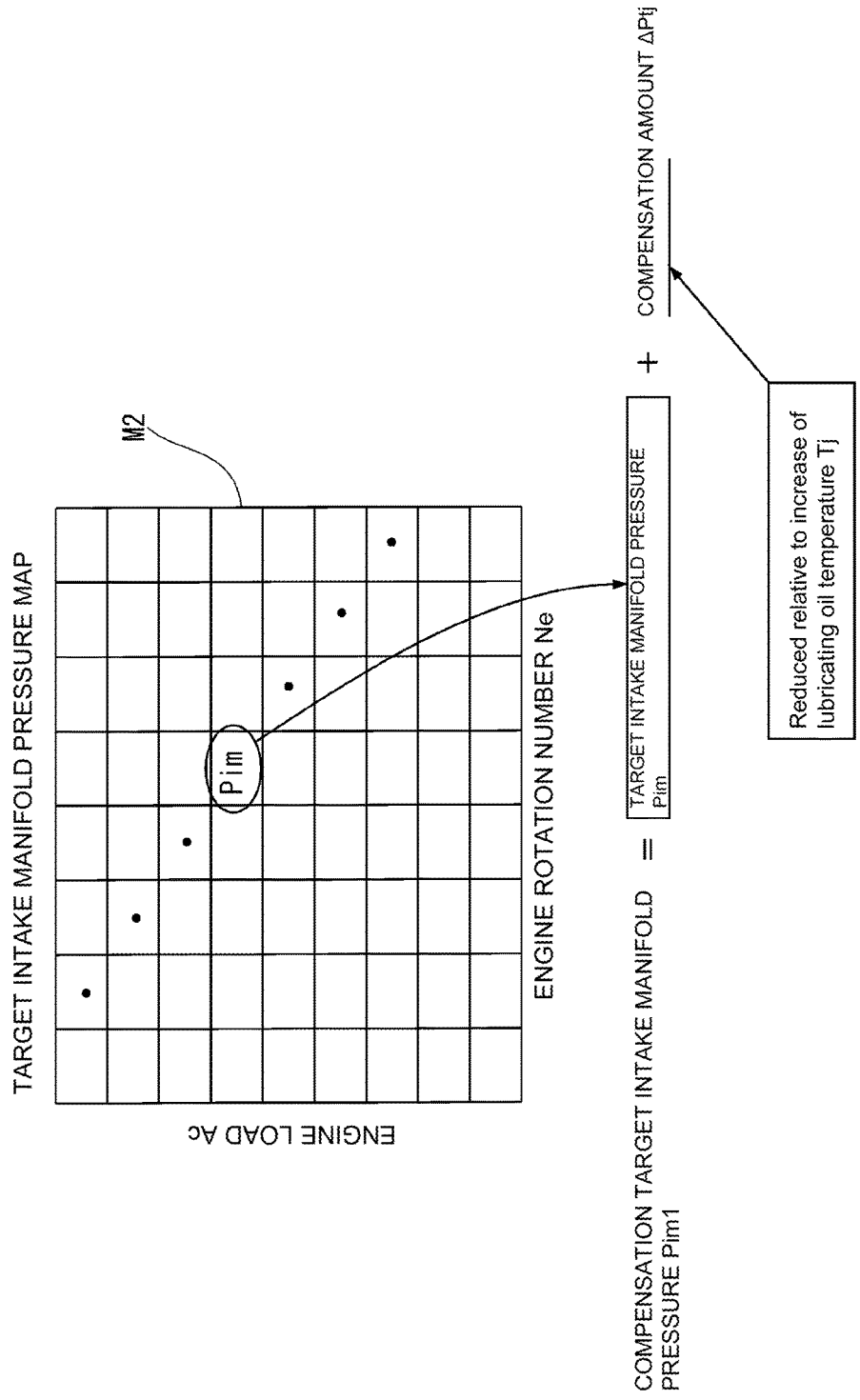
FIG. 14 A schematic diagram showing operations in a target intake manifold pressure map correction control.

Further, as shown in FIG. 14, the engine controlling device 73 calculates compensated target pressure Pim1, by executing a compensation calculation to calculate the target pressure Pim determined based on the target intake manifold pressure map M2 with a compensation amount ΔPtj based on the lubricating oil temperature Tj. Thus, the engine controlling device 78 executes PID control with respect to the valve opening degree of the main throttle valve V1 or the supplied-air bypass valve V2, based on the difference between the measured pressure from the pressure sensor 39 and the compensated target pressure Pim1.

When the lubricating oil temperature Tj rises, the engine device 21 shifts the excess air ratio to the rich side during a cold state (a state in which the lubricating oil temperature Tj is lowered). This makes the combustion unstable, inhibiting the speed governing, and the engine may be stalled. Therefore, when the lubricating oil temperature Tj measured by the lubricating oil temperature sensor 115 is received, the engine control device 73 calculates compensated target pressure Pim1 with the target pressure Pim increased by the compensation amount ΔPtj which is made proportional to a decrease in the lubricating oil temperature Tj, in the compensation calculation for calculating the compensated target pressure Pim1. By executing the pressure control for the intake manifold 67 based on the compensated target pressure Pim1, a suitable excess air ratio is maintained even during the cold state.

The engine controlling device 73 sets a target value (target pressure) Pim of the intake manifold pressure according to the engine load, when executing the above-described main valve control or the bypass valve control. At this time, the engine controlling device 73 determines a target pressure Pim, with reference to a target intake manifold pressure map M2. The target intake manifold pressure map M2 indicates the correlation between the engine rotation number Ne and the engine load Ac, and is for determining the target pressure Pim with respect to the engine rotation number Ne and the engine load Ac.

Figure 15:
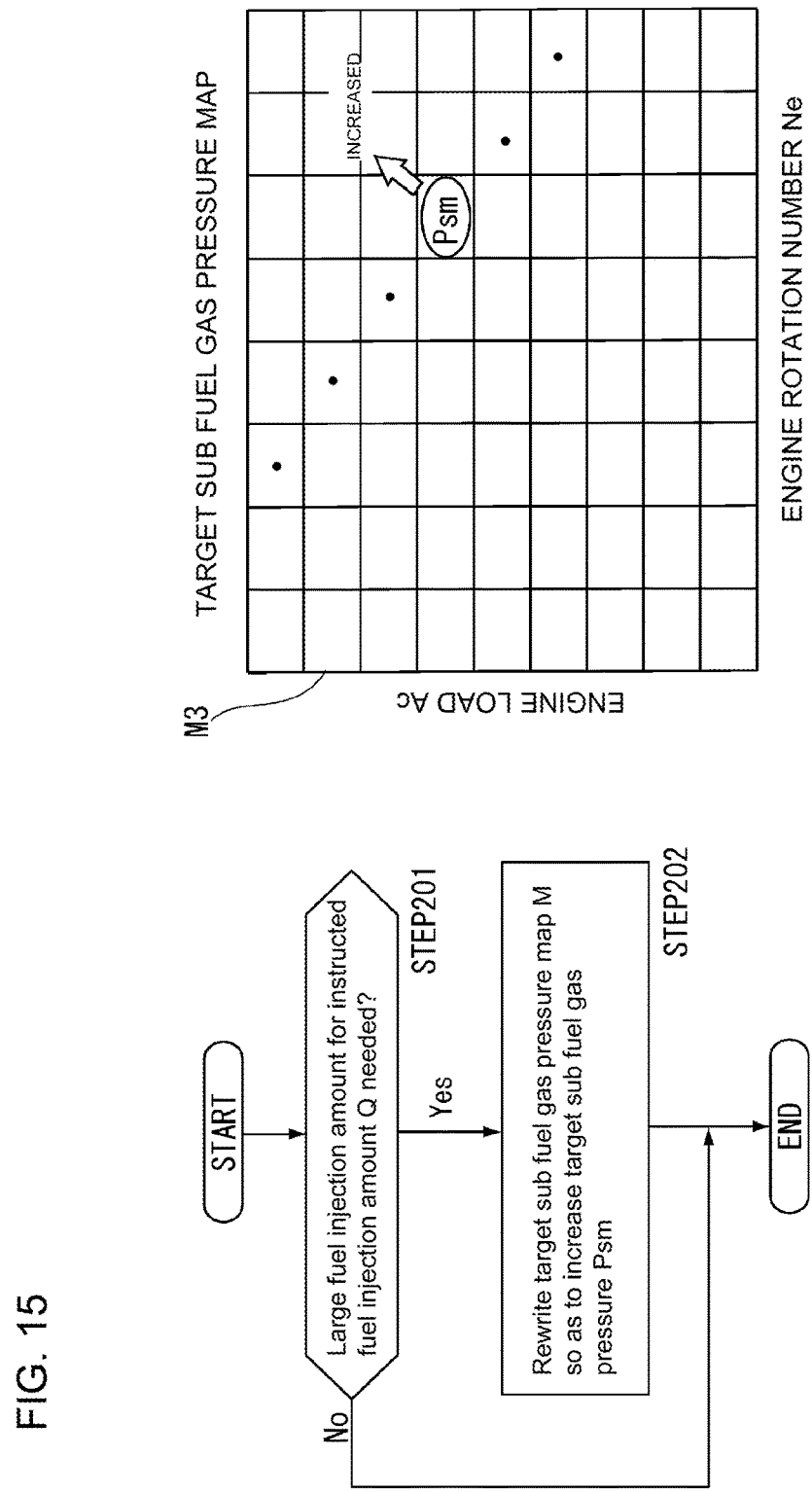
FIG. 15 A flowchart showing operations in a target sub fuel gas pressure map correction control.

As shown in FIG. 15, when the engine load Ac measured by the load measuring device 19 and the engine rotation number Ne measured by the engine rotation sensor 20 are received, the engine controlling device 73 determines a targeted sub fuel gas pressure Psm with reference to a target sub fuel gas pressure map M3. The target sub fuel gas pressure map M3 indicates the correlation between the engine rotation number Ne and the engine load Ac and the targeted sub fuel gas pressure Psm, and is for determining the targeted sub fuel gas pressure Psm with respect to the engine rotation number Ne and the engine load Ac.

Further, as shown in FIG. 15, the engine controlling device 73 rewrites the stored contents of the target sub fuel gas pressure map M3 when a fuel injection amount equal to or larger than the determined fuel injection amount is required. That is, as in the case of the STEP101 in FIG. 13, based on the engine load Ac measured by the load measuring device 19 and the engine rotation number Ne measured by the engine rotation sensor 20, the engine controlling device 73 determines whether or not the fuel injection amount from the check valve 89 is insufficient (STEP201). When the fuel injection amount from the check valve 89 is determined as to be insufficient (Yes in STEP201), the engine controlling device 73 performs correction (rewriting) so that the targeted sub fuel gas pressure Psm in the target sub fuel gas pressure map M3 is made larger and stores the same (STEP202).

When the fuel injection amount from the check valve 89 is determined as to be insufficient, the engine controlling device 73 performs correction so as to increase the targeted sub fuel gas pressure Psm. In other words, when a fuel gas having different composition is supplied to the engine device 21, the quantity of heat generated with the fuel gas with the different composition is low, which necessitates a larger fuel injection amount than usual. At this time, by performing correction so that the targeted sub fuel gas pressure Psm is larger, a suitable air-fuel ratio can be achieved, and deterioration in the fuel consumption can be prevented.

Figure 16:
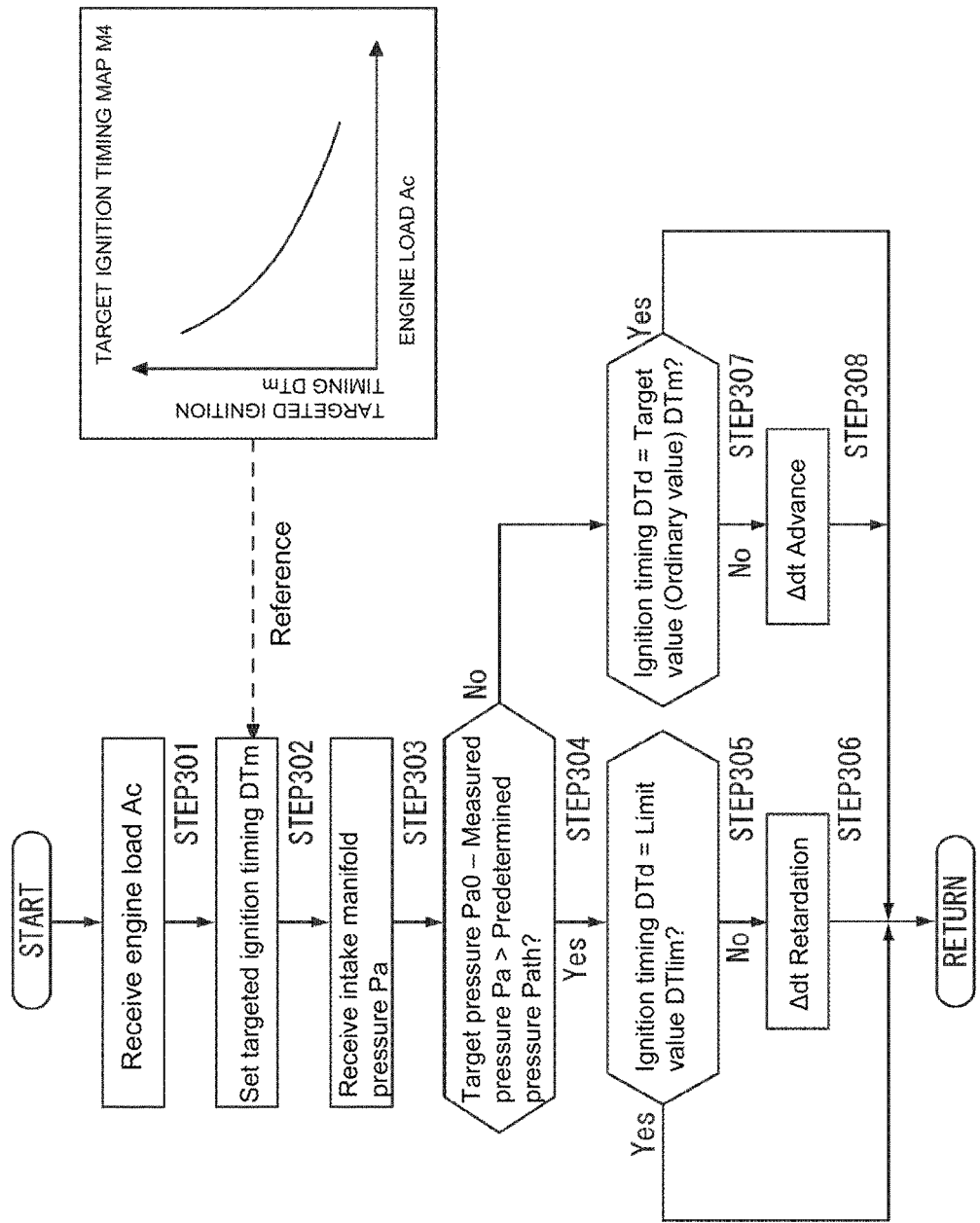
FIG. 16 A flowchart showing operations in a setting control of ignition timing by an engine controlling device.

As shown in FIG. 16, when the engine load (generator output or engine torque) Ac measured by the load measuring device 19 is received, the engine controlling device 73 determines a targeted ignition timing (ordinary ignition timing) for the spark plug 82, with reference to target ignition timing map M4. The target ignition timing map M4 indicates the correlation between the engine load AC and the targeted ignition timing DTm, and is for determining the targeted ignition timing DTm with respect to the engine load Ac. Further, the engine controlling device 73 performs in multiple steps a retard control of ignition timing, when the air amount is determined as to be insufficient in the premixed fuel obtained by pre-mixing the gaseous fuel with the air, and performs in multiple steps an advance control of ignition timing, when the air amount is determined as to be sufficient.

The following details the setting control of the ignition timing by the engine controlling device 73, with reference to flowchart of FIG. 16. When the engine load Ac measured by the load measuring device 19 is received (STEP301), the engine controlling device 73 determines and stores the targeted ignition timing DTm with reference to the target ignition timing map M4 (STEP302). After the targeted ignition timing DTm is determined, the engine controlling device 73 obtains a value Pa (measured pressure) of the intake manifold pressure measured by the intake manifold pressure sensor 39 (STEP303). Then, the engine controlling device 73 determines whether or not the air amount is insufficient based on a difference (Pa0−Pa) between the target value Pa0 (target pressure) of the intake manifold pressure set in the valve control operation based on the flowchart of FIG. 10 and the value Pa (measured pressure) of the intake manifold pressure (STEP304).

If the difference (Pa0−Pa) between the target pressure Pa0 and the measured pressure Pa is higher than a predetermined pressure difference Path (Yes in STEP304), the engine controlling device 73 determines that the air amount is insufficient, and makes a transition to the retard control of STEP305 and thereafter. On the other hand, if the difference (Pa0−Pa) between the target pressure Pa0 and the measured pressure Pa is equal to or less than the predetermined pressure difference Path (No in STEP304), the amount of air is determined as to be sufficient, and a transition occurs to the advance control of STEP307 and thereafter.

After transition to the retard control, the engine controlling device 73 first confirms whether or not the set ignition timing DTd is an ignition timing (limit ignition timing) DTlim to become a retard limit value (STEP305). When the ignition timing DTd has not yet reached the limit ignition timing DTlim (No in STEP305), the ignition timing DTd is retarded by a predetermined amount Δdt (e.g. 1°) (STEP306). That is, when the retard limit value is reached during the retard control, the engine controlling device 73 stops the retard control.

Figure 17:
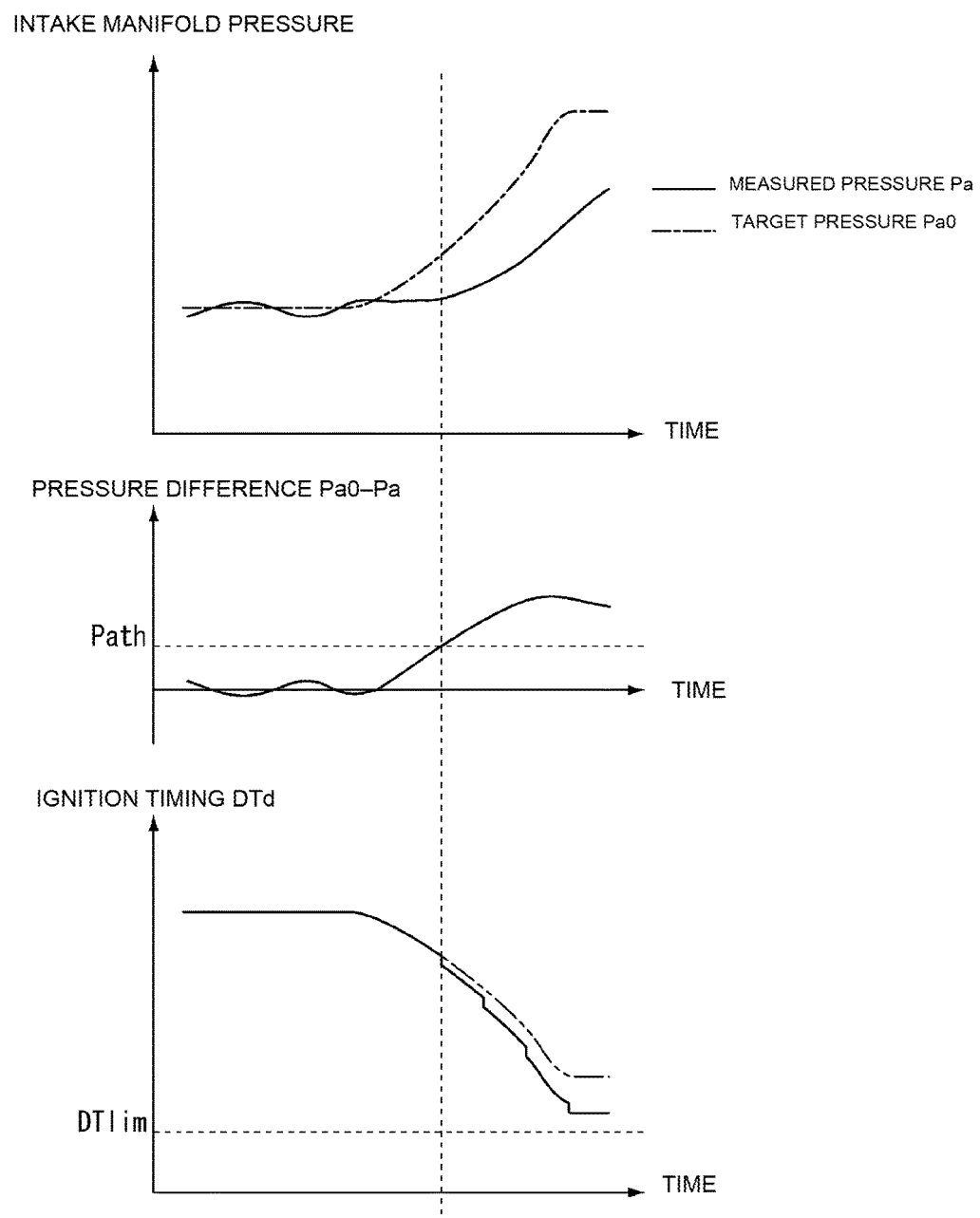
FIG. 17 A time chart of the control.

With this retard control by the engine controlling device 73, the ignition timing DTd can be retarded in multiple steps until it reaches the limit ignition timing DTlim, when the amount of air is estimated to be insufficient based on a difference between the target pressure Pa0 and the measured pressure Pa as shown in FIG. 17. Accordingly, the ignition timing DTd can be retarded in such a way that the probability of knocking occurring based on fluctuation in the output can be lowered. Further, since the range of the retardation can be limited, deterioration in the thermal efficiency (engine output efficiency) based on the retardation of the ignition timing can be suppressed to the minimum.

After transition to the advance control, the engine controlling device 73 first confirms whether or not the set ignition timing DTd is the targeted ignition timing DTm (STEP307). When the ignition timing DTd has not yet reached the targeted ignition timing DTm (No in STEP305), the ignition timing DTd is advanced by a predetermined amount Δdt (STEP308). That is, when the ignition timing DTd becomes the one during the ordinary driving, through the advance control, the engine controlling device 73 stops the advance control.

With this advance control by the engine controlling device 73, the ignition timing DTd can be advanced in multiple steps until it reaches the targeted ignition timing DTm of the ordinary driving, when the amount of air is estimated to be insufficient based on a difference between the target pressure Pa0 and the measured pressure Pa. Since the ignition timing DTd is advanced to improve the thermal efficiency, assuming the output is stabilized, and the ignition timing DTd is gradually changed, the probability of knocking taking place can be restrained even when the output fluctuates again.

Figure 18:
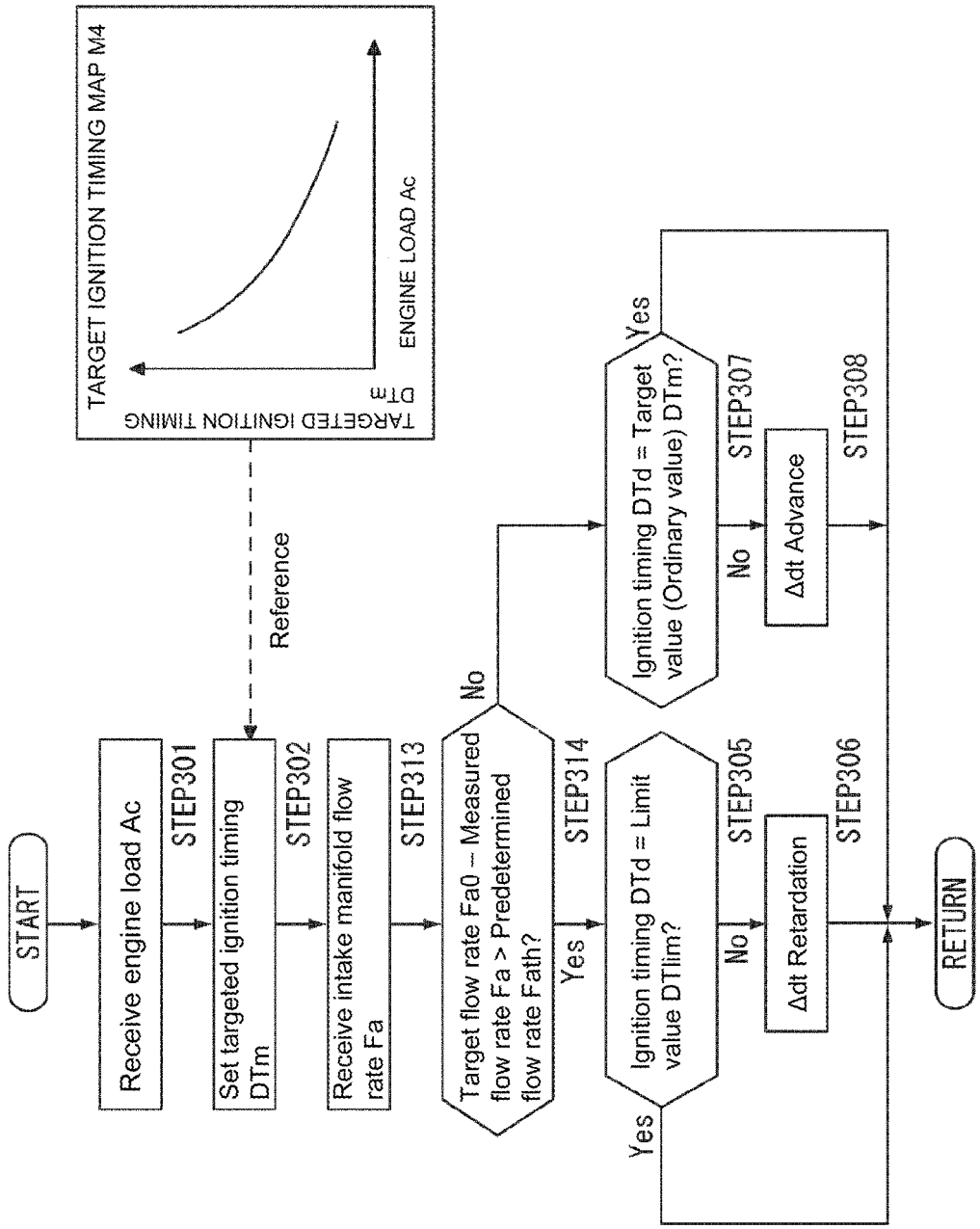
FIG. 18 A flowchart showing a first modification of the setting control of ignition timing by an engine controlling device.

It should be noted that, in the above setting control of the ignition timing, the surplus and shortage of the amount of air is confirmed based on the difference between the target pressure Pa0 and the measured pressure Pa; however, the surplus and shortage of the air amount may be confirmed based on a different parameter. The following describes a first modification of the setting control of the ignition timing by the engine controlling device 73, with reference to the flowchart of FIG. 18. It should be noted that, in the flowchart of FIG. 18, operation steps identical to those in the flowchart of FIG. 16 refer to the above-description, and detail description for those steps are omitted.

In the present modification, the engine controlling device 73 refers to the target ignition timing map M4 to determine the targeted ignition timing DTm based on the engine load Ac (STEP301 to STEP302), and then receives the measured value Fa (measured flow rate) of the air flow rate (intake manifold flow rate) in the intake manifold 67 from a flow rate sensor (not shown) (STEP313). Then, the engine controlling device 73 determines whether or not the air amount is insufficient based on a difference (Fa0−Fa) between the target value Fa0 (target flow rate) of the intake manifold flow rate set based on the engine load Ac and the like and the measured value Fa (measured flow rate) of the intake manifold flow rate (STEP314).

If the difference (Fa0−Pa) between the target flow rate Fa0 and the measured flow rate Fa is higher than a predetermined flow rate difference Fath (Yes in STEP314), the engine controlling device 73 determines that the air amount is insufficient, and makes a transition to the retard control of STEP305 and thereafter. On the other hand, if the difference (Fa0−Pa) between the target flow rate Fa0 and the measured flow rate Fa is equal to or less than the predetermined flow rate difference Fath (No in STEP314), the amount of air is determined as to be sufficient, and a transition occurs to the advance control of STEP307 and thereafter.

Figure 19:
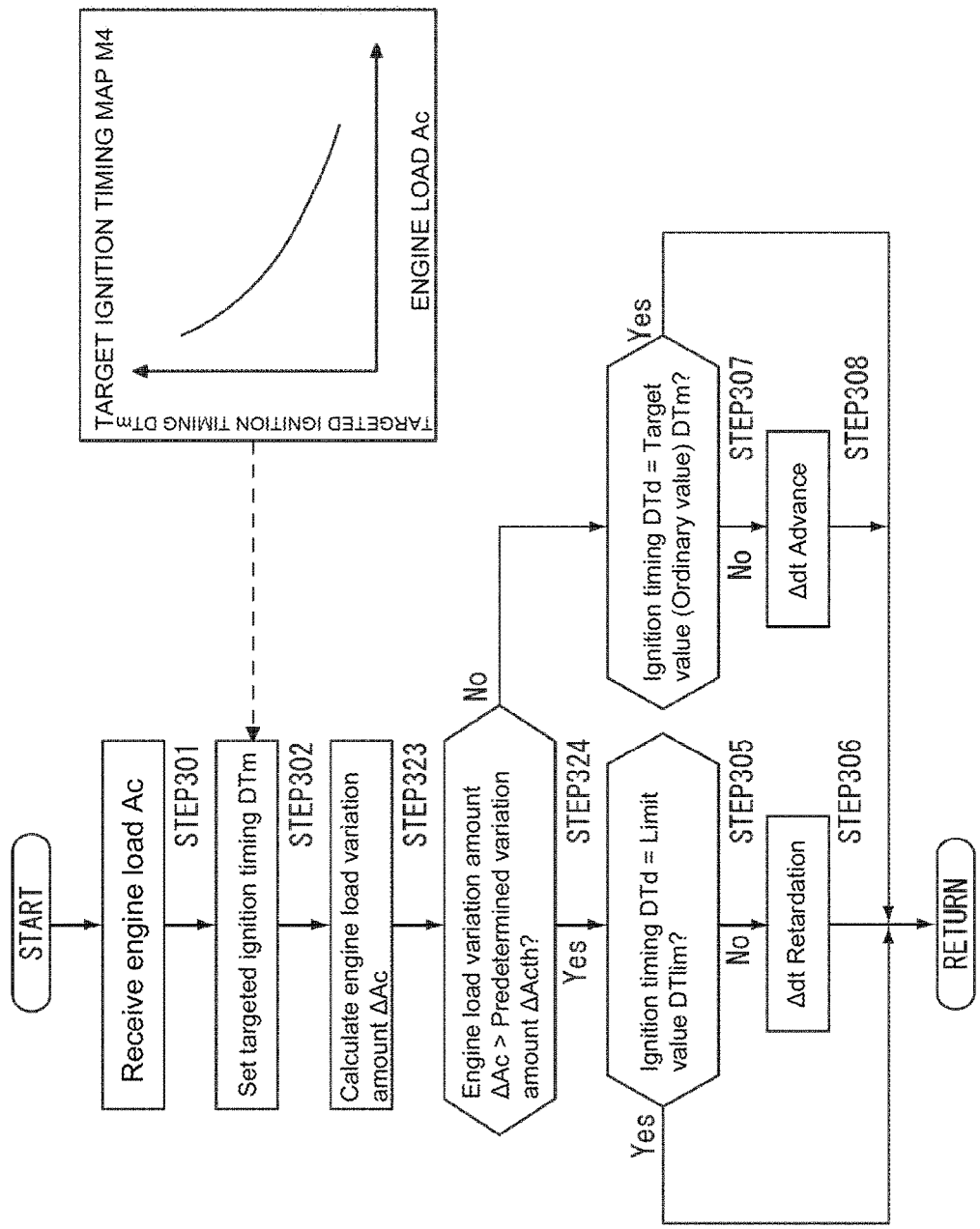
FIG. 19 A flowchart showing a second modification of the setting control of ignition timing by an engine controlling device.

The following details a second modification of the setting control of the ignition timing by the engine controlling device 73, with reference to flowchart of FIG. 19. It should be noted that, in the flowchart of FIG. 19, operation steps identical to those in the flowchart of FIG. 16 refer to the above-description, and detail description for those steps are omitted.

In the present modification, the engine controlling device 73 refers to the target ignition timing map M4 to determine the targeted ignition timing based on the engine load Ac (STEP301 to STEP302), and then calculates a variation amount of the engine load Ac (output variation amount) Δac (STEP323). At this time, for example, the output variation amount ΔAc may be calculated based on a difference from the previously measured engine load Ac. Then, the engine controlling device 73 determines whether or not the air amount is insufficient based on the output variation amount ΔAc (STEP324).

When the output variation amount ΔAc is greater than a predetermined variation amount ΔActh (Yes in STEP324), the engine controlling device 73 determines that the air amount is insufficient, and makes a transition to the retard control of STEP305 and thereafter. On the other hand, when the output variation amount ΔAc is equal to or less than the predetermined variation amount ΔActh (No in STEP324), the amount of air is determined as to be sufficient, and a transition occurs to the advance control of STEP307 and thereafter.

In the present embodiment, the advance amount and retard amount are set to be constant amount of Δt and varied in multiple steps, as in the setting control of the above-described ignition timing. However, a retard amount of the ignition timing based on the parameter amount for determining the surplus or shortage of the air amount may be stored in advance. The following describes a control operation for the engine device of another embodiment (second embodiment), with reference to FIG. 20.

Figure 20:
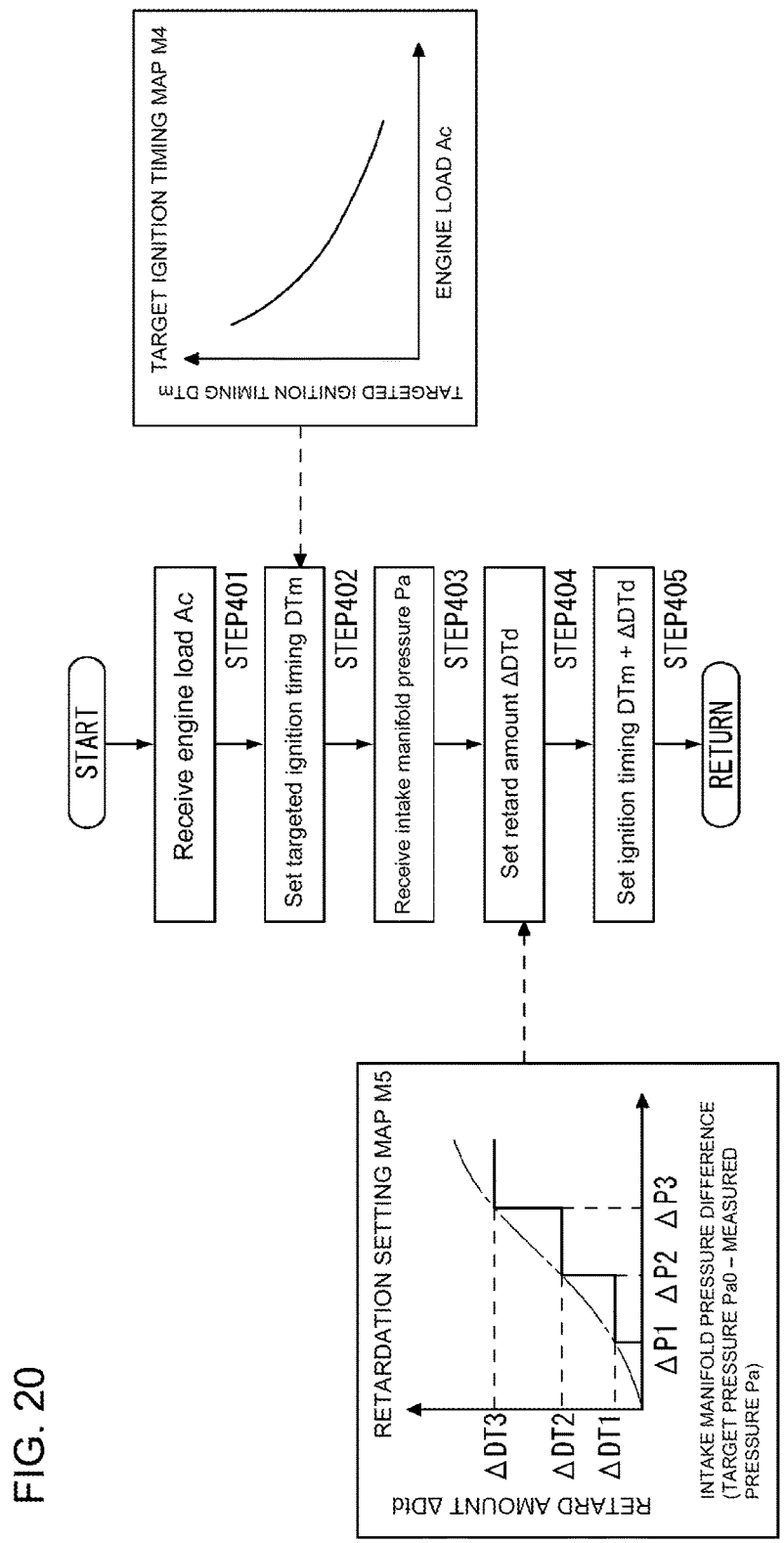
FIG. 20 A flowchart showing operations in a setting control of ignition timing by an engine controlling device of a second Embodiment.

As shown in FIG. 20, in the engine device of the second embodiment, the engine controlling device 73 sets the targeted ignition timing Dtm by referring to the target ignition timing map M4, and sets a retard amount ΔDTd by referring to a retardation setting map M5, to ignite the spark plug 82 at an ignition timing DTm+ΔDTd. The target ignition timing map M4 indicates the correlation between the engine load (generator output or engine torque) Ac measured by the load measuring device 19 and the targeted ignition timing DTm, and is for determining the targeted ignition timing DTm with respect to the engine load Ac. The retardation setting map M5 indicates the correlation between a parameter based on which prediction of insufficiency in the air amount is based and the retard amount ΔDTd, and is for determining the retard amount ΔDTd with respect to the predicted air amount insufficient state.

The following details the setting control of the present embodiment for the ignition timing by the engine controlling device 73, with reference to flowchart of FIG. 20. The present embodiment deals with an example where the air amount insufficient state is predicted based on a difference (Pa0−Pa) between the target value Pa0 (target pressure) of the intake manifold pressure and a measured value Pa (measured pressure) of the intake manifold pressure.

As shown in FIG. 20, when the engine load (generator output or engine torque) Ac measured by the load measuring device 19 is received (STEP 401), the engine controlling device 73 determines and stores a targeted ignition timing (ordinary ignition timing) DTm for the spark plug 82, with reference to target ignition timing map M4 (STEP402). After the targeted ignition timing DTm is determined, the engine controlling device 73 obtains a value Pa (measured pressure) of the intake manifold pressure measured by the intake manifold pressure sensor 39 (STEP403).

Then, referring to the retardation setting map M5, the engine controlling device 73 determines the retard amount ΔDTd based on a difference (Pa0−Pa) between the target value Pa0 (target pressure) of the intake manifold pressure set in the valve control operation based on the flowchart of FIG. 10 and the value Pa (measured pressure) of the intake manifold pressure (STEP404). Then, the engine controlling device 73 sets an ignition timing DTm+ΔDTd based on the targeted ignition timing DTm stored in the STEP401 and the retard amount ΔDTd determined in STEP404 (STEP 405).

In this setting control of the ignition timing by the engine controlling device 73, the retard amount is determined by referring to the retardation setting map M5. Therefore, the ignition timing can be retarded in multiple steps according to the predicted insufficient amount of air based on the difference between the target pressure Pa0 and the measured pressure Pa. Accordingly, while the probability of knocking taking place due to fluctuation in the output, a drop in the thermal efficiency (engine output efficiency) is suppressed to the minimum.

It should be noted that the present embodiment deals with a case where, in the retardation setting map M5, the parameter based on which the insufficient state of the air amount is predicted is a difference (Pa0−Pa) between the target value Pa0 (target pressure) of the intake manifold pressure and a measured value Pa (measured pressure) of the intake manifold pressure; however, such a parameter is not limited to this. Namely, the parameter based on which the insufficient state of the air amount is predicted in the retardation setting map M5 may be a difference (Fa0−Fa) between the target value Fa0 (target flow rate) of the intake manifold flow rate and the measured value Fa (measured flow rate) of the intake manifold flow rate as in the first modification, or the variation amount (output variation amount) ΔAc of the engine load Ac as in the above-described second modification.

Further, the retardation setting map M5 may be a 3-dimensional map indicating the correlation amongst a parameter based on which the insufficient state of the air amount is predicted, an engine load (generator output or the engine torque) Ac, and the retard amount ΔDTd, instead of the above 2-dimensional map. That is, in the example of the flowchart of FIG. 20, the retard amount ΔDTd is determined in STEP404, based on the difference (Pa0−Pa) between the target pressure Pa0, the measured pressure Pa, and the engine load Ac. Since the retard control can be more accurately executed by referring to the 3-dimensional retardation setting map M5 as described above, deterioration in the thermal efficiency (engine output efficiency) is restrained, while preventing knocking.

The structure of each of the portions is not limited to the illustrated embodiment, but can be variously changed within a scope which does not deflect from the scope of the present invention. Further, the engine device of the present embodiment can also be applied to structures other than the propulsion/electric power generating mechanism described above, such as a generator device for supplying electric power to an electric system in a ship hull and a structure as a drive source in the land-based power generating facility. Further, although the gas engine is described as an example of the engine device of the present invention, each control operation described above can be applied when the dual-fuel engine is driven in the gas mode in which the gaseous fuel is combusted. Further, although the spark ignition is performed in the sub chamber in the above structure, the ignition method may be based on the micro pilot injection method.

However, in the dual-fuel engine, the air-fuel ratio differs between the diesel mode and the gas mode, and for the same load, the air flow rate of the diesel mode is lower than the gas mode. Therefore, while the turbocharger needs to be matched with the specification of the diesel mode, it needs to be able to supply an air flow rate that suits the air-fuel ratio of the gas mode during the operation in the gas mode. Further, in a traditional dual-fuel engine, the responsiveness in the air flow rate control is not good during an operation in the gas mode, and it has been difficult to execute a suitable air-fuel ratio control with good followability against the load fluctuation.

An engine device of a referential example includes: an intake manifold configured to supply air into a cylinder, an exhaust manifold configured to output exhaust gas from the cylinder; a gas injector which mixes gaseous fuel with the air supplied from the intake manifold; and an igniter configured to ignite, in the cylinder, premixed fuel obtained by premixing the gaseous fuel with the air, the engine device including a retard amount setting map which stores multiple steps of retard amounts according to air-fuel ratios of the premixed fuel in the cylinder, the retard amounts for use in retard control of ignition timing by the igniter; and a controlling unit which estimates the air-fuel ratio of the premixed fuel obtained by pre-mixing, wherein the controlling unit refers to the retard amount setting map and performs the retard control of the ignition timing by the igniter, based on the estimated air-fuel ratio of the premixed fuel.

The above engine device may be such that: the controlling unit receives the intake manifold pressure measured in the intake manifold as a measured pressure; a difference is calculated by subtracting the measured pressure from a target pressure which is a target value of the intake manifold; the retard amount setting map stores a value of the retard amount which is simply increased relative to the difference obtained by subtracting the measured pressure from the target pressure; and the controlling unit refers to the retard amount setting map to estimate the air-fuel ratio based on the target pressure and the measured pressure, and performs retard control of the ignition timing.

Further, the engine device may be such that: the controlling unit receives an air flow rate measured in the intake manifold as a measured flow rate; a difference is calculated by subtracting the measured flow rate from a target flow rate which is a target value of the intake manifold; the retard amount setting map stores a value of the retard amount which is simply increased relative to the difference obtained by subtracting the measured flow rate from the target flow rate; and the controlling unit refers to the retard amount setting map to estimate the air-fuel ratio based on the target flow rate and the measured flow rate, and performs retard control of the ignition timing.

Further, the engine device may be such that: the controlling unit calculates an output variation amount of the engine; the retard amount setting map stores a value of the retard amount which is simply increased relative to the output variation amount of the engine; and the controlling unit refers to the retard amount setting map to estimate the air-fuel ratio based on the output variation amount, and performs retard control of the ignition timing.

In each of the above described engine devices, the retardation setting map may be a 3-dimensional map which stores a value of the retard amount which is varied relative to engine outputs.

Further, the engine device may include: a main fuel injection valve configured to inject a liquid fuel into the cylinder for combustion; a turbocharger configured to compress the air by the exhaust gas from the exhaust manifold; an intercooler configured to cool compressed air compressed by the turbocharger and supply the compressed air to the intake manifold; an exhaust bypass passage connecting an outlet of the exhaust manifold and an exhaust gas outlet of the turbocharger, wherein the exhaust bypass passage has an exhaust bypass valve arranged therein; a supplied-air bypass passage configured to bypass a compressor of the turbocharger, wherein the supplied-air bypass passage has a supplied-air bypass valve arranged therein; and a structure configured to selectively combust the gaseous fuel and the liquid fuel for driving.

In the above referential example, the ignition timing is subjected in multiple steps to the retard control according to an insufficient air-amount state. This can not only reduce the occurrence of knocking, but also prevent the ignition timing from being overly retarded and suppress a drop in combustion efficiency. Further, since the ignition timing is set by predicting surplus and shortage in the air amount in the intake manifold, the ignition timing is suitably set even in a structure, such as a large engine, having a large volume intake manifold. Therefore, while deterioration in the combustion efficiency of the engine device can be suppressed, the occurrence of knocking can be suppressed, hence achieving a stable operation.

The following description is based on drawings showing an application of a first referential example embodying the referential example to a pair of propulsion/electric power generating mechanisms mounted in a ship having a two-engine two-shaft structure.

Figure 21:
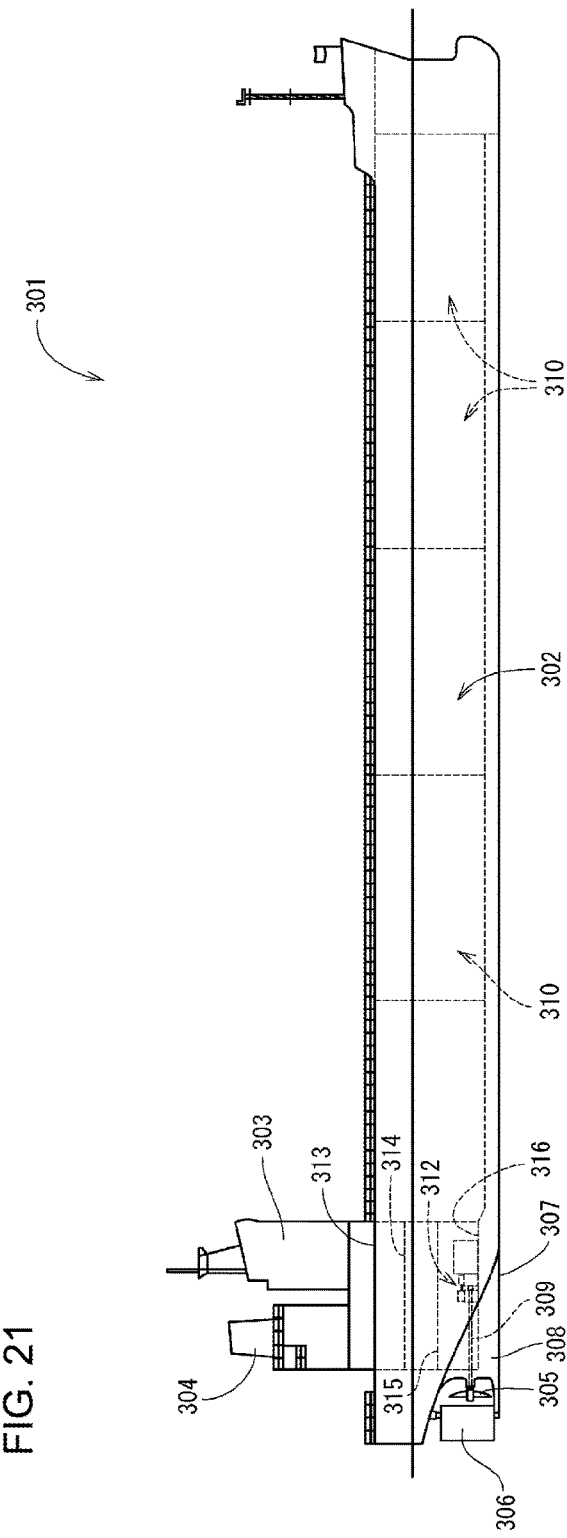
FIG. 21 An overall side view of a ship in a first referential example.
Figure 22:
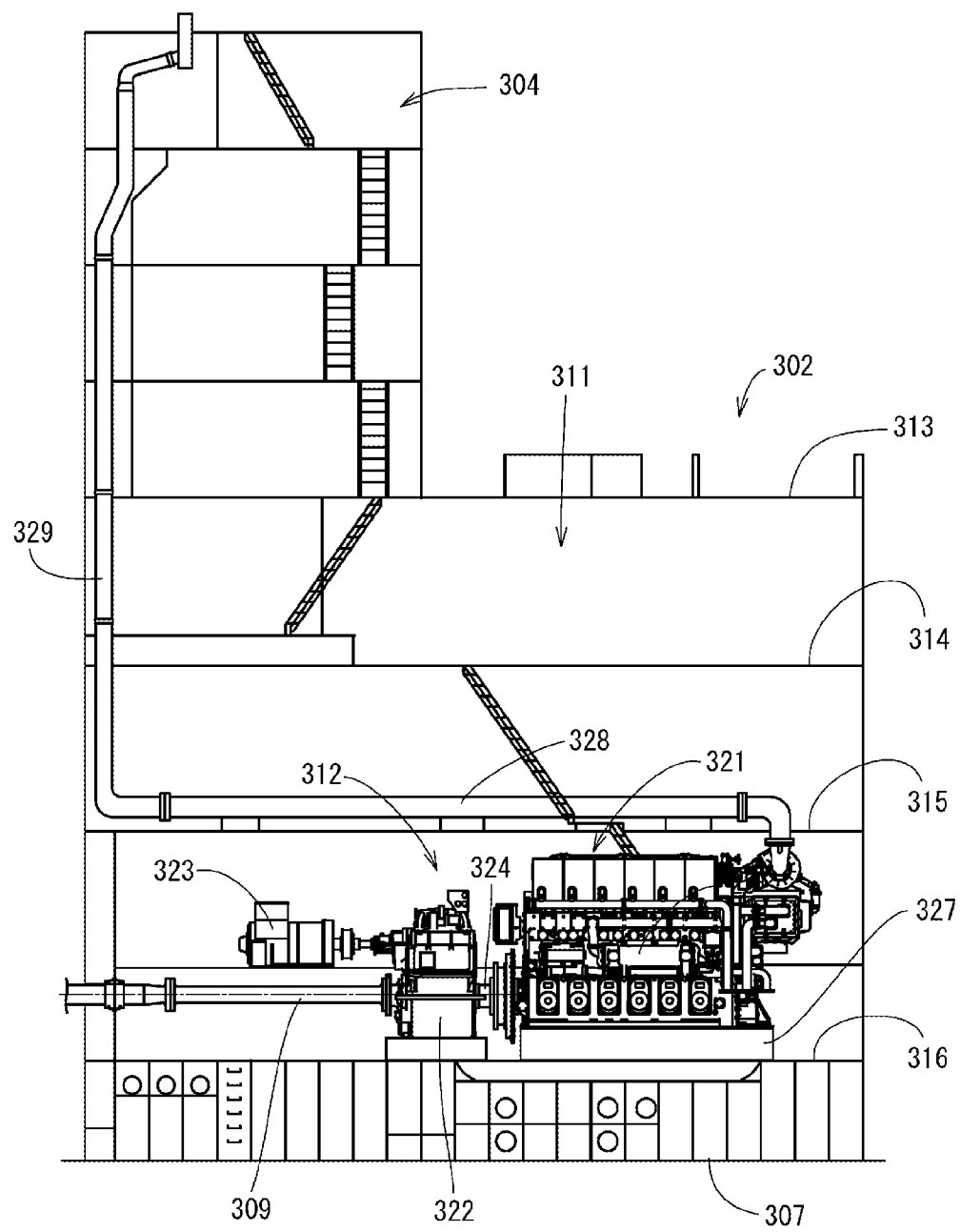
FIG. 22 A side cross sectional view of the engine room.
Figure 23:
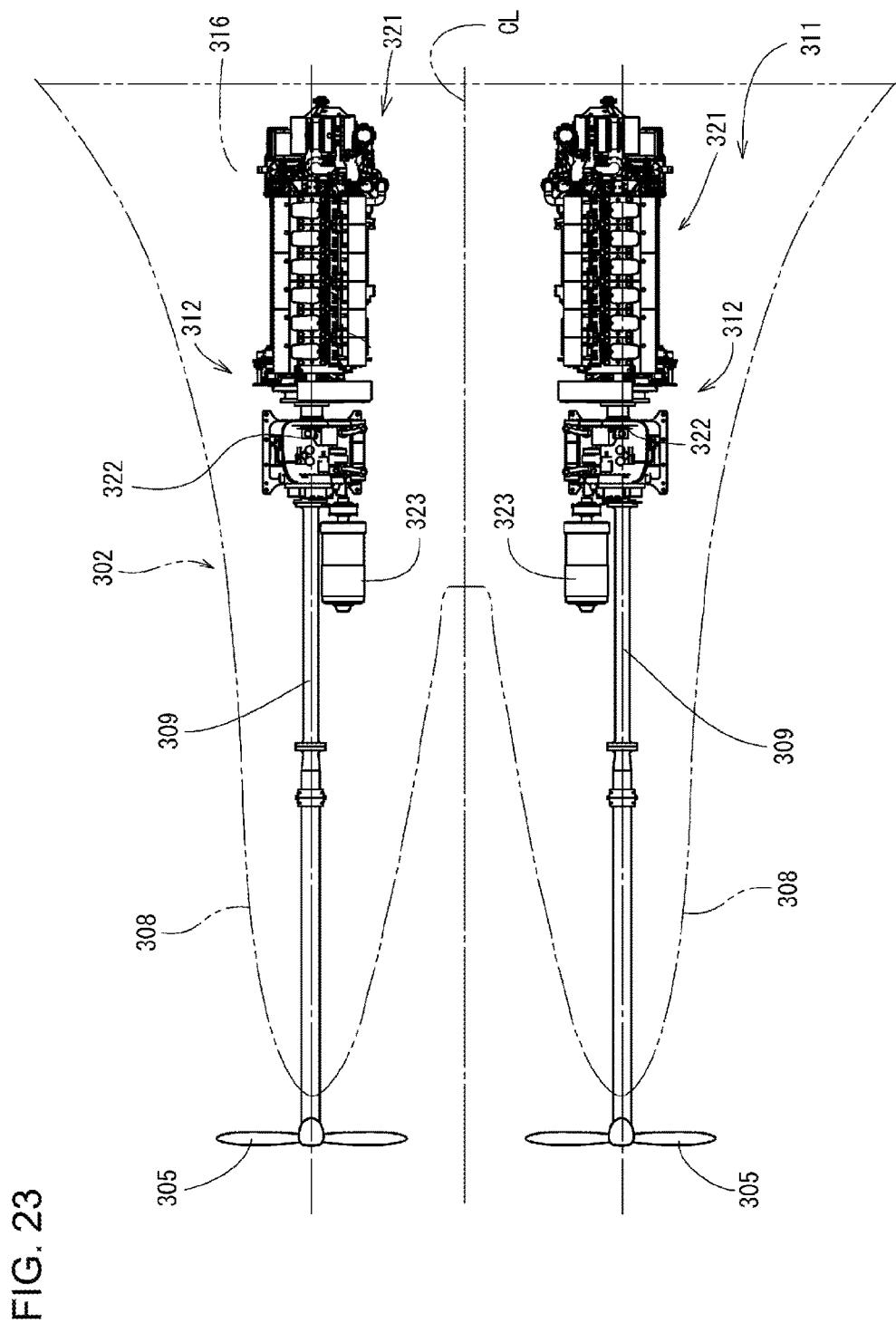
FIG. 23 An explanatory plan view of an engine room.

First, an overview of the ship is described. As shown in FIG. 21 to FIG. 23, the ship 301 of the first referential example includes: a ship hull 302, a cabin 303 (bridge) provided on the stern side of the ship hull 302, a funnel 304 (chimney) positioned behind the cabin 303, and a pair of propellers 305 and a rudder 306 provided on a lower back portion of the ship hull 302. In this case, a pair of skegs 308 are integrally formed on the ship bottom 307 on the stern side. On each of the skegs 308, a propeller shaft 9 for driving to rotate the propeller 305 is pivotally supported. The skegs 308 are symmetrically formed on the left and right, with respect to the ship hull center line CL (see FIG. 23) which divides the lateral width direction of the ship hull 302. That is, the first referential example adopts a twin skeg as the stern shape of the ship hull 2.

On a bow side and a middle part of the ship hull 302, a hold 310 is provided. On the stern side of the ship hull 302, an engine room 311 is provided. In the engine room 311, a pair of propulsion/electric power generating mechanisms 312 each serving as a driving source for propeller 305 and as an electric power supply of the ship 301 is positioned on the left and right across the ship hull center line CL. The rotary power transmitted from each propulsion/electric power generating mechanism 312 to the propeller shaft 309 drives and rotates the propeller 305. The inside of the engine room 311 is parted relative to the up and down directions, by an upper deck 313, a second deck 314, a third deck 315, and an inner bottom plate 316. The propulsion/electric power generating mechanisms 312 of the first referential example are installed on the inner bottom plate 316 at the lower most stage of the engine room 311. It should be noted that, although details are not illustrated, the hold 310 is divided into a plurality of compartments.

As shown in FIG. 22 and FIG. 23, each propulsion/electric power generating mechanism 312 is a combination of: a medium-speed engine device 321 (dual-fuel engine, in the first referential example) which serves as a drive source of the propeller 305; a speed reducer 322 configured to transmit power of the engine device 321 to the propeller shaft 309; and a shaft-driven generator 323 which generates electric power by the power of the engine device 321. The term "medium-speed" engine herein means one that drives at a rotational speed of approximately 500 to 1000 times per minute. In this connection, a "low-speed" engine drives at a rotational speed of 500 times or less per minute, and a "high-speed" engine drives at a rotational speed of 1000 times or more per minute. The engine device 321 of the first referential example is configured to drive at a constant speed within a range of medium-speed (approximately 700 to 750 times per minute).

The engine device 321 includes: a cylinder block 325 having an engine output shaft (crank shaft) 324, and cylinder heads 326 mounted on the cylinder block 325. On the inner bottom plate 316 at the lower most stage of the engine room 311, a base mount 327 is mounted directly or through a vibration isolator (not shown). On this base mount 327, the cylinder block 325 of the engine device 321 is mounted. The engine output shaft 324 extends in the front/rear length direction of the ship hull 302. That is, the engine device 321 is arranged in the engine room 311 with the direction of the engine output shaft 324 directed in the front/rear length direction of the ship hull 302.

The speed reducer 322 and the shaft-driven generator 323 are disposed on the stern side of the engine device 321. From the rear surface side of the engine device 321, a rear end side of an engine output shaft 324 protrudes. On the rear end side of the engine output shaft 324, the speed reducer 322 is coupled in such a manner as to be capable of transmitting power. The shaft-driven generator 323 is arranged on the opposite side of the engine device 321 across the speed reducer 322. The engine device 321, the speed reducer 322, and the shaft-driven generator 323 are aligned in this order from the front of the engine room 311. In this case, the speed reducer 322 and the shaft-driven generator 323 are arranged in or nearby the skegs 308 on the stern side. Therefore, regardless of the limitation of the buttock line of the ship 301, it is possible to arrange the engine device 321 as close as possible to the stern side, contributing to the compactification of the engine room 311.

A propeller shaft 309 is provided on the downstream side of the power transmission of the speed reducer 322. The outer shape of the speed reducer 322 protrudes downward than the engine device 321 and the shaft-driven generator 323. To the rear surface side of this protruding portion, the front end side of the propeller shaft 309 is coupled so as to enable power transmission. The engine output shaft 324 (axial center line) and the propeller shaft 309 are coaxially positioned in plan view. The propeller shaft 309 extends in the front/rear length direction of the ship hull 302, while being shifted in the vertical direction from the engine output shaft 324 (axial center line). In this case, the propeller shaft 309 is located at a position lower than the shaft-driven generator 323 and the engine output shaft 324 (axial center line) in side view, and close to the inner bottom plate 316. In other words, the shaft-driven generator 323 and the propeller shaft 309 are sorted up and down and do not interfere with each other. Therefore, it is possible to make each propulsion/electric power generating mechanism 312 compact.

The constant speed power of the engine device 321 is branched and transmitted from the rear end side of the engine output shaft 324 to the shaft-driven generator 323 and the propeller shaft 309, via the speed reducer 322. Apart of the constant speed power of the engine device 321 is reduced by the speed reducer 322 to, for example, a rotational speed of approximately 100 to 120 rotations per minute and is transmitted to the propeller shaft 309. The propeller 305 is driven and rotates with the reduced power from the speed reducer 322. It should be noted that, as the propeller 305, a variable-pitch propeller capable of adjusting the ship speed through changing the blade angles of the propeller blades. A part of the constant speed power of the engine device 321 is reduced by the speed reducer 322 to, for example, a rotational speed of approximately 1200 to 1800 rotations per minute and is transmitted to the PTO shaft pivotally supported by the speed reducer 322. The rear end side of the PTO shaft of the speed reducer 322 is connected to the shaft-driven generator 323 in such manner as to be capable of transmitting the power, and the shaft-driven generator 323 is driven to generate electric power based on the rotary power from the speed reducer 322. Generated electric power by the shaft-driven generator 323 is supplied to electric system in the ship hull 302.

To the engine device 321, an intake path (not shown) for taking in the air and an exhaust path 328 for outputting exhaust gas are connected. The air takin in through the intake path is fed into cylinders 336 (into cylinders of intake process) of the engine device 321. Further, since there are two engine devices 321, there are two exhaust paths 328. Each exhaust path 328 is connected to an extension path 329. The extension path 329 extends to the funnel 304, and is structured to be directly in communication with the outside. The exhaust gas from the engine device 321 is emitted outside the ship 301 through the exhaust path 328 and the extension path 329.

As is apparent from the above description, there is a pair of propulsion/electric power generating mechanisms 312 each of which is a combination of the engine device 321, the speed reducer 322 configured to transmit power from the engine device 321 to the propeller shaft 309 which drives and rotate propeller 305 for propelling the ship, and the shaft-driven generator 323 configured to generate electric power with the power from the engine device 321. The pair of propulsion/electric power generating mechanisms 312 are arranged and sorted on the left side of the ship hull center line CL, in the engine room 311 of the ship hull 302. Therefore, the space for setting up in the engine room 311 is downsized as compared with a traditional structure in which a plurality of engines (main engine and auxiliary engine) in an engine room. Therefore, the engine room 311 can be structured compact by shortening the front/rear length of the engine room 311, which in turn facilitates ensuring a hold space (space other than the engine room 311) in the ship hull 302. Two propellers 305 for driving can improve the propulsion efficiency of the ship 301.

Since there are two engine devices 321 which are each a main engine, for example, even when one of the engine device 321 brakes down and cannot be driven, the other one of the engine device 321 enables sailing, and it is possible to ensure redundancy in the motor device of the ship and in turn the ship 301. Further, as is hereinabove mentioned, rotation drive of the propellers 305 and the drive of the shaft-driven generator 323 are possible with the engine devices 321, one of the shaft-driven generators 323 can be reserved as a spare during an ordinary cruise. Therefore, for example, if one engine device 321 or shaft-driven generator 323 breaks down thus shutting down electric power supply, the power supply can be recovered by activating the other shaft-driven generator 323 and establishing the frequency and the voltage. Further, if the engine device 321 stops during the cruise with only that one engine device 321, the power supply can be recovered by activating the other engine device 321 having been stopped and in turn, the shaft-driven generator 323 corresponding to the other engine device 321 and establishing the frequency and the voltage.

Figure 24:
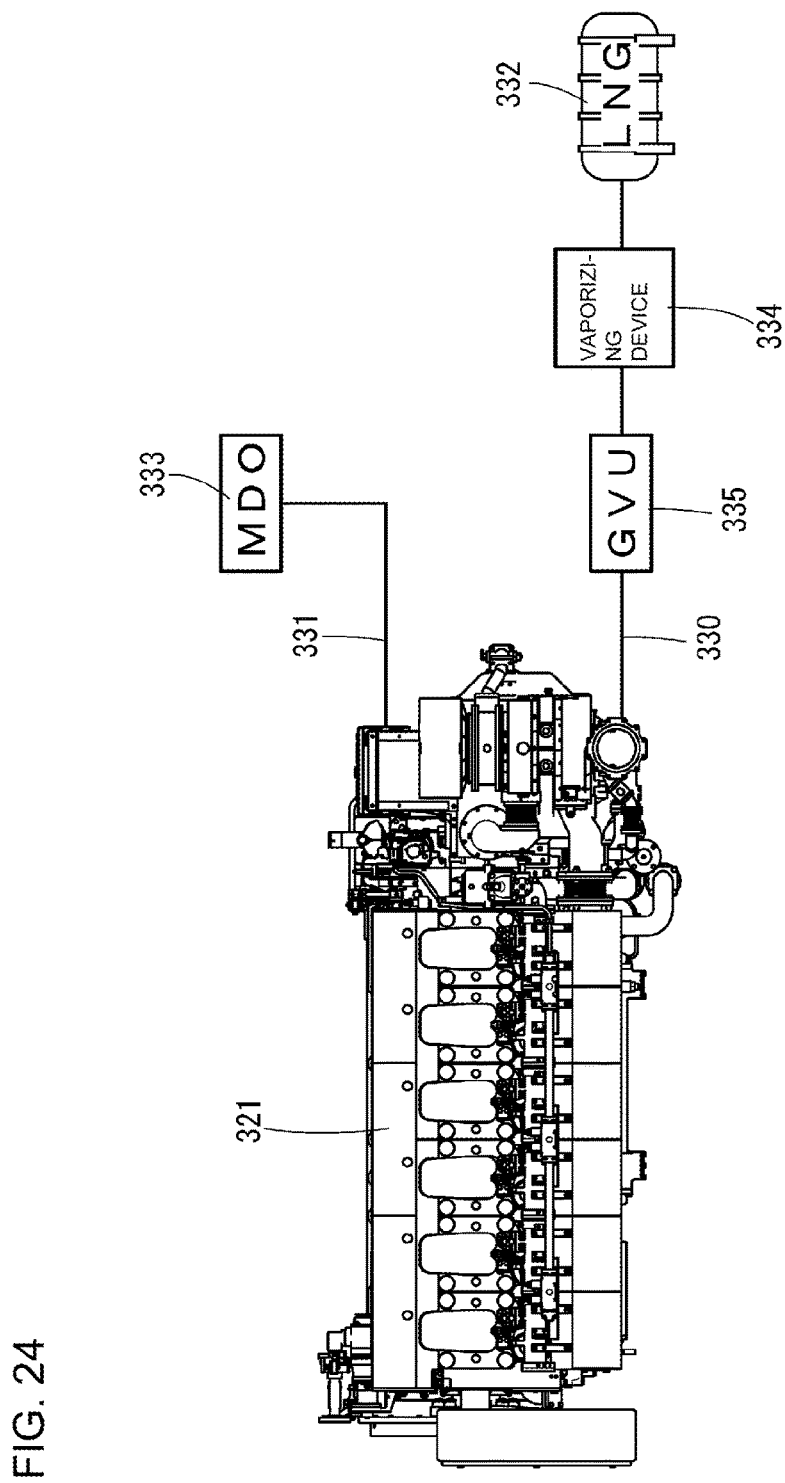
FIG. 24 A schematic view showing a structure of a fuel supply passage of an engine device in the first referential example.
Figure 25:
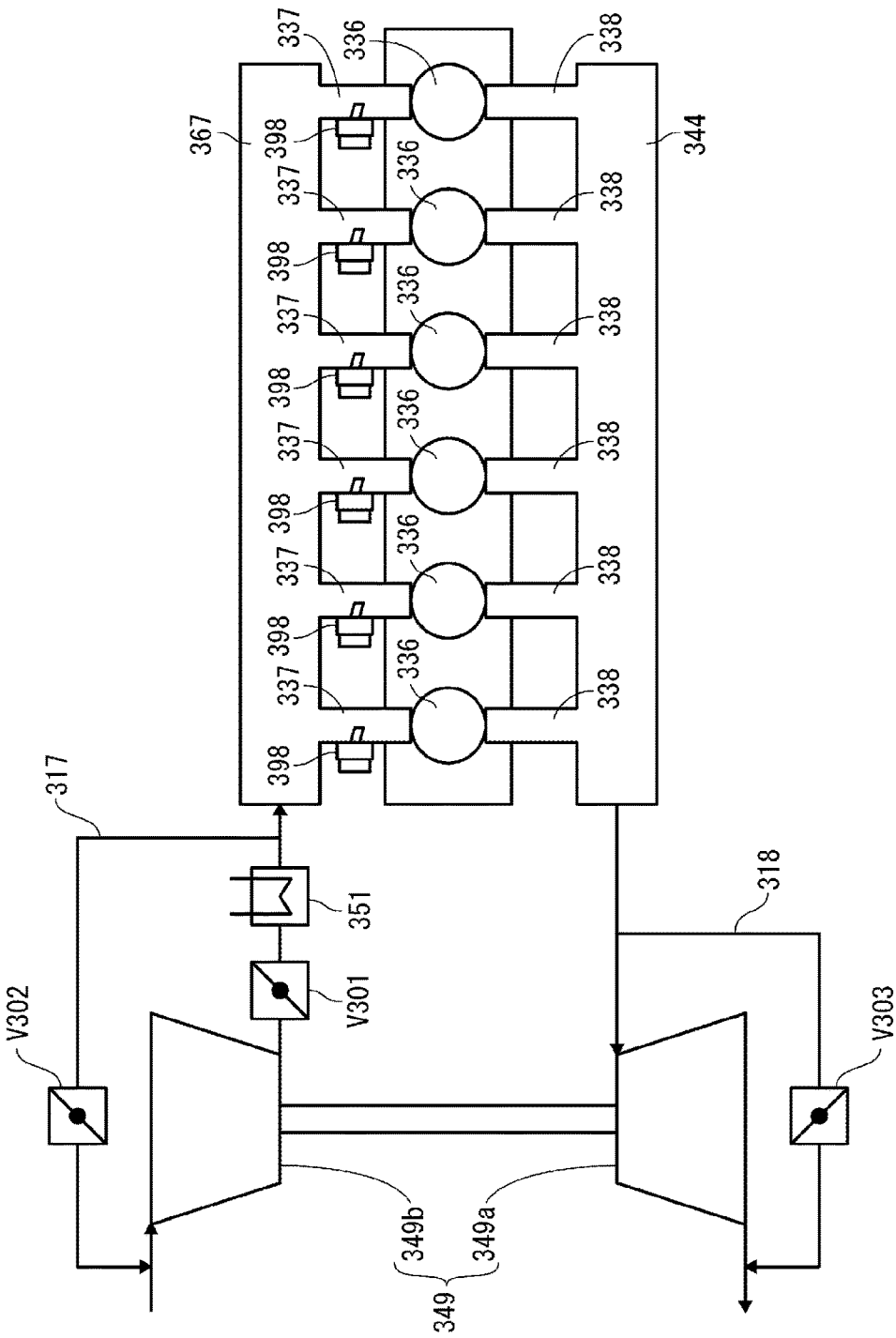
FIG. 25 A schematic view schematically illustrating the structure of an intake/exhaust passage in the engine device.
Figure 26:
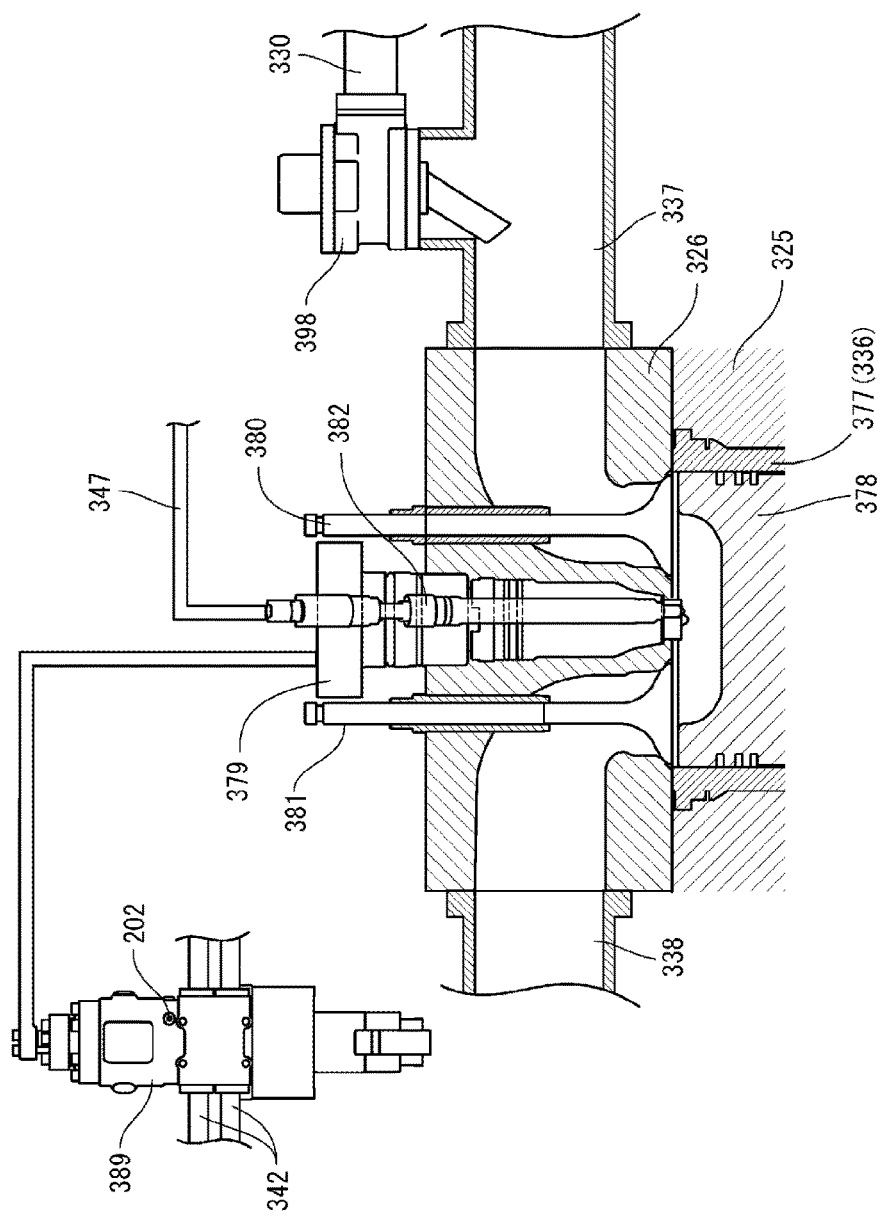
FIG. 26 A schematic view schematically illustrating the structure of the inside of a cylinder head in the engine device.
Figure 27:
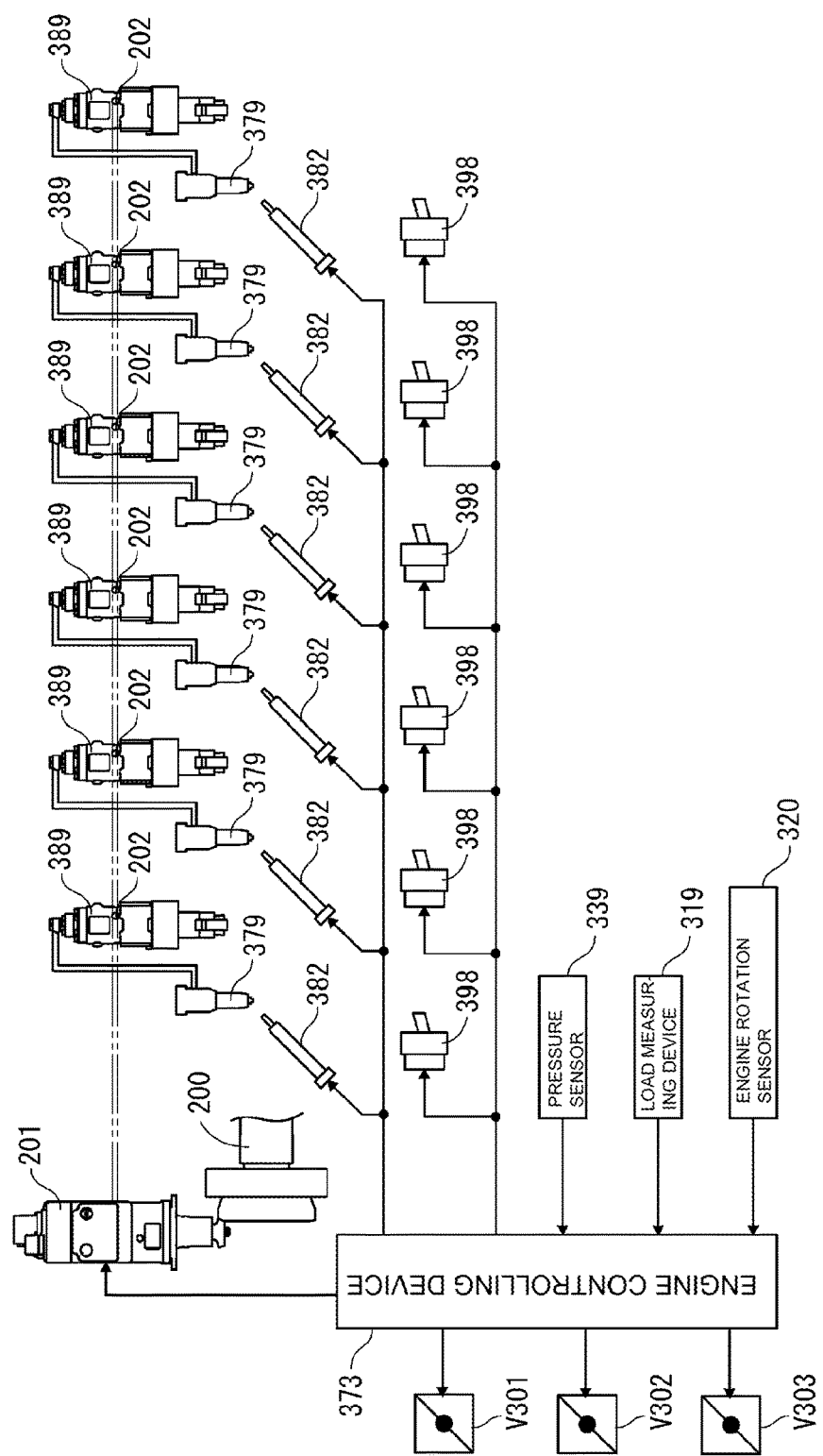
FIG. 27 A control block diagram of the engine device.

Next, the following describes, with reference to FIG. 24 to FIG. 27, a schematic structure of the dual-fuel engine 321 used as the main engine in the above-described ship 301. The dual-fuel engine 321 (hereinafter, simply referred to as "engine device 321") is selectively driven in one of: a premixed combustion mode in which fuel gas such as natural gas is mixed and combusted with the air; and a diffusion combustion mode in which a liquid fuel (fuel oil) such as crude oil is diffused and combusted. FIG. 24 is a diagram showing a fuel system of the engine device 321. FIG. 25 is a diagram showing an intake/exhaust system of the engine device 321. FIG. 27 is a control block diagram of the engine device 321.

As shown in FIG. 24, the engine device 321 is such that fuel is supplied from two systems of fuel supply paths 330, 331, and one of the fuel supply paths 330 is connected to a gas fuel tank 332, while the other one of the fuel supply paths 331 is connected to a liquid fuel tank 333. That is, the engine device 321 is structured so that the fuel gas is supplied from the fuel supply path 330 to the engine device 321, and that fuel oil is supplied to the engine device 321 from the fuel supply path 331. The fuel supply path 330 includes: a gas fuel tank 332 configured to store liquefied gaseous fuel; a vaporizing device 334 configured to vaporize the liquefied fuel (fuel gas) in the gas fuel tank 332; and a gas valve unit 335 configured to adjust a fuel gas supply amount from the vaporizing device 334 to the engine device 321. That is, in the structure of the fuel supply path 330, the vaporizing device 334 and the gas valve unit 335 are arranged in this order from the gas fuel tank 332 towards the engine device 321.

As shown in FIG. 25, the engine device 321 has a structure in which a plurality of cylinders 336 (6 cylinders in the first referential example) are serially aligned in the cylinder block 325. Each cylinder 336 is in communication with an intake manifold (intake passage) 367 (see FIG. 28) structured in the cylinder block 325, through an intake port 337. Each cylinder 336 is in communication with an exhaust manifold (exhaust gas passage) 344 arranged above the cylinder heads 326, through an exhaust port 338. To the intake port 337 of each cylinder 336, a gas injector 398 is arranged. Therefore, while the air from the intake manifold 367 is supplied to each cylinder 336 through the intake port 337, the exhaust gas from each cylinder 336 is ejected to the exhaust manifold 344 through the exhaust port 338. Further, while the engine device 321 is operated in the gas mode, the fuel gas is supplied from the gas injector 398 to the intake port 337. The fuel gas is then mixed with the air from the intake manifold 367, and a premixed gas is supplied to each cylinder 336.

An exhaust gas outlet side of the exhaust manifold 344 is connected to an exhaust gas inlet of a turbine 349a of a turbocharger 349 is connected. An air inlet side (fresh air inlet side) of the intake manifold 367 is connected to an air ejection port (fresh air outlet) of an intercooler 351. An air inlet port (fresh air inlet) of the intercooler 351 is connected to the air ejection port (fresh air outlet) of a compressor 349b of the turbocharger 349. Between the compressor 349b and the intercooler 351, a main throttle valve V301 is arranged. By adjusting the valve opening degree of the main throttle valve V301, the flow rate of air to be supplied to the intake manifold 344 is adjusted.

A supplied-air bypass passage 317 configured to circulate a part of the air exhausted from the outlet of the compressor 349b to the inlet of the compressor 349b connects the air inlet port (fresh air inlet) side of the compressor 349b with the air outlet side of the intercooler 351. That is, the supplied-air bypass passage 317 is opened to the outside air on the upstream side of the air inlet port of the compressor 349b, while being connected to a connection part of the intercooler 351 and the intake manifold 367. On this supplied-air bypass passage 317, a supplied-air bypass valve V302 is arranged. By adjusting the valve opening degree of the supplied-air bypass valve V302, the flow rate of air from the downstream side of the intercooler 351 to the intake manifold 367 is adjusted.

The exhaust bypass passage 318 which bypasses the turbine 349a connects the exhaust gas outlet side of the turbine 349a and the exhaust gas outlet side of the exhaust manifold 344. That is, the exhaust bypass passage 318 is opened to the outside air on the downstream side of the exhaust gas outlet of the turbine 349a, while being connected to a connection part of the exhaust gas outlet of the turbine 349a and the exhaust gas inlet of the turbine 349a. On this exhaust bypass passage 318, an exhaust bypass valve V303 is arranged. By adjusting the valve opening degree of the exhaust bypass valve V303, the exhaust gas flow rate flowing in the turbine 349a, and adjust the air compression amount in the compressor 349b.

The engine device 321 includes: a turbocharger 349 configured to compress the air by the exhaust gas from the exhaust manifold 344; and an intercooler 351 configured to cool compressed air compressed by the turbocharger 349 and supply the compressed air to the intake manifold 367. In the engine device 321, the main throttle valve V301 is provided at the connecting portion between the outlet of the turbocharger 349 and the inlet of the intercooler 351. The engine device 321 includes an exhaust bypass passage 318 connecting an outlet of the exhaust manifold 344 and an exhaust gas outlet of the turbocharger 349, and an exhaust bypass valve V303 is arranged in the exhaust bypass passage 318. In cases of optimizing the turbocharger 349 for a diesel mode specification, an air-fuel ratio suitable for an engine load is achieved even in the gas mode, by controlling the opening degree of the exhaust bypass valve V303 according to fluctuation in the engine load. Therefore, shortage and surplus in the air amount necessary for combustion are prevented at a time of load fluctuation, and the engine device 321 is suitably operated in the gas mode, even if the turbocharger optimized for the diesel mode is used.

The engine device 321 includes the supplied-air bypass passage 317 configured to bypass the turbocharger 349, and the supplied-air bypass valve V302 is arranged in the supplied-air bypass passage 317. By controlling the opening degree of the supplied-air bypass valve V302 according to fluctuation in the engine load, air that matches with the air-fuel ratio required for combustion of the fuel gas is supplied to the engine. Further, by performing in combination a control operation by the supplied-air bypass valve V302 with a good responsiveness, the response speed to the load fluctuation during the gas mode can be accelerated.

In the engine device 321, the supplied-air bypass passage 317 is connected in a position between the inlet of the intercooler 351 and the main throttle valve V301, the compressed air ejected from the compressor 349b is circulated to the inlet of the compressor 349b. This way, the responsiveness of the flow rate control by the exhaust bypass valve V303 is compensated by the supplied-air bypass valve V302, and the control band of the supplied-air bypass valve V302 is compensated by the exhaust bypass valve V303. Therefore, the followability of the air-fuel ratio control during the gas mode can be made favorable, when the load fluctuation takes place or at a time of switching the operation mode in a shipboard application.

As shown in FIG. 26, in the engine device 321, a cylinder 377 (cylinder 336) having a cylindrical shape is inserted in the cylinder block 325. By having the piston 378 reciprocating in the up-down directions in the cylinder 377, the engine output shaft 324 on the lower side of the cylinder 377 is rotated. On each of the cylinder heads 326 on the cylinder block 325, a main fuel injection valve 379 which receives fuel oil (liquid fuel) from fuel oil pipes 342 has its leading end inserted into the cylinder 377. This fuel injection valve 379 has its leading end arranged in a center position on the upper end surface of the cylinder 377, and injects the fuel oil into the main combustion chamber structured by the upper surface of the piston 378 and the inner wall surface of the cylinder 377. Therefore, while the engine device 321 is driven in the diffusion combustion mode, the fuel oil is injected from the fuel injection valve 379 into the main combustion chamber in the cylinder 377, and reacts with the compressed air to cause diffusion combustion.

In each cylinder head 326, an intake valve 380 and an exhaust valve 381 are installed on the outer circumference side of the main fuel injection valve 379. When the intake valve 380 opens, the air from the intake manifold 367 is taken into the main chamber in the cylinder 377. On the other hand, when the exhaust valve 381 opens, the combustion gas (exhaust gas) in the main combustion chamber in the cylinder 377 is exhausted to the exhaust manifold 344. By having a push rod (not shown) reciprocating up and down according to the rotation of the cam shaft (not shown), the locker arm (not shown) swings to reciprocate the intake valve 380 and the exhaust valve 381 in the up and down.

A pilot fuel injection valve 382 that generates ignition flames in the main combustion chamber is obliquely inserted with respect to the cylinder head 326 so its leading end is arranged nearby the leading end of the main fuel injection valve 379. The pilot fuel injection valve 382 adopts a micro pilot injection method and has, on its leading end, a sub chamber from which pilot fuel is injected. That is, in the pilot fuel injection valve 382, the pilot fuel supplied from the common-rail 347 is injected into the sub chamber and combusted, to generate ignition flame in the center position of the main combustion chamber in the cylinder 377. Therefore, while the engine device 321 is driven in the premixed combustion mode, the ignition flame generated by the pilot fuel injection valve 382 causes reaction of a premixed gas which is supplied in the main combustion chamber of the cylinder 377 through the intake valve 380, thus leading to premixed combustion.

As shown in FIG. 27, the engine device 321 has an engine controlling device 373 configured to control each part of the engine device 321. In the engine device 321, the pilot fuel injection valve 382, a combustion injection pump 389, and a gas injector 398 are provided for each cylinder 336. The engine controlling device 373 provides control signals to the pilot fuel injection valve 382, the combustion injection pump 389, and the gas injector 98 to control injection of pilot fuel by the pilot fuel injection valve 382, fuel oil supply by the fuel injection valve 389, and gas fuel supply by the gas injector 398.

As shown in F27, the engine device 321 includes a cam shaft 200 having, for each cylinder 336, an exhaust cam, an intake cam, and a fuel cam not shown). The cam shaft 200 rotates the exhaust cam, the intake cam, and the fuel cam with rotary power transmitted from the crank shaft 324 through a gear mechanism (not shown) to open and close the intake valve 380 and the exhaust valve 381 of each cylinder 336 and to drive the fuel injection pump 389. The engine device 321 includes a speed adjuster 201 configured to adjust a rack position of a control rack 202 in the fuel injection pump 389. The speed adjuster 201 measures the engine rotation number of the engine device 321 based on the rotation number of the leading end of the cam shaft 200, to set the rack position of the control rack 202 in the fuel injection pump 389, thereby adjusting the fuel injection amount.

The engine controlling device 373 provides control signals to the main throttle valve V301 and the supplied-air bypass valve V302, and the exhaust bypass valve V303 to adjust their valve opening degrees, thereby adjusting the air pressure (intake manifold pressure) in the intake manifold 367. The engine controlling device 373 detects the intake manifold pressure based on a measurement signal from the pressure sensor 339 configured to measure the air pressure in the intake manifold 367. The engine controlling device 373 calculates the load imposed to the engine device 321, based on a measurement signal from a load measuring device 319 such as a watt transducer and a torque sensor. The engine controlling device 373 detects the engine rotation number of the engine device 321, based on a measurement signal from an engine rotation sensor 320 such as a pulse sensor configured to measure the rotation number of the crank shaft 324.

When the engine device 321 is operated in the diesel mode, the engine controlling device 373 controls opening and closing of the control valve in the fuel injection pump 389, and causes combustion in each cylinder 336 at a predetermined timing. That is, by opening the control valve of the fuel injection pump 389 according to an injection timing of each cylinder 336, the fuel oil is injected into the cylinder 336 through the main fuel injection valve 379, and ignited in the cylinder 336. Further, in the diesel mode, the engine controlling device 373 stops supply of the pilot fuel and the fuel gas.

In the diesel mode, the engine controlling device 373 performs feedback control for an injection timing of the main fuel injection valve 379 in the cylinder 336, based on the engine load (engine output) measured by the load measuring device 319 and the engine rotation number measured by the engine rotation sensor 320. This way, the engine 321 outputs an engine load needed by propulsion/electric power generating mechanism 312 and rotates at an engine rotation number according to the propulsion speed of the ship. Further, the engine controlling device 373 controls the opening degree of the main throttle valve V301 based on the intake manifold pressure measured by the pressure sensor 339, so as to supply compressed air from the turbocharger 349 to the intake manifold 367, at an air flow rate according to the required engine output.

While the engine device 321 is operated in the gas mode, the engine controlling device 373 adjusts the valve opening degree in the gas injector 398 to set the flow rate of fuel gas supplied to each cylinder 336. Then, the engine controlling device 373 controls opening and closing of the pilot fuel injection valve 382 to cause combustion in each cylinder 336 at a predetermined timing. That is, the gas injector 398 supplies the fuel gas to the intake port 337, at a flow rate based on the valve opening degree, mix the fuel gas with the air from the intake manifold 367, and supplies the premixed fuel to the cylinder 336. Then, the control valve of the pilot fuel injection valve 382 is opened according to the injection timing of each cylinder 336, thereby generating an ignition source by the pilot fuel and ignite in the cylinder 336 to which the premixed gas is supplied. Further, in the gas mode, the engine controlling device 373 stops supply of the fuel oil.

In the gas mode, the engine controlling device 373 performs feedback control for the fuel gas flow rate by the gas injector 398 and for an injection timing of the pilot fuel injection valve 382 in the cylinder 336, based on the engine load measured by the load measuring device 319 and the engine rotation number measured by the engine rotation sensor 320. Further, the engine controlling device 373 adjusts the opening degrees of the main throttle valve V301, the supplied-air bypass valve V302, and the exhaust bypass valve V303, based on the intake manifold pressure measured by the pressure sensor 339. This way, the intake manifold pressure is adjusted to a pressure according to the required engine output, and the air-fuel ratio of the fuel gas supplied from the gas injector 398 can be adjusted to a value according to the engine output.

Figure 28:
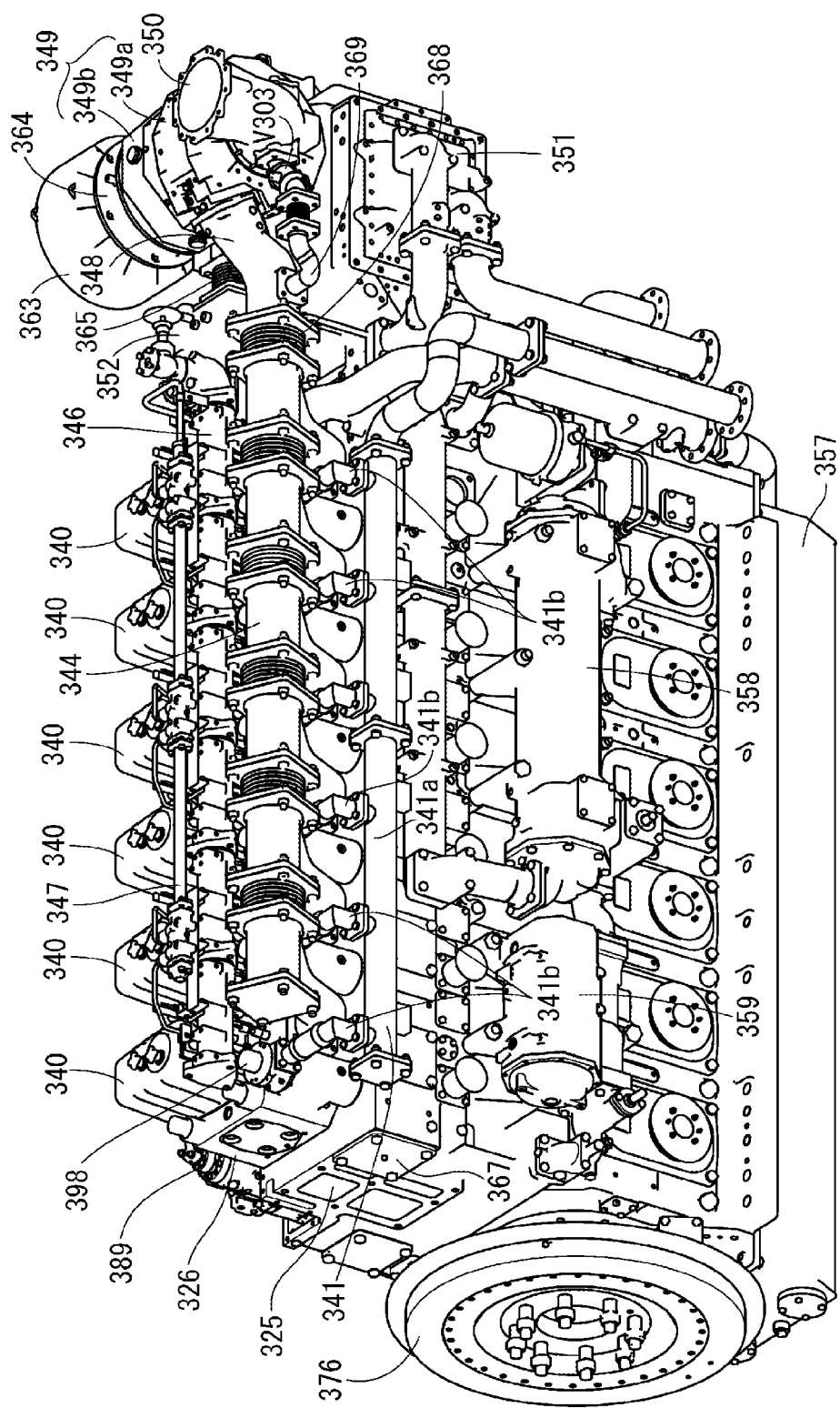
FIG. 28 A perspective view showing a side (right side face) of the engine device of the first referential example, on which side the exhaust manifold is installed.
Figure 29:
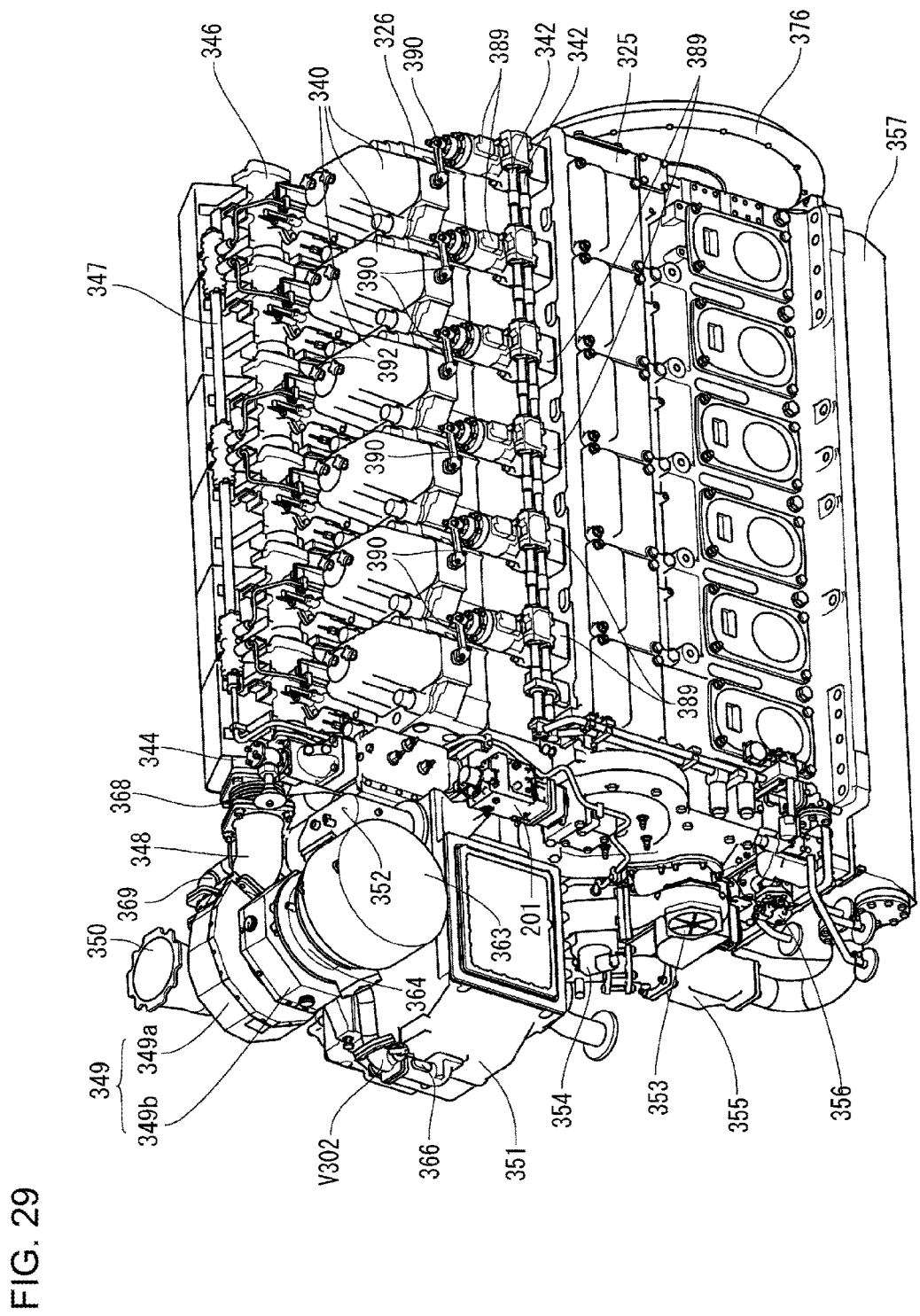
FIG. 29 A perspective view showing a side (right side face) of the engine device, on which side the fuel injection pump is installed.
Figure 30:
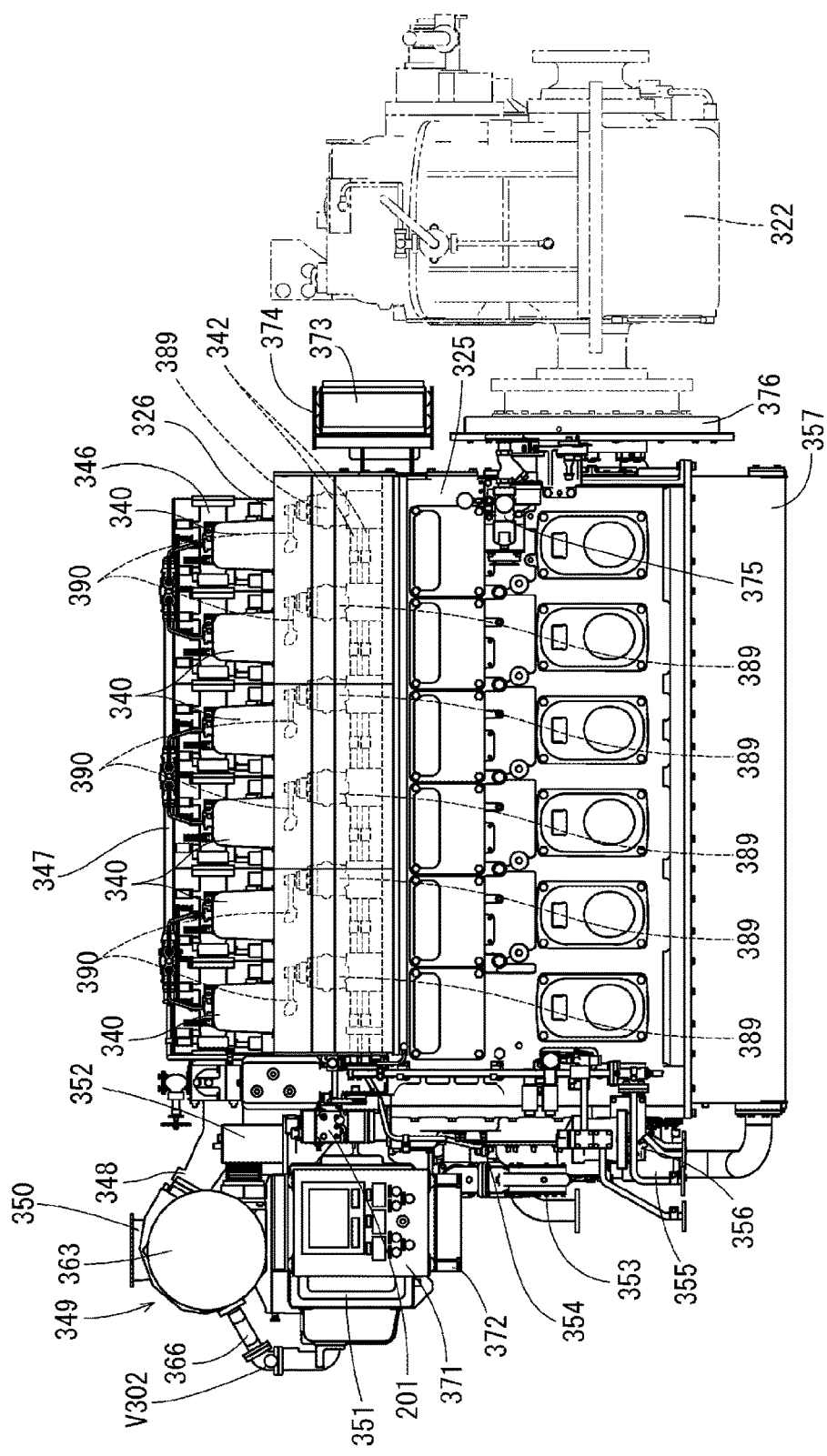
FIG. 30 A left side view of the engine device.

Next, the following details the structure of the dual-fuel engine 321 (engine device 321) having the above schematic structure, with reference to FIG. 28 to FIG. 30. In the following description, the positional relationship of the front, rear, left, and right in the structure of the engine device 321 are designated with the side connecting to the speed reducer 322 as the rear side.

As shown in FIG. 28 to FIG. 30, the engine device 321 has the cylinder heads 326 having a plurality of head covers 340 aligned in a single array in the front-rear direction, on the cylinder block 325 arranged on the base mount 327 (see FIG. 22). The engine device 321 has a gas manifold (gaseous fuel pipe) 341 extended in parallel to the array of the head covers 340, on the right side faces of the cylinder heads 326, and fuel oil pipes (liquid fuel pipes) 342 extended in parallel to the array of the head covers 340, on the left side face of the cylinder block 325. Further, on the upper side of the gas manifold 341, the later-described exhaust manifold (exhaust gas passage) 344 extends parallel to the array of the head covers 340.

Between the array of the head covers 340 and the exhaust manifold 344, an on-cylinder head cooling water pipe 346 connecting to a cooling water passage in the cylinder heads 326 is extended in parallel to the array of the head covers 340. On the upper side of the cooling water pipe 346, a common-rail (pilot fuel pipe) 47 configured to supply a pilot fuel such as light oil is extended in parallel to the array of the head covers 340, similarly to the cooling water pipe 346. At this time, the cooling water pipe 346 is connected to and supported by the cylinder heads 326, and the common-rail 347 is connected to and supported by the cooling water pipe 346.

The front end of the exhaust manifold 344 (exhaust gas outlet side) is connected to the turbocharger 349 through the exhaust gas relay pipe 348. Therefore, exhaust gas exhausted through the exhaust manifold 344 flows into the turbine 349a of the turbocharger 349 through the exhaust gas relay pipe 348, thus rotating the turbine 349a and rotating the compressor 349b on the same shaft as the turbine 349a. The turbocharger 349 is arranged on the upper side of the front end of the engine device 321, and has the turbine 349a on its right side, and the compressor 349b on the left side. An exhaust gas outlet pipe 350 is arranged on the right side of the turbocharger 349, and is connected to the exhaust gas outlet of the turbine 349a, to output exhaust gas from the turbine 349a to the exhaust path 328 (see FIG. 22).

On the lower side of the turbocharger 349, an intercooler 351 that cools down a compressed air from the compressor 349b of the turbocharger 349 is arranged. That is, on the front end side of the cylinder block 325, the intercooler 351 is installed, and the turbocharger 349 is placed in the upper part of the intercooler 351. In the laterally middle layer position of the turbocharger 349, the air ejection port of the compressor 349b is provided so as to be open rearwards (towards the cylinder block 325). On the other hand, on the top surface of the intercooler 351, an air inlet port is provided which opens upward, and through this air inlet port, compressed air ejected from the compressor 349b flows into the intercooler 351. The air ejection port of the compressor 349b and the air inlet port of the intercooler 351 are in communication with each other through an intake relay pipe 352 two which one ends of the ports are connected. The intake relay pipe 352 has the above-described main throttle valve V301 (see FIG. 25).

On the front end surface (front surface) of the engine device 321, a cooling water pump 353, a pilot fuel pump 354, a lubricating oil pump (priming pump) 355, and a fuel oil pump 356 are installed on the outer circumference side of the engine output shaft 324. The cooling water pump 353 and the fuel oil pump 356 are arranged up and down close to the left side face, respectively, and the pilot fuel pump 354 and the lubricating oil pump 355 are arranged up and down close to the right side face, respectively. Further, in the front end portion of the engine device 321, a rotation transmitting mechanism (not shown) configured to transmit rotary power of the engine output shaft 324. This way, the rotary power from the engine output shaft 324 is transmitted through the rotation transmitting mechanism to rotate the cooling water pump 353, the pilot fuel pump 354, the lubricating oil pump 355, and the fuel oil pump 356 provided on the outer circumference of the engine output shaft 324. Further, in the cylinder block 325, a cam shaft (not shown) whose axial direction is in the front-rear direction is pivotally supported on the upper side of the cooling water pump 353, and the cam shaft also rotated by the rotary power of the engine output shaft 324 transmitted through the rotation transmitting mechanism.

On the lower side of the cylinder block 325, an oil pan 357 is provided, and the lubricating oil that flows in the cylinder block 325 is accumulated in this oil pan 57. The lubricating oil pump 355 is connected to a suction port at the lower side of the oil pan 357 via the lubricating oil pipe, and sucks the lubricating oil accumulated in the oil pan 357. Further, the lubricating oil pump 355 has its ejection port on the upper side connected to the lubricating oil inlet of a lubricating oil cooler 358 through the lubricating oil pipe so as to supply the lubricating oil sucked from the oil pan 357 to the lubricating oil cooler 358. The front and the rear of the lubricating oil cooler 358 serve as the lubricating oil inlet and the lubricating oil outlet, respectively, and the lubricating oil outlet is connected to a lubricating oil strainer 359 through a lubricating oil pipe. The front and the rear of the lubricating oil strainer 359 serve as the lubricating oil inlet and the lubricating oil outlet, respectively, and the lubricating oil outlet is connected to the cylinder block 325. Thus, the lubricating oil fed from the lubricating oil pump 355 is cooled in the lubricating oil cooler 358, and then purified by the lubricating oil strainer 359.

The turbocharger 349 pivotally supports, on the same shaft, the compressor 349b and the turbine 349a arranged on the left and right. Based on rotation of the turbine 349a introduced from the exhaust manifold 344 through the exhaust gas relay pipe 348, the compressor 349b is rotated. Further, the turbocharger 349 has, on the left side of the compressor 349b serving as fresh air intake side, an intake filter 363 which removes dust from outside air introduced and a fresh air passage pipe 364 connecting the intake filter 363 and the compressor 349b. By having the compressor 349b rotate in sync with the turbine 349a, the outside air (air) taken in to the intake filter 363 is introduced into the compressor 349b through the turbocharger 349. The compressor 349b then compresses the air taken in from the left side and ejects the compressed air to the intake relay pipe 352 installed on the rear side.

The intake relay pipe 352 has its upper front portion opened and connected to the ejection port on the rear of the compressor 349b, and has its lower side opened and connected to the inlet port on the top surface of the intercooler 351. Further, at a branching port provided on an air passage on the front surface of the intercooler 351, one end of a supplied-air bypass pipe 366 (supplied-air bypass passage 317) is connected, and a part of compressed air cooled by the intercooler 351 is ejected to the supplied-air bypass pipe 366. Further, the other end of the supplied-air bypass pipe 366 is connected to a branching port provided on the front surface of the fresh air passage pipe 364, and a part of the compressed air cooled by the intercooler 351 is circulated to the fresh air passage pipe 364 through the supplied-air bypass pipe 366, and merges with the outside air from the intake filter 363. Further, the supplied-air bypass pipe 366 has the supplied-air bypass valve V302 arranged in its midway portion.

In the intercooler 351, compressed air from the compressor 349b flows in from the left rear side through the intake relay pipe 352, and the compressed air is cooled through a heat exchanging action with cooling water supplied from water-supply pipe 362. The compressed air cooled on a left chamber inside the intercooler 351 flows in the air passage on the front and is introduced into a right chamber, and then ejected to the intake manifold 367 through an ejection port provided on the rear of the right chamber. The intake manifold 367 is provided on the right side face of the cylinder block 325, and is extended in parallel to the head cover 340, on the lower side of the gas manifold 341. It should be noted that, the flow rate of the compressed air supplied to the intake manifold 367 is set by determining the flow rate of the compressed air circulated from the intercooler 351 to the compressor 349b according to the opening degree of the supplied-air bypass valve V302.

Further, the turbine 349a of the turbocharger 349 connects the inlet port at the rear with the exhaust gas relay pipe 348, and connects the ejection port on the right side with the exhaust gas outlet pipe 350. This way, in the turbocharger 349, exhaust gas is introduced to the inside of the turbine 349a from the exhaust manifold 344 through the exhaust gas relay pipe 348, thus rotating the turbine 349a as well as the compressor 349b, and is exhausted from the exhaust gas outlet pipe 350 to the exhaust path 328 (see FIG. 22). The exhaust gas relay pipe 348 has its rear side opened and connected with the ejection port of the exhaust manifold 344 through a bellows pipe 368, while having its front side opened and connected to the inlet port on the rear side of the turbine 349a.

Further, a branching port is provided on the right face side in a midway position of the exhaust gas relay pipe 348, and one end of an exhaust bypass pipe 369 (exhaust bypass passage 318) is connected to this branching port of the exhaust gas relay pipe 348. The other end of the exhaust bypass pipe 369 is connected to a merging port provided at the rear of the exhaust gas outlet pipe 350, and bypasses a part of exhaust gas ejected from the exhaust manifold 344 to the exhaust gas outlet pipe 350 without the turbocharger 349. Further, the exhaust bypass pipe 369 has the exhaust bypass valve V303 in its midway portion, and the flow rate of exhaust gas supplied to the turbine 349a is adjusted by setting the flow rate of the exhaust gas to be bypassed from the exhaust manifold 344 to the exhaust gas outlet pipe 350, according to the opening degree of the exhaust bypass valve V303.

A machine side operation control device 371 configured to control starting up and stopping and the like of the engine device 321 is fixed to the left side face of the intercooler 351 through a supporting stay (support member) 372. The machine side operation control device 371 includes a switch that receives an operation by operating personnel for starting up or stopping the engine device 321, and a display that indicates states of each part of the engine device 321. The speed adjuster 201 is fixed on the front end of the left side face of the cylinder head 326. On the rear end side of the left side face of the cylinder block 325, an engine starting device 375 configured to start the engine device 321 is fixed.

Further, the engine controlling device 373 configured to control operations of each part of the engine device 321 is fixed on the trailing end surface of the cylinder block 325 through a supporting stay (supporting member 374). On the rear end side of the cylinder block 325, there is installed a flywheel 376 connected to the speed reducer 322 to rotate, and the engine control device 373 is arranged in an upper part of a flywheel 376. The engine control device 373 is electrically connected to sensors (a pressure sensor and a temperature sensor) in each part of the engine device 321 to collect temperature data, pressure data, and the like of each part of the engine device 321, and provides electromagnetic signals to an electromagnetic valve and the like of each part of the engine device 321 to control various operations (fuel oil injection, pilot fuel injection, gas injection, cooling water temperature adjustment, and the like) of the engine device 321.

The cylinder block 325 is provided with a stepwise portion on the upper side of the left side face, and the same number of fuel injection pumps 389 as those of the head covers 340 and the cylinder heads 326 are installed on the top surface of the stepwise portion of the cylinder block 325. The fuel injection pumps 389 are arranged in a single array along the left side face of the cylinder block 325, and their left side faces are connected to the fuel oil pipes (liquid fuel pipes) 342, and their upper ends are connected to the left side face of the cylinder head 326 on the right front, through fuel discharge pipes 390. Of two upper and lower fuel oil pipes 342, one is an oil supply pipe that supplies fuel oil to the fuel injection pump 389, and the other is an oil return pipe that returns the fuel oil from the fuel injection pump 389. Further, the fuel discharge pipes 390 each connects to a main fuel injection valve 379 (see FIG. 26) via a fuel passage in each cylinder head 326 to supply the fuel oil from the fuel injection pump 389 to the main fuel injection valve 379.

The fuel injection pumps 389 are provided in parallel to the array of the head covers 340, in positions at the rear left of the cylinder heads 326 each connected to the fuel discharge pipe 390, on the stepwise portion of the cylinder block 325. Further, the fuel injection pumps 389 are aligned in a single array in position between the cylinder heads 326 and the fuel oil pipes 342. Each fuel injection pump 389 performs an operation of pushing up a plunger by rotation of pump cam on the cam shaft (not shown) in the cylinder block 325. By pushing up the plunger, the fuel injection pump 389 raises the pressure of the fuel oil supplied to the fuel oil pipe 342 to a high pressure, and supplies the high pressure fuel oil in the cylinder head 326 to the fuel injection pump 389 via the fuel discharge pipe 390.

The front end of the common-rail 347 is connected to the ejection side of the pilot fuel pump 354, and the pilot fuel ejected from the pilot fuel pump 354 is supplied to the common-rail 347. Further, the gas manifold 341 extends along the array of the head covers 340 at a height position between the exhaust manifold 344 and the intake manifold 367. The gas manifold 341 includes a gas main pipe 341*a* extending in the front/rear direction and having its front end connected to a gas inlet pipe 397; and a plurality of gas branch pipes 341*b* branched off from the upper surface of the gas main pipe 341*a* towards the cylinder heads 326. The gas main pipe 341*a* has on its upper surface connection flanges at regular intervals, which are fastened to the inlet side flanges of the gas branch pipes 341*b*. An end portion of each gas branch pipe 341*b* on the opposite side to the portion connecting to the gas main pipe 341*a* is connected to the right side face of a sleeve in which the gas injector 398 is inserted from above.

Figure 31:
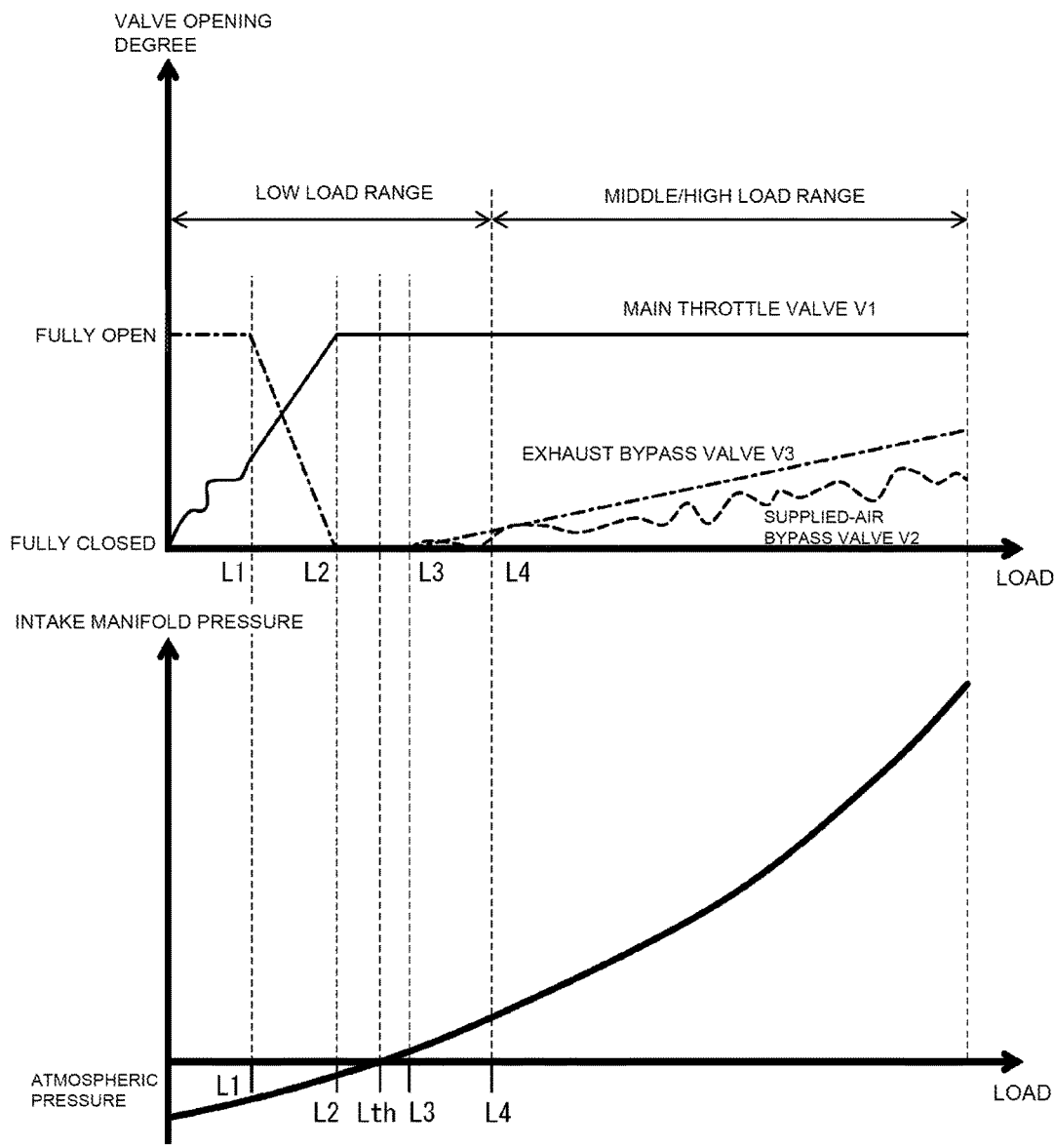
FIG. 31 A diagram for explaining the air-fuel ratio control with respect to the load when the engine device is operated in a gas mode.

Next, the following describe, with mainly FIG. 31 and the like, an air flow rate control at a time of operating the dual-fuel engine 321 (engine device 321) having the above-described structure in the gas mode.

As shown in FIG. 31, the engine controlling device 373 performs a feedback control (PID control) with respect to the valve opening degree of the main throttle valve V301, when the engine load is in a low load range (load range of not more than load L4) and less than a predetermined load L1. At this time, the engine controlling device 373 sets a target value (target pressure) of the intake manifold pressure according to the engine load. Then, the engine controlling device 373 receives a measurement signal from the pressure sensor 339 and confirms the measured value (measured pressure) of the intake manifold pressure to obtain the difference from the target pressure. This way, based on the difference value between the target pressure and the measured pressure, the engine controlling device 373 executes the PID control of the valve opening degree of the main throttle valve V301 to bring the air pressure of the intake manifold 367 close to the target pressure.

When the engine load is the predetermined load L1 or higher, the engine controlling device 373 performs a map control with respect to the valve opening degree of the main throttle valve V301. At this time, the engine controlling device 373 refers to a data table DT1 storing the valve opening degrees of the main throttle valve V301 relative to the engine loads, and sets a valve opening degree of the main throttle valve V301 corresponding to the engine load. When the engine load is a load L2 (L1<L2<Lth<L4) or higher, the engine controlling device 373 performs control to fully open the main throttle valve V301. It should be noted that the load L2 is in the low load range, and is set to be a lower load than a load Lth at which the intake manifold pressure is the atmospheric pressure.

When the engine load is in the low load range and lower than a predetermined load L3 (Lth<L3<L4), the engine controlling device 373 performs control to fully open the supplied-air bypass valve V302. When the engine load is the predetermined load L3 or higher, the engine controlling device 373 performs feedback control (PID control) with respect to the valve opening degree of the supplied-air bypass valve V302. At this time, based on the difference value between the target pressure according to the engine load and the measured pressure by the pressure sensor 339, the engine controlling device 373 executes the PID control of the valve opening degree of the supplied-air bypass valve V302 to bring the air pressure of the intake manifold 367 close to the target pressure.

The engine controlling device 373 performs map control with respect to the valve opening degree of the exhaust bypass valve V303, throughout the entire range of engine load. At this time, the engine controlling device 373 refers to a data table DT2 storing the valve opening degrees of the exhaust bypass valve V303 relative to the engine loads, and sets a valve opening degree of the exhaust bypass valve V303 corresponding to the engine load. That is, when the engine load is lower than the predetermined load L1, the exhaust bypass valve V303 is fully opened. When the engine load is the predetermined load L1 or higher, the opening degree of the exhaust bypass valve V303 is monotonically reduced, and the exhaust bypass valve V303 is fully opened at the predetermined load L2. Then, while the engine load is higher than the predetermined load L2, but not more than the predetermined load L3, the exhaust bypass valve V303 is fully opened. When the engine load is higher than the predetermined load L3 in the low load range, the opening degree of the exhaust bypass valve V303 is monotonically increased with respect to the engine load. That is, the exhaust bypass valve V303 is gradually opened.

As shown in FIG. 31, when the load imposed to the engine (engine load) is in the low load range, and higher than a first predetermined load L3, the engine controlling device 373 controls the opening degree of the main throttle valve V301 to be fully opened. Further, the engine controlling device 373 adjusts the pressure of the intake manifold 367 to a target value according to the load, by performing feedback control (PID control) with respect to the supplied-air bypass valve V302 and by performing map control with respect to the exhaust bypass valve V303. While the load on the engine is the first predetermined load L3, the supplied-air bypass valve V302 and the exhaust bypass valve V303 are fully opened.

In cases of optimizing the turbocharger 349 for a diesel mode specification, the responsiveness of the pressure control for the intake manifold 367 is made suitable even in the gas mode operation, by controlling the opening degree of the supplied-air bypass valve V302 according to fluctuation in the engine load. Therefore, shortage and surplus in the air amount necessary for combustion are prevented at a time of load fluctuation, and the engine device 321 is suitably operated in the gas mode, even if it uses the turbocharger 349 optimized for the diesel mode.

Further, by controlling the opening degree of the exhaust bypass valve V303 according to fluctuation in the engine load, air that matches with the air-fuel ratio required for combustion of the gaseous fuel is supplied to the engine device 321. Further, by performing in combination a control operation by the supplied-air bypass valve V302 with a good responsiveness, the response speed to the load fluctuation during the gas mode can be accelerated. Therefore, knocking due to an insufficient amount of air required for combustion at the time of load fluctuation can be prevented.

Further, when the engine load is in the low load range and is lower than a second predetermined load L1 which is lower than the first predetermined load L3, the feedback control (PID control) is performed with respect to the main throttle valve V301. On the other hand, when the engine load is higher than the second predetermined load L1, the engine controlling device 373 performs the map control based on the data table DT1 with respect to the main throttle valve V301. Further, when the engine load is determined as to be lower than the predetermined load L1, the supplied-air bypass valve V302 is fully opened, and the exhaust bypass valve V303 is fully opened. That is, when the pressure of the exhaust manifold 344 is a negative pressure which is lower than the atmospheric pressure, the exhaust bypass valve V303 is fully opened to stop driving of the turbine 349a, so that surging and the like in the turbocharger 349 can be prevented. Further, by fully opening the supplied-air bypass valve V302, control of the intake manifold pressure by the main throttle valve V1 can be made highly responsive.

Further, when the engine load is the second predetermined load L1 or higher, but lower than the third predetermined load L2 which takes a value between the first and second predetermined loads L3 and L1, the map control based on the data table DT1 is performed with respect to the main throttle valve V301. Further, the supplied-air bypass valve V302 is fully opened, and the exhaust bypass valve V303 is subjected to the map control based on a data table DT2. When the engine load is equal to the first predetermined load L3, the main throttle valve V301 is fully opened, and the supplied-air bypass valve V302 and the exhaust bypass valve V303 are fully opened, thereby enabling switching over from the diesel mode to the gas mode.

Figure 32:
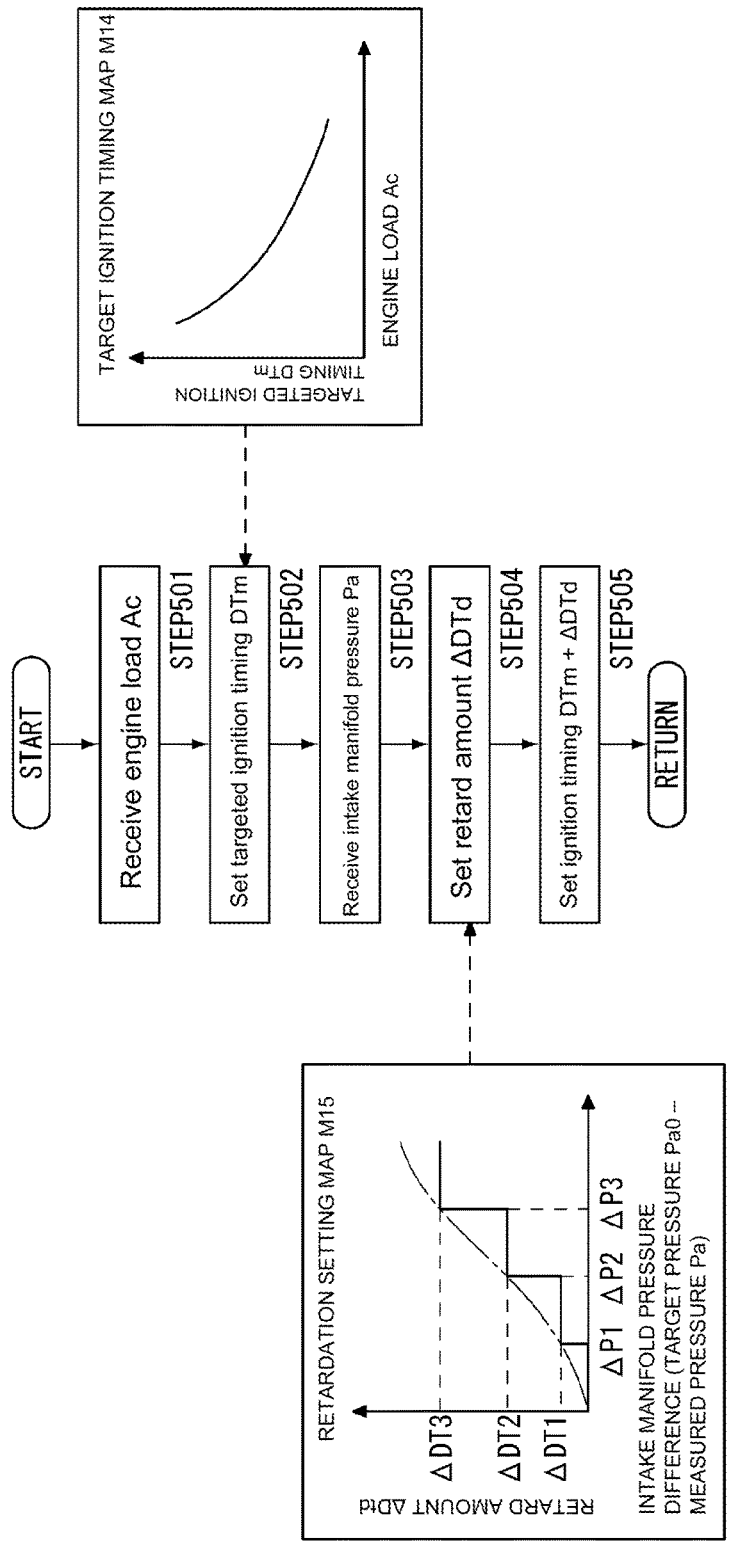
FIG. 32 A flowchart showing operations in a setting control of ignition timing by an engine controlling device.

As shown in FIG. 32, when the engine load (generator output or engine torque) Ac measured by the load measuring device 319 is received during an operation in the gas mode, the engine controlling device 373 determines a targeted ignition timing (ordinary ignition timing) for the pilot fuel injection valve 382, with reference to target ignition timing map M14. The target ignition timing map M14 indicates the correlation between the engine load AC and the targeted ignition timing DTm, and is for determining the targeted ignition timing DTm with respect to the engine load Ac. Further, the engine controlling device 373 performs in multiple steps a retard control of ignition timing, when the air amount is determined as to be insufficient in the premixed fuel obtained by pre-mixing the gaseous fuel with the air, and performs in multiple steps an advance control of ignition timing, when the air amount is determined as to be sufficient.

That is, as shown in FIG. 32, the engine controlling device 373 sets the targeted ignition timing DTm by referring to the target ignition timing map M14, and sets a retard amount ΔDTd by referring to a retardation setting map M15, to cause ignition at the pilot fuel injection valve 382 at an ignition timing DTm+ΔDTd. The target ignition timing map M14 indicates the correlation between the engine load (generator output or engine torque) Ac measured by the load measuring device 319 and the targeted ignition timing DTm, and is for determining the targeted ignition timing DTm with respect to the engine load Ac. The retardation setting map M15 indicates the correlation between a parameter based on which prediction of insufficiency in the air amount is based and the retard amount ΔDTd, and is for determining the retard amount ΔDTd with respect to the predicted air amount insufficient state.

As shown in FIG. 32, in the retardation setting map M15, the retard amount ΔDTd is varied in multiple steps according to the difference (Pa0−Pa) between the target value Pa0 (target pressure) of the intake manifold pressure and the measured value Pa (measured pressure) of the intake manifold pressure. That is, when the intake manifold pressure differential (Pa0−Pa) is ΔP1 or higher, the retard amount ΔDTd is set to a value ΔDT1. When the intake manifold pressure differential (Pa0−Pa) is ΔP2 (ΔP2>ΔP1) or higher, the retard amount ΔDTd is set to a value ΔDT2 (ΔP2>ΔP1). When the intake manifold pressure differential (Pa0−Pa) is ΔP3 (ΔP3>ΔP2) or higher, the retard amount ΔDTd is set to a value ΔDT3 (ΔP3>ΔP2). That is, the retardation setting map M15 intermittently stores values of the retard amount which is monotonically increased with respect to the difference resulting from subtracting the measured pressure from the target pressure.

The following details the setting control for the ignition timing by the engine controlling device 373 during operation in the gas mode, with reference to flowchart of FIG. 32. As shown in FIG. 32, when the engine load (generator output or engine torque) Ac measured by the load measuring device 319 is received (STEP501), the engine controlling device 373 determines and stores a targeted ignition timing (ordinary ignition timing) DTm for the pilot fuel injection valve 382, with reference to target ignition timing map M14 (STEP502). After the targeted ignition timing DTm is determined, the engine controlling device 373 obtains a value Pa (measured pressure) of the intake manifold pressure measured by the intake manifold pressure sensor 339 (STEP503).

Then, referring to the retardation setting map M15, the engine controlling device 73 determines the retard amount ΔDTd based on a difference (Pa0−Pa) between the target value Pa0 (target pressure) of the intake manifold pressure set in the valve control operation based on the flowchart of FIG. 32 and the value Pa (measured pressure) of the intake manifold pressure (STEP504). Then, the engine controlling device 373 sets an ignition timing DTm+ΔDTd based on the targeted ignition timing DTm stored in the STEP501 and the retard amount ΔDTd determined in STEP504 (STEP 505).

In this setting control of the ignition timing by the engine controlling device 373, the retard amount is determined by referring to the retardation setting map M15. Therefore, the ignition timing can be retarded in multiple steps according to the predicted insufficient amount of air based on the difference between the target pressure Pa0 and the measured pressure Pa. Accordingly, while the probability of knocking taking place due to fluctuation in the output, a drop in the thermal efficiency (engine output efficiency) is suppressed to the minimum.

Figure 33:
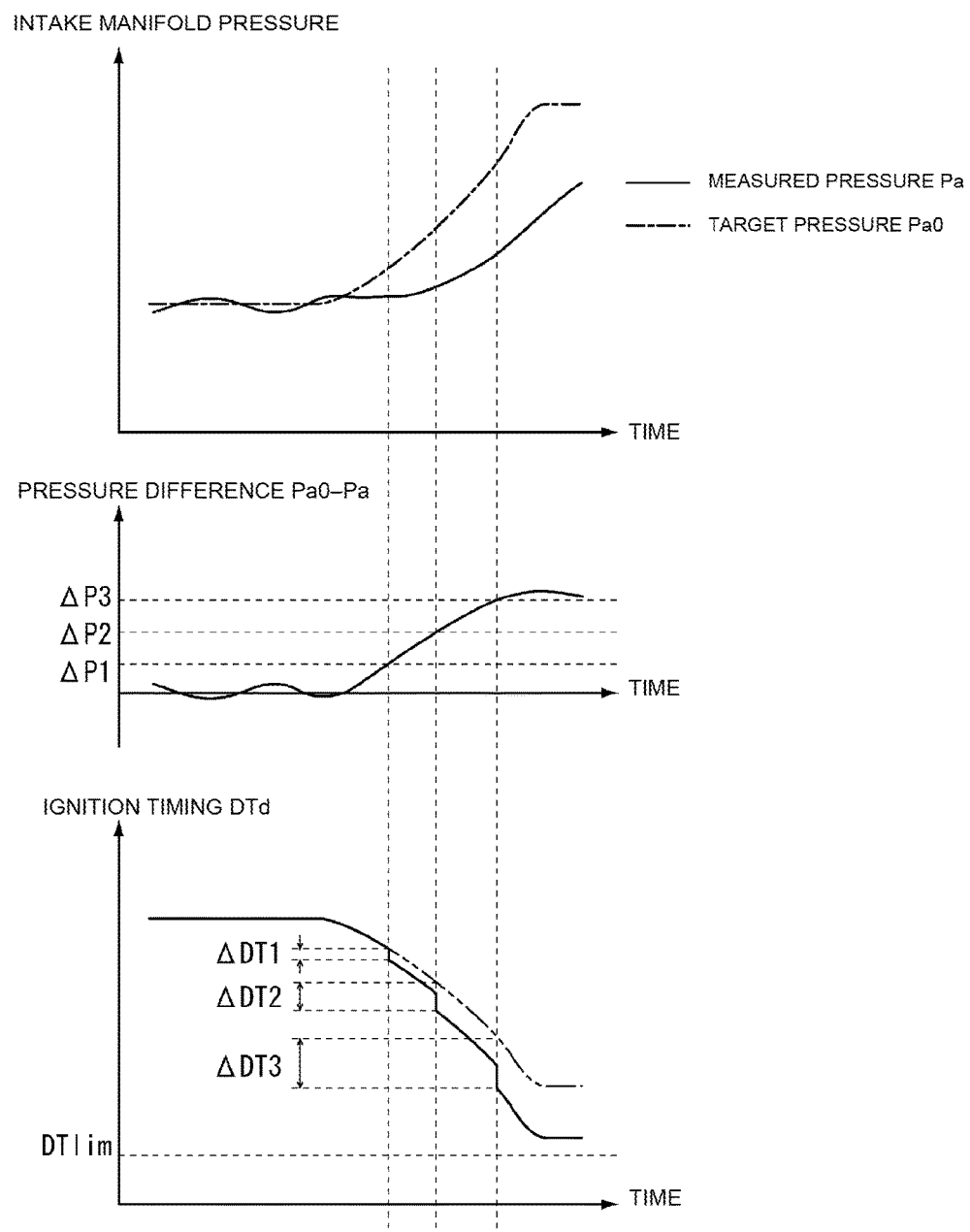
FIG. 33 A time chart of the control.

Through this setting control of the ignition timing by the engine controlling device 373 during the operation in the gas mode, the ignition timing DTd is retarded according to the difference between the target pressure Pa0 and the measured pressure Pa, as shown in FIG. 33. Accordingly, the ignition timing DTd can be retarded in such a way that the probability of knocking occurring based on fluctuation in the output can be lowered. Further, since the range of the retardation can be limited, deterioration in the thermal efficiency (engine output efficiency) based on the retardation of the ignition timing can be suppressed to the minimum.

It should be noted that, in the above setting control of the ignition timing during the gas mode operation, the surplus and shortage of the amount of air is confirmed based on the difference between the target pressure Pa0 and the measured pressure Pa; however, the surplus and shortage of the air amount may be confirmed based on a different parameter. The following describes a first referential modification of the setting control of the ignition timing by the engine controlling device 373, with reference to the flowchart of FIG. 34. It should be noted that, in the flowchart of FIG. 34, operation steps identical to those in the flowchart of FIG. 32 refer to the above-description, and detail description for those steps are omitted.

In the present referential modification, the engine controlling device 373 refers to the target ignition timing map M14 to determine the targeted ignition timing DTm based on the engine load Ac (STEP501 to STEP502), and then receives the measured value Fa (measured flow rate) of the air flow rate (intake manifold flow rate) in the intake manifold 367 from a flow rate sensor (not shown) (STEP513). Then, the engine controlling device 373 refers to retardation setting map M15A and determines the retard amount ΔDTd (STEP504) and sets the ignition timing DTm+ΔDTd (STEP505) based on a difference (Fa0−Fa) between the target value Fa0 (target flow rate) of the intake manifold flow rate set based on the engine load Ac and the like and the measured value Fa (measured flow rate) of the intake manifold flow rate. It should be noted that the retardation setting map M15A intermittently stores values of the retard amount which is monotonically increased with respect to the difference resulting from subtracting the measured flow rate from the target flow rate.

Figure 35:
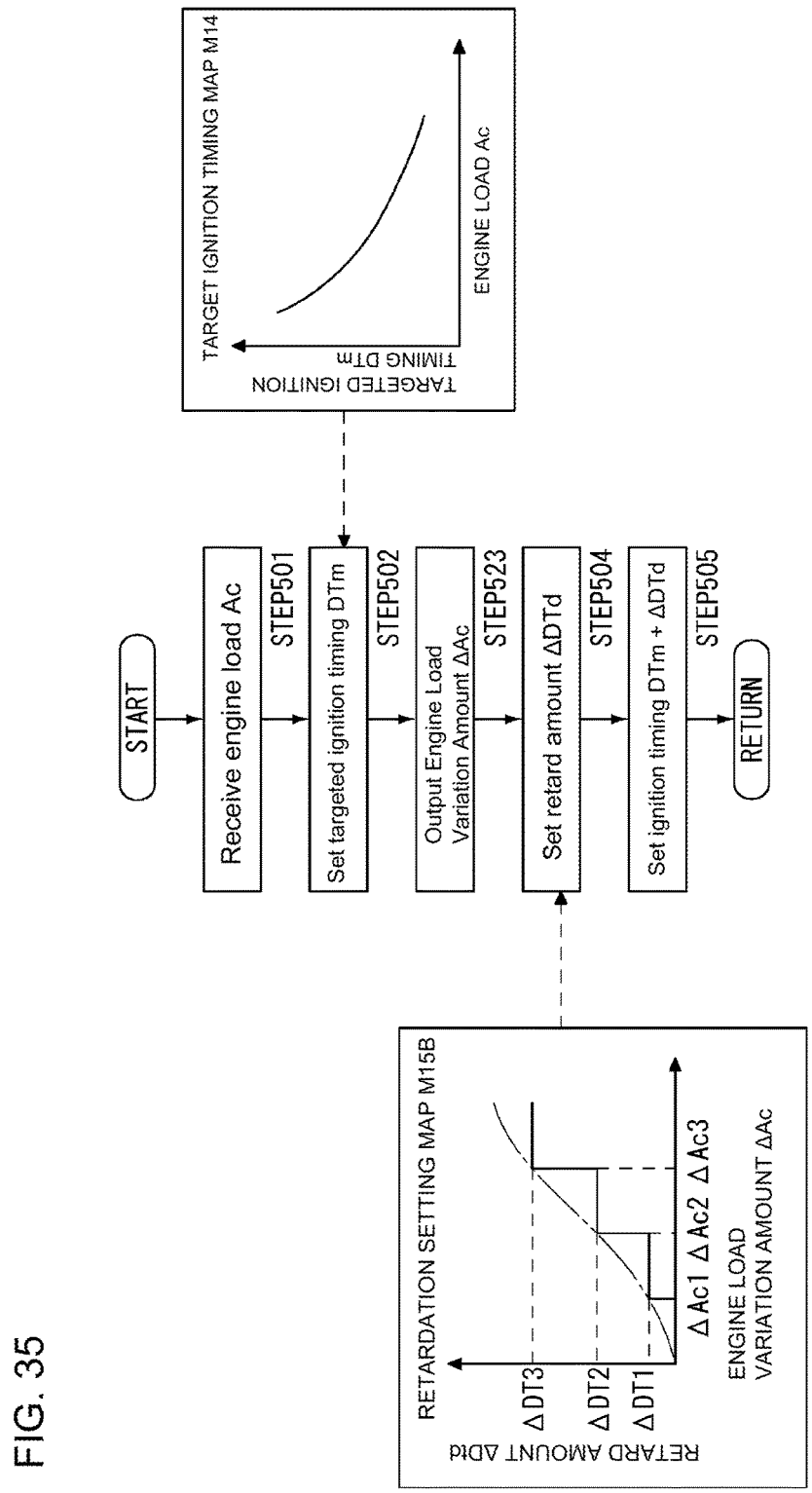
FIG. 35 A flowchart showing a second referential modification of the setting control of ignition timing by an engine controlling device.

The following details a second referential modification of the setting control of the ignition timing by the engine controlling device 373, with reference to flowchart of FIG. 35. It should be noted that, in the flowchart of FIG. 35, operation steps identical to those in the flowchart of FIG. 32 refer to the above-description, and detail description for those steps are omitted.

In the present referential modification, the engine controlling device 373 refers to the target ignition timing map M14 to determine the targeted ignition timing based on the engine load Ac (STEP501 to STEP502), and then calculates a variation amount of the engine load Ac (output variation amount) Δac (STEP523). At this time, for example, the output variation amount ΔAc may be calculated based on a difference from the previously measured engine load Ac. Then, the engine controlling device 373 refers to the retardation setting map M15B, and determines the retard amount ΔDTd (STEP504) and sets an ignition timing DTm+ΔDTd (STEP505), based on the output variation amount ΔAc. It should be noted that the retardation setting map M15B intermittently stores values of the retard amount which is monotonically increased with respect to the output variation amount ΔAc.

Further, the retardation setting map M15 may be a 3-dimensional map indicating the correlation amongst a parameter based on which the insufficient state of the air amount is predicted, an engine load (generator output or the engine torque) Ac, and the retard amount ΔDTd, instead of the above 2-dimensional map. That is, in the example of the flowchart of FIG. 32, the retard amount ΔDTd is determined in STEP504, based on the difference (Pa0−Pa) between the target pressure Pa0 and the measured pressure Pa, and the engine load Ac, referring to the retardation setting map M15C shown in FIG. 36. Since the retard control can be more accurately executed by referring to the 3-dimensional retardation setting map M15C as described above, deterioration in the thermal efficiency (engine output efficiency) is restrained, while preventing knocking.

Figure 36:
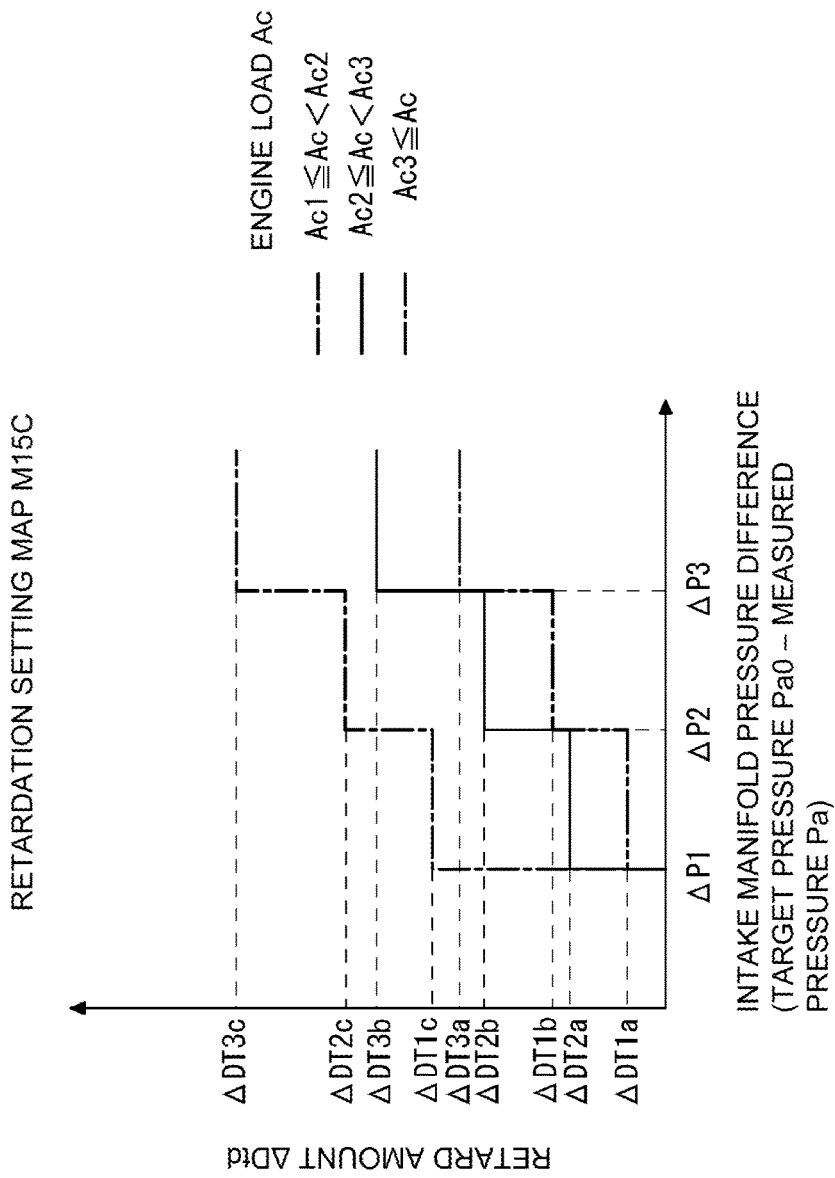
FIG. 36 A diagram showing a retardation setting map in a third referential modification of the setting control of ignition timing by an engine controlling device.

In the example of the retardation setting map M15C shown in FIG. 36, where the engine load Ac is Ac1 or higher but less than Ac2, the retard amount ΔDTd is set to a value of ΔDT1a when the intake manifold pressure difference (Pa0−Pa) becomes ΔP1 or higher, the retard amount ΔDTd is set to a value of ΔDT2a (ΔDT2a>ΔDT1a) when the intake manifold pressure difference (Pa0−Pa) becomes ΔP2 or higher, and the retard amount ΔDTd is set to a value of ΔDT3a (ΔDT3a>ΔDT2a) when the intake manifold pressure difference (Pa0−Pa) becomes ΔP3 or higher, as shown by the two-dot chain line in the figure.

Further, where the engine load Ac is Ac2 or higher but less than Ac3, the retard amount ΔDTd is set to a value of ΔDT1b (ΔDT1b>ΔDT1a) when the intake manifold pressure difference (Pa0−Pa) becomes ΔP1 or higher, the retard amount ΔDTd is set to a value of ΔDT2b (ΔDT2b>ΔDT1b and ΔDT2b>ΔDT2a) when the intake manifold pressure difference (Pa0−Pa) becomes ΔP2 or higher, and the retard amount ΔDTd is set to a value of ΔDT3b (ΔDT3b>ΔDT2b and ΔDT3b>ΔDT3a) when the intake manifold pressure difference (Pa0−Pa) becomes ΔP3 or higher, as shown in the solid line in the figure.

Further, when the engine load is Ac3 or higher, the retard amount ΔDTd is set to a value of ΔDT1c (ΔDT1c>ΔDT1b) when the intake manifold pressure difference (Pa0−Pa) becomes ΔP1 or higher, the retard amount ΔDTd is set to a value of ΔDT2c (ΔDT2c>ΔDT1c and ΔDT2c>ΔDT2b) when the intake manifold pressure difference (Pa0−Pa) becomes ΔP2 or higher, and the retard amount ΔDTd is set to a value of ΔDT3c (ΔDT3c>ΔDT2c and ΔDT3c>ΔDT3b) when the intake manifold pressure difference (Pa0−Pa) becomes ΔP3 or higher, as shown in a single-dot chain line in the figure.

Figure 34:
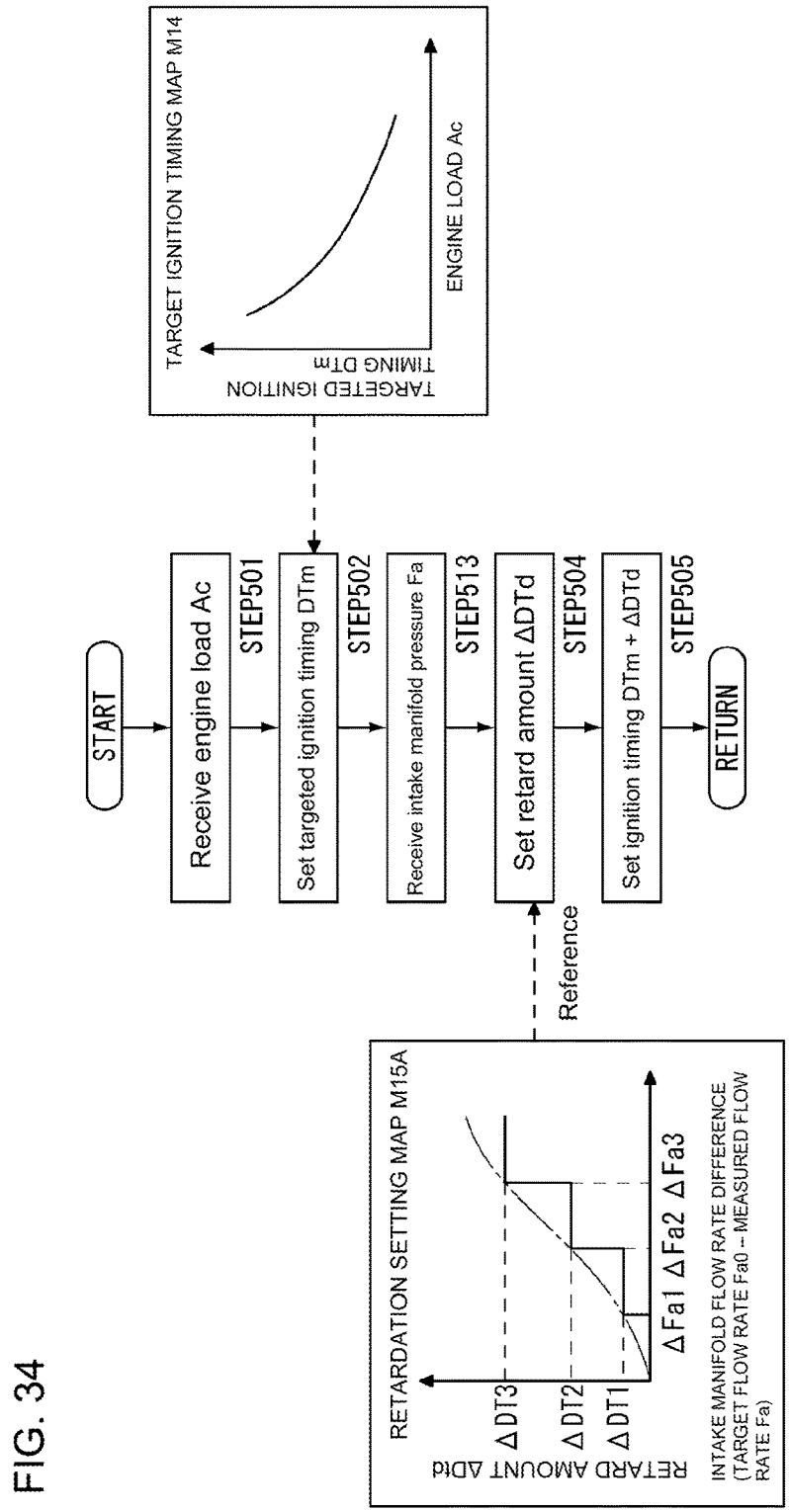
FIG. 34 A flowchart showing a first referential modification of the setting control of ignition timing by an engine controlling device.

It should be noted that, in cases of setting the retard amount ΔDTd by referring to a 3-dimentional retardation setting map, the retard amount ΔDTd is determined based on a difference (Fa0−Fa) between the target flow rate Fa0 and the measured flow rate Fa and the engine load Ac, in the example of the flowchart in FIG. 34. Further, in the example of the flowchart of FIG. 35, the retard amount ΔDTd is determined based on the variation amount (output variation amount) of the engine load Ac and the engine load Ac.

In the first referential example, the retard amount of the ignition timing is stored in advance based on the amount of parameters for determining the shortage and surplus in the air amount, as in the above-described setting control for the ignition timing. However, for example, the advance amount and retard amount may be set to be constant amount of Δt and may be varied in multiple steps. The following describes another referential example (second referential example) of a control operation for the engine device during the gas mode operation, with reference to FIG. 37. Further, the following referential example deals with an example where the air amount insufficient state is predicted based on a difference (Pa0−Pa) between the target value Pa0 (target pressure) of the intake manifold pressure and a measured value Pa (measured pressure) of the intake manifold pressure.

Figure 37:
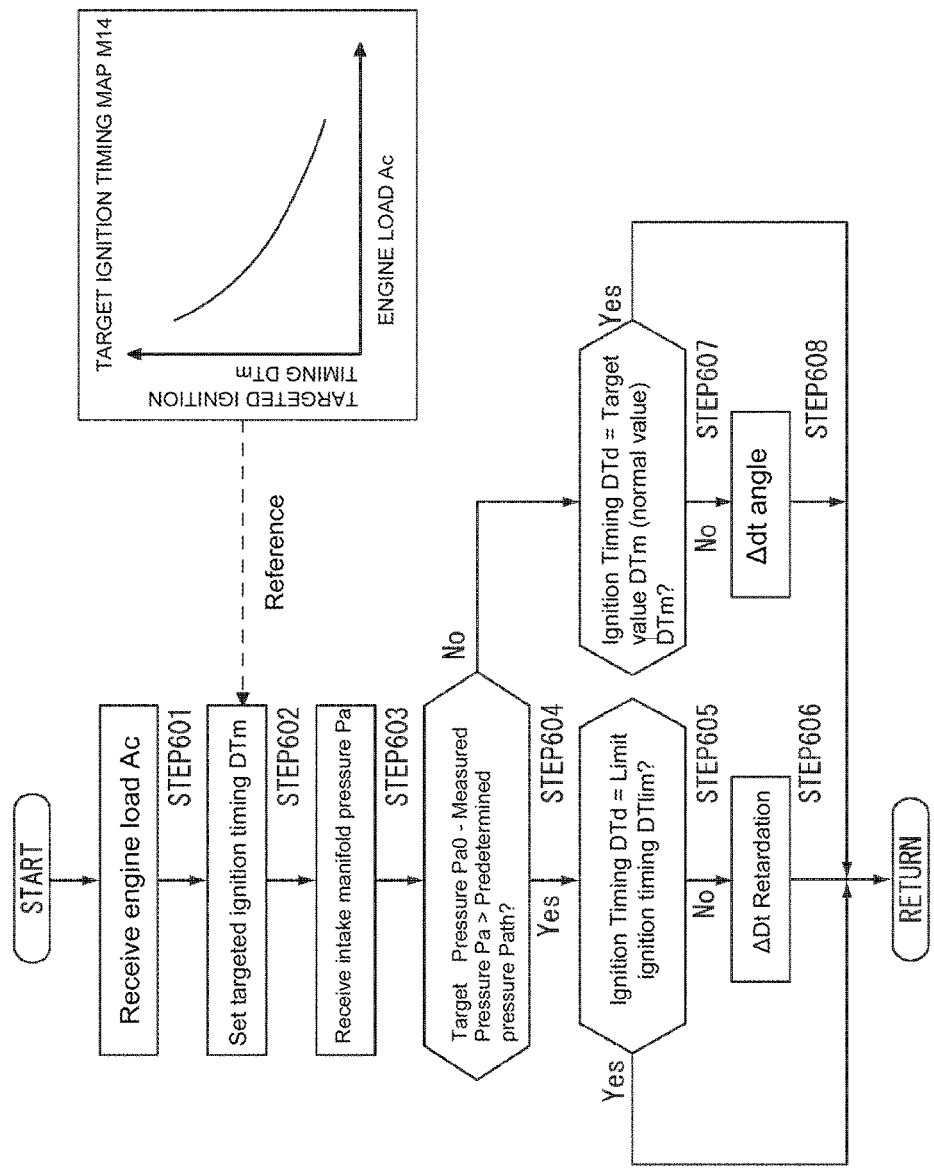
FIG. 37 A flowchart showing operations in a setting control of ignition timing by an engine controlling device of a second referential example.

As shown in FIG. 37, in the engine device of the second referential example, when the engine load Ac measured by the load measuring device 319 is received during an operation in the gas mode (STEP601), the engine controlling device 373 determines a targeted ignition timing DTm, with reference to the target ignition timing map M14 (STEP602). After the targeted ignition timing DTm is determined, the engine controlling device 373 obtains a value Pa (measured pressure) of the intake manifold pressure measured by the intake manifold pressure sensor 339 (STEP603). Then, the engine controlling device 73 determines whether or not the air amount is insufficient based on a difference (Pa0−Pa) between the set target value Pa0 (target pressure) and the measured value Pa (measured pressure) of the intake manifold pressure (STEP604).

If the difference (Pa0−Pa) between the target pressure Pa0 and the measured pressure Pa is higher than a predetermined pressure difference Path (Yes in STEP604), the engine controlling device 373 determines that the air amount is insufficient, and makes a transition to the retard control of STEP605 and thereafter. On the other hand, if the difference (Pa0−Pa) between the target pressure Pa0 and the measured pressure Pa is equal to or less than the predetermined pressure difference Path (No in STEP604), the amount of air is determined as to be sufficient, and a transition occurs to the advance control of STEP607 and thereafter.

After transition to the retard control, the engine controlling device 373 first confirms whether or not the set ignition timing DTd is an ignition timing (limit ignition timing) DTlim to become a retard limit value (STEP605). When the ignition timing DTd has not yet reached the limit ignition timing DTlim (No in STEP605), the ignition timing DTd is retarded by a predetermined amount Δdt (e.g. 1°) (STEP606). That is, when the retard limit value is reached during the retard control, the engine controlling device 373 stops the retard control.

With this retard control by the engine controlling device 373, the ignition timing DTd can be retarded in multiple steps until it reaches the limit ignition timing DTlim, when the amount of air is estimated to be insufficient based on a difference between the target pressure Pa0 and the measured pressure Pa. Accordingly, the ignition timing DTd can be retarded in such a way that the probability of knocking occurring based on fluctuation in the output can be lowered. Further, since the range of the retardation can be limited, deterioration in the thermal efficiency (engine output efficiency) based on the retardation of the ignition timing can be suppressed to the minimum.

After transition to the advance control, the engine controlling device 373 first confirms whether or not the set ignition timing DTd is the targeted ignition timing DTm (STEP607). When the ignition timing DTd has not yet reached the targeted ignition timing DTm (No in STEP605), the ignition timing DTd is advanced by a predetermined amount Δdt (STEP608). That is, when the ignition timing DTd becomes the one during the ordinary driving, through the advance control, the engine controlling device 373 stops the advance control.

With this advance control by the engine controlling device 373, the ignition timing DTd can be advanced in multiple steps until it reaches the targeted ignition timing DTm of the ordinary driving, when the amount of air is estimated to be insufficient based on a difference between the target pressure Pa0 and the measured pressure Pa. Since the ignition timing DTd is advanced to improve the thermal efficiency, assuming the output is stabilized, and the ignition timing DTd is gradually changed, the probability of knocking taking place can be restrained even when the output fluctuates again.

It should be noted that the second referential example deals with a case where, in STEP604, the parameter based on which the insufficient state of the air amount is predicted is a difference (Pa0−Pa) between the target value Pa0 (target pressure) of the intake manifold pressure and a measured value Pa (measured pressure) of the intake manifold pressure; however, such a parameter is not limited to this. Namely, the parameter based on which the insufficient state of the air amount is predicted in the retardation setting map M15 may be a difference (Fa0−Fa) between the target value Fa0 (target flow rate) of the intake manifold flow rate and the measured value Fa (measured flow rate) of the intake manifold flow rate as in the first referential modification, or the variation amount (output variation amount) ΔAc of the engine load Ac as in the above-described second referential modification.

The structure of each of the portions is not limited to the illustrated first and second referential examples, but can be variously changed within a scope which does not deflect from the scope of the referential example. Further, the engine device of the first and second referential examples can also be applied to structures other than the propulsion/electric power generating mechanism described above, such as a generator device for supplying electric power to an electric system in a ship hull and a structure as a drive source in the land-based power generating facility. Further, although the dual-fuel engine is described as an example of the engine device of the referential example, each control operation in the gas mode described above can be applied to a gas engine in which the gaseous fuel is combusted. Further, although the ignition method is based on the micro pilot injection method, it may be configured to perform spark ignition in the sub chamber.

REFERENCE SIGNS LIST

1 ship
2 ship hull
4 funnel
5 propeller
9 propeller shaft
11 engine room
12 propulsion/electric power generating mechanism
17 supplied-air bypass passage
19 load measuring device
20 engine rotation sensor
21 engine device (gas engine device)
22 speed reducer
23 generator
24 output shaft (crank shaft)
25 cylinder block
26 cylinder head
30 main fuel gas passage
31 sub fuel gas passage
36 cylinder
37 intake port
38 exhaust port
39 pressure sensor
40 head cover
41 main fuel gas pipe
42 sub fuel gas pipe
43 side cover
44 exhaust manifold
45 thermal insulation cover
48 exhaust gas relay pipe
49 turbocharger
49*a* turbine
49*b* compressor
51 intercooler
63 intake filter
64 fresh air passage pipe
66 supplied-air bypass pipe
67 intake manifold
73 engine controlling device
79 igniter
80 intake valve
81 exhaust valve 82 spark plug
89 check valve
98 gas injector
110 main fuel gas pressure regulator
111 sub fuel gas pressure regulator
112 main fuel gas pressure sensor
113 main fuel gas temperature sensor
114 sub fuel gas pressure sensor
115 lubricating oil temperature sensor
V1 main throttle valve
V2 supplied-air bypass valve
V3 exhaust bypass valve

The invention claimed is:

1. An engine device including an intake manifold configured to supply air into a cylinder, a gas injector configured to mix fuel gas with air supplied from the intake manifold, and supply mixed gas to the cylinder, and an igniter configured to ignite, in the cylinder, premixed fuel obtained by pre-mixing the fuel gas with the air, the engine device comprising:
a controlling unit configured to determine insufficiency in an air amount in the premixed fuel in the cylinder,
wherein the controlling unit performs in multiple steps retard control of ignition timing by the igniter, when the air amount is determined as to be insufficient, and performs in multiple steps advance control of the ignition timing, when the air amount is determined as to be sufficient, and
wherein the controlling unit stops the retard control when a retard limit value is reached in the retard control, and stops the advance control when the ignition timing becomes that of an ordinary operation in the advance control.

2. An engine device including an intake manifold configured to supply air into a cylinder, a gas injector configured to mix fuel gas with air supplied from the intake manifold, and supply mixed gas to the cylinder, and an igniter configured to ignite, in the cylinder, premixed fuel obtained by pre-mixing the fuel gas with the air, the engine device comprising:
a controlling unit configured to determine insufficiency in an air amount in the premixed fuel in the cylinder,
wherein the controlling unit performs in multiple steps retard control of ignition timing by the igniter, when the air amount is determined as to be insufficient, and performs in multiple steps advance control of the ignition timing, when the air amount is determined as to be sufficient, and
wherein the controlling unit receives, as a measured pressure, an intake manifold pressure measured in the intake manifold, and determines that the air amount is insufficient when a difference obtained by subtracting the measured pressure from a target pressure which is a target value for the intake manifold is higher than a predetermined differential pressure.

3. An engine device including an intake manifold configured to supply air into a cylinder, a gas injector configured to mix fuel gas with air supplied from the intake manifold, and supply mixed gas to the cylinder, and an igniter configured to ignite, in the cylinder, premixed fuel obtained by pre-mixing the fuel gas with the air, the engine device comprising:
a controlling unit configured to determine insufficiency in an air amount in the premixed fuel in the cylinder,
wherein the controlling unit performs in multiple steps retard control of ignition timing by the igniter, when the air amount is determined as to be insufficient, and performs in multiple steps advance control of the ignition timing, when the air amount is determined as to be sufficient, and
wherein the controlling unit receives, as a measured flow rate, an air flow rate measured in the intake manifold, and determines that the air amount is insufficient when a difference obtained by subtracting the measured flow rate from a target flow rate which is a target value for the intake manifold is higher than a predetermined differential flow rate.

4. An engine device including an intake manifold configured to supply air into a cylinder, a gas injector configured to mix fuel gas with air supplied from the intake manifold, and supply mixed gas to the cylinder, and an igniter configured to ignite, in the cylinder, premixed fuel obtained by pre-mixing the fuel gas with the air, the engine device comprising:
a controlling unit configured to determine insufficiency in an air amount in the premixed fuel in the cylinder,
wherein the controlling unit performs in multiple steps retard control of ignition timing by the igniter, when the air amount is determined as to be insufficient, and performs in multiple steps advance control of the ignition timing, when the air amount is determined as to be sufficient, and
wherein the controlling unit determines that the air amount is insufficient when an output variation amount of the engine device is greater than a predetermined amount.

5. The engine device according to claim 1, wherein the controlling unit receives, as a measured pressure, an intake manifold pressure measured in the intake manifold, and determines that the air amount is insufficient when a difference obtained by subtracting the measured pressure from a target pressure which is a target value for the intake manifold is higher than a predetermined differential pressure.

6. The engine device according to claim 1, wherein the controlling unit receives, as a measured flow rate, an air flow rate measured in the intake manifold, and determines that the air amount is insufficient when a difference obtained by subtracting the measured flow rate from a target flow rate which is a target value for the intake manifold is higher than a predetermined differential flow rate.

7. The engine device according to claim 1, wherein the controlling unit determines that the air amount is insufficient when an output variation amount of the engine device is greater than a predetermined amount.

* * * * *